United States Patent [19]

Owens et al.

[11] Patent Number: 5,579,283
[45] Date of Patent: *Nov. 26, 1996

[54] METHOD AND APPARATUS FOR COMMUNICATING CODED MESSAGES IN A WELLBORE

[75] Inventors: Steve C. Owens, Katy; Brett W. Bouldin, Pearland; David E. Rothers, Houston; Douglas J. Lehr, The Woodlands; Michael W. Holcombe, Houston, all of Tex.

[73] Assignee: Baker Hughes Incorporated, Houston, Tex.

[*] Notice: The term of this patent shall not extend beyond the expiration date of Pat. No. 5,226,494.

[21] Appl. No.: 71,422

[22] Filed: Jun. 3, 1993

Related U.S. Application Data

[63] Continuation-in-part of Ser. No. 751,861, Aug. 28, 1991, abandoned, and Ser. No. 831,202, Jan. 31, 1992, Pat. No. 5,343,963, which is a continuation-in-part of Ser. No. 751,861, which is a continuation-in-part of Ser. No. 873,654, Apr. 23, 1992, Pat. No. 5,226,494, which is a continuation of Ser. No. 784,666, Oct. 24, 1991, which is a continuation of Ser. No. 549,803, Jul. 9, 1990, abandoned.

[51] Int. Cl.⁶ .............. G01V 1/40; E21B 47/06; E21C 7/06
[52] U.S. Cl. .................. 367/83; 175/40; 175/48; 181/103
[58] Field of Search .................. 367/83–85, 134, 367/166, 197; 175/40, 48; 73/151; 181/102, 103; 166/250, 374, 66.4

[56] References Cited

U.S. PATENT DOCUMENTS

| | | | |
|---|---|---|---|
| 4,078,620 | 3/1978 | Westlake | 175/48 |
| 4,364,117 | 12/1982 | Snow | 367/152 |
| 4,805,449 | 2/1989 | Das | 73/151 |
| 4,915,168 | 4/1990 | Upchurch | 166/250 |
| 4,992,997 | 2/1991 | Bseisu | 367/82 |
| 5,033,032 | 7/1991 | Houghtaling | 367/160 |
| 5,226,494 | 7/1993 | Rubbo et al. | 166/250 |
| 5,343,963 | 9/1994 | Bouldin et al. | 175/27 |

Primary Examiner—Nelson Moskowitz
Attorney, Agent, or Firm—Melvin A. Hunn; Felsman, Bradley, Gunter & Dillon

[57] ABSTRACT

A method and apparatus for communicating coded messages in a wellbore between a transmission node and a reception node is provided. The coded messages are messages are impressed upon a fluid column which extends between the transmission node and the reception node. A transmission apparatus is provided at the transmission node which is in communication with the fluid column, for altering pressure of the fluid column to generate at least a portion of the coded message. A reception apparatus is provided at the reception node. The reception apparatus includes a rigid structural component with an exterior surface which is in direct contact with fluid column and an interior surface which is not in contact with the fluid column, and a sensor assembly which detects elastic deformation of the rigid structural component. The transmission apparatus is utilized to alter pressure of the fluid column in a predetermined pattern to generate at least one coded message. The reception apparatus is utilized to detect the coded message in the fluid column through changes in elastic deformation of the rigid structural component.

40 Claims, 70 Drawing Sheets

TERMINAL MAGNETIC COMMUNICATION INTERFACE

MAGNETIC COMMUNICATION CIRCUIT

MAGNETIC COMMUNICATION CIRCUIT

PRESSURE CHANGE DETECTION CIRCUIT

POWER-UP CIRCUIT FOR
PRESSURE CHANGE DETECTION CIRCUIT

BATTERY LOAD TEST CIRCUIT

POWER-UP CIRCUIT FOR MICROPROCESSOR

CONTINUITY TEST CIRCUIT

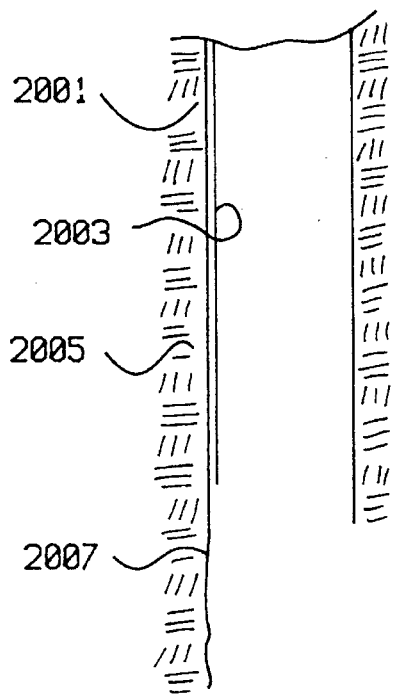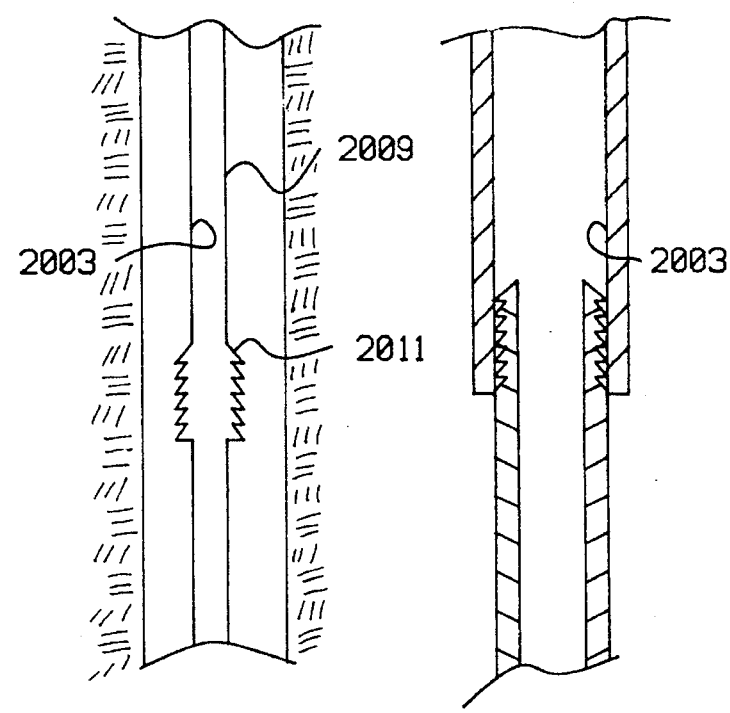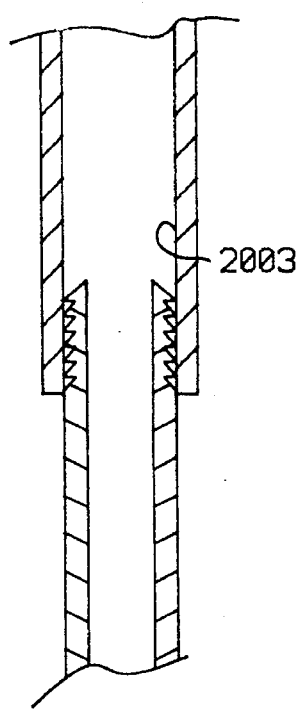
FIGURE 27a   FIGURE 27b   FIGURE 27c
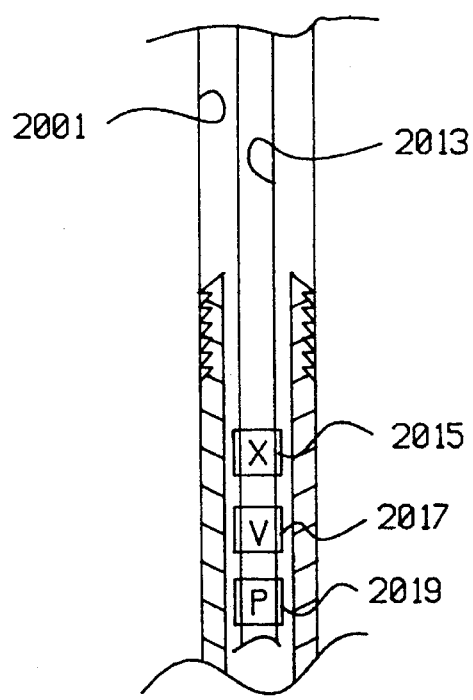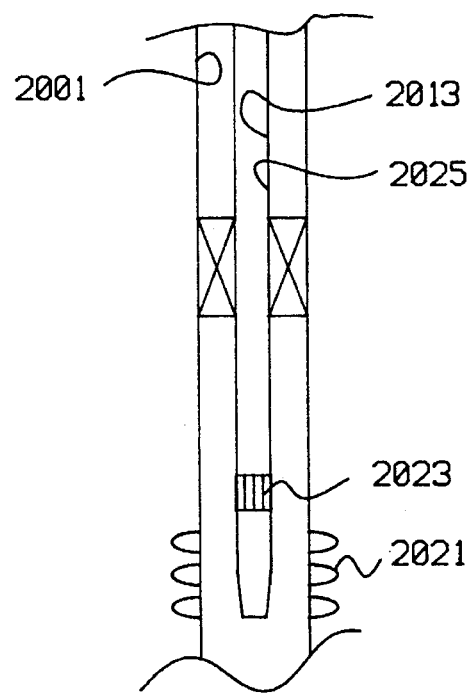
FIGURE 27d   FIGURE 27e 3,579,283

METHOD AND APPARATUS FOR COMMUNICATING CODED MESSAGES IN A WELLBORE

CROSS-REFERENCE TO RELATED APPLICATIONS

1. The present application is a continuation-in-part of U.S. patent application Ser. No. 07/751,861, filed Aug. 28, 1991, entitled "Subsurface Well Apparatus", further identified by Attorney Docket No. 284-3648-CIP, now abandoned, which is a continuation-in-part of:
(a) U.S. patent application Ser. No. 07/873,654, filed Apr. 23, 1992, entitled "Subsurface Well Apparatus", further identified by Attorney Docket No. 284-3648-C2, U.S. Pat. No. 5,226,494, which is a continuation under 37 C.F.R. §1.62 of:
(b) U.S. patent application Ser. No. 07/784,666, filed Oct. 24, 1991, entitled "Subsurface Well Apparatus", further identified by Attorney Docket No. 284-3648-C, now abandoned, which was a continuation under 37 C.F.R. §1.62 of:
(c) U.S. patent application Ser. No. 07/549,803, filed Jul. 9, 1990, entitled "Subsurface Well Apparatus", further identified by Attorney Docket No. 284-3648-US, now abandoned;
2. The present application is a continuation-in-part of U.S. patent application Ser. No. 07/831,202, filed Jan. 31, 1992, entitled "Subsurface Well Apparatus", further identified by Attorney Docket No. 284-5401-US, now U.S. Pat. No. 5,343,963, which is a continuation-in-part of:
(a) U.S. patent application Ser. No. 07/751,861, filed Aug. 28, 1991, entitled "Subsurface Well Apparatus", further identified by Attorney Docket No. 284-3648-CIP, now abandoned, which is a continuation-in-part of:
  (i) U.S. patent application Ser. No. 07/873,654, filed Apr. 23, 1992, entitled "Subsurface Well Apparatus", further identified by Attorney Docket No. 284-3648-C2, now U.S. Pat. No. 5,226,494 which is a continuation under 37 C.F.R. §1.62 of:
  (ii) U.S. patent application Ser. No. 07/784,666, filed Oct. 24, 1991, entitled "Subsurface Well Apparatus", further identified by Attorney Docket No. 284-3648-C, now abandoned, which was a continuation under 37 C.F.R. §1.62 of:
  (iii) U.S. patent application Ser. No. 07/549,803, filed Jul. 9, 1990, entitled "Subsurface Well Apparatus", further identified by Attorney Docket No. 284-3648-US, now abandoned.
Each of these applications is hereby incorporated herein fully by reference.

BACKGROUND OF THE INVENTION

1. Field of the Invention

The present invention relates in general to data transmission systems, and in particular to data transmission systems which may be utilized in wellbores to communicate coded messages through fluid columns disposed therein.

2. Description of the Prior Art

In the oil and gas industry, it has been one longstanding objective to develop data transmission systems which do not require the utilization of electrical conductors to carry coded signals between wellbore locations which are separated by great distances. Experience has revealed that data transmission systems which require the utilization of electrical conductors extending between communication nodes in a wellbore are advantageous when data must be communicated within the wellbore at extremely fast transmission rates, or when large blocks of data need to be transferred between communication nodes; however, the utilization of electrical conductors has several serious disadvantages including: (1) since most wellbores include regions which are exposed to corrosive fluids and high temperatures, a long service life cannot be expected from a data transmission system which utilizes electrical conductors; (2) since most wellbores extend for substantial distances, data transmission systems which utilize electrical conductors are not generally considered to be cost effective, particularly when such systems are utilized only infrequently, or in a limited manner; (3) since all wellbores define fairly tight operating clearances, utilization of a wireline conductor to transmit data may reduce or diminish the operating clearance through which other wellbore operations are performed; and (4) since wellbores typically utilize a plurality of threaded tubular members to make up tubular strings, utilization of an electrical conductor to transmit data within the wellbore complicates the make-up and break-up of the tubular string during conventional operations.

Accordingly, the oil and gas industry has moved away from the utilization of electrical conductor data transmission systems (frequently referred to as "hardwire" systems), and toward the utilization of pressure changes in a fluid column to transmit data within the wellbore. One example of the extensive use of fluid columns within a wellbore to transmit data is that of measurement-while-drilling data transmission systems, also referred to as "MWD" systems. Typically, these systems are utilized only in drilling operations. Generally, a plurality of sensors are provided in a tubular subassembly located within the bottom hole assembly, near the rock bit which is utilized to disintegrate the formation. The electrical sensors detect particular wellbore parameters, such as temperature, pressure, and vibration, and develop electrical signals corresponding thereto. The electrical signals are converted into a digital signal stream (generally multiplexed sensor data) and utilized to develop a plurality of pressure changes in a fluid column, typically the tubing fluid column, which are sensed at the earth's surface and converted into a format which allows the drilling engineers to make decisions which affect the drilling operations. Some attempts have been made to apply the concepts of MWD data transmission systems to completion operations, during which the drilled wellbore is placed in condition for continuous production of oil and gas from selected wellbore regions. To date, no entirely satisfactory data transmission system has been developed for utilization in completion operations, nor has a satisfactory data transmission system been developed for utilization during prolonged production periods.

At present, several standard approaches are utilized to operate wellbore tools which are remotely located within a wellbore on a workstring. One approach is to increase the pressure of fluid disposed within the central bore of the workstring until a predetermined pressure threshold is exceeded, causing the shearing of set screws or other similar pressure-sensitive mechanical latches. Another approach is to utilize a slickline to pass an actuating tool, with a particular profile, into contact with a profiled component on the wellbore tool. Yet another approach is to utilize an electrical-conductor (commonly referred to as an "E-line") to energize an electrically-actuated substance which operates mechanical components to switch a wellbore tool between modes of operation.

SUMMARY OF THE INVENTION

It is one objective of the present invention to provide a method and apparatus for communicating coded messages in a wellbore between a transmission node and a reception node, through a fluid column extending therebetween, wherein potential fluid leak paths are minimized in general, and in particular are minimized by sensing the coded messages through a rigid structural component of the reception apparatus at the reception node.

It is another objective of the present invention to provide a method and apparatus for communicating coded messages in a wellbore between a transmission node and a reception node, through a fluid column extending therebetween, wherein changes in circumferential stress applied to a rigid structural component at the reception node are utilized to detect the coded message in the fluid column.

It is yet another objective of the present invention to provide a method and apparatus for communicating coded messages in a wellbore between a transmission node and a reception node, through a fluid column extending therebetween, wherein changes in the elastic deformation of a rigid component at the reception node are utilized to detect the coded message in the fluid column.

It is still another objective of the present invention to provide a method and apparatus for communicating coded messages in a wellbore between a transmission node and a reception node, through a fluid column extending therebetween, wherein the opportunity for error in the transmission and reception of coded messages is minimized by providing a coded message which is composed of a plurality of message segments which comprise the presence or absence of a rapid rate of change of fluid pressure magnitude within the fluid column at particular locations on a time-axis.

It is still another objective of the present invention to provide a method and apparatus for communicating coded messages in a wellbore between a transmission node and a reception node, through a fluid column extending therebetween, wherein the coded message is composed of a plurality of message segments, each of which corresponds to the presence or absence of a rapid rate of change of the pressure amplitude within the fluid column, wherein filters are utilized to eliminate the influence of pressure changes which fall below or above predetermined rate thresholds.

It is yet another objective of the present invention to provide a method and apparatus for communicating coded messages in a wellbore between a transmission node and a reception node, through a fluid column extending therebetween, wherein the apparatus includes an electromagnetic reception system for receiving electromagnetic signals which are utilized to train a microprocessor to switch one or more electrically-actuated wellbore tools between selected operating modes in response to detection of a coded message in said fluid column.

It is still another objective of the present invention to provide a method and apparatus for communicating coded messages in a wellbore between a transmission node and a reception node, through a fluid column extending therebetween, with a reception apparatus located within the wellbore at a desired location on a wellbore tubular conduit string, wherein the reception apparatus is partially composed of a substantially imperforate mandrel member through which the coded messages are detected.

It is yet another objective of the present invention to provide a method and apparatus for communicating coded messages in a wellbore between a transmission node and a reception node, through a fluid column extending therebetween, wherein the operative components of a reception apparatus are maintained out of direct contact with said fluid column, and wherein said reception apparatus is utilized to detect, through a substantially imperforate conduit member, the coded message which is impressed upon said fluid column.

It is still another objective of the present invention to provide a pressure pulse generation apparatus which is utilized to provide rapid changes in pressure which are detectable at remote locations within the wellbore, but which does not utilize a large volume of fluid, and which does not substantially change the absolute volume of the fluid within a particular wellbore fluid column which comprises a communication channel.

It is yet another objective of the present invention to provide a method and apparatus for communicating coded messages within a wellbore, wherein the coded messages are defined by operator-selectable coded messages attributes of: (a) the number of consecutive rapid pressure changes within a fluid column; and (b) the time interval between consecutive rapid pressure changes, which distinguish one particular coded message from other coded messages.

It is yet another objective of the present invention to provide an apparatus for communicating coded messages within a wellbore between a transmission node and a reception node, through a fluid column extending therebetween, which includes (1) a transmission apparatus at the transmission node which is in communication with the fluid column for generating at least a portion of the coded message, and (2) a reception apparatus at the reception node for detecting changes in at least one fluid column attribute, with the reception apparatus including a plurality of power-consuming electrical components, wherein, during a communication code mode of operation at least a portion of the power-consuming electrical components are maintained in an off condition until at least one change in said at least one fluid column attribute is detected by the reception apparatus.

It is yet another objective of the present invention to provide an apparatus for communicating coded messages in a wellbore which includes a transmission apparatus, a reception apparatus, a programming unit in communication with the reception apparatus during a programming mode of operation, and a programming interface for passing signals between the programming unit and the reception apparatus during a programming mode of operation, wherein, during the programming mode of operation, at least a portion of the power-consuming electrical components of the reception apparatus are maintained in an off condition until at least one signal from the programming unit is received at the programming interface.

These and other objectives are achieved as is now described. When characterized broadly as a method, the present invention is directed to a method for communicating coded messages in a wellbore between a transmission node and a reception node, through a fluid column extending therebetween. The method is comprised of a plurality of method steps. A transmission apparatus is provided at the transmission node, which is in communication with the fluid column, for altering pressure of the fluid column to generate a coded message which is composed of either "positive" or "negative" rapid changes in pressure amplitude. A reception apparatus is also provided, but is disposed at the reception node. The reception apparatus includes: (1) a rigid structural component with an exterior surface which is in contact with the fluid column and an interior surface which is not in contact with the fluid column, and (2) a sensor assembly which detects changes in elastic deformation of the rigid structural component, which is also maintained out of contact with the fluid column. The transmission apparatus is utilized to alter pressure of the fluid column in a predetermined pattern to generate at least one coded message. The reception apparatus is utilized to detect the coded message in the fluid column through changes in the elastic deformation of the rigid structural component. In one embodiment, the sensor assembly includes a fluid body in communication with the interior surface of the rigid structural component, but which is not in communication with the fluid column. The fluid body is responsive to changes in the elastic deformation of the rigid structural component. Also, preferably, a pressure sensor is provided for directly sensing pressure changes in the fluid body to detect elastic deformation of the rigid structural component. In the alternative embodiment, a strain gage bridge may be utilized to detect elastic deformation of the rigid structural component. In the described embodiments of the present invention, the rigid structural component comprises a mandrel member which at least partially defines the central bore to the wellbore tubular member. The mandrel member is a substantially imperforate component which contains very few, if any, potential fluid leak paths, thus allowing the present invention to be utilized in wellbore completions which are intended for extremely long service lives.

In the present invention, the reception apparatus includes a processor which is programmed to identify particular electrical signal patterns developed by the reception apparatus in response to changes in the elastic deformation of the rigid structural component. The processor will perform particular predefined processor tasks in response to receipt of a coded message which it recognizes. For example, the processor may be programmed to provide an activation signal to at least one electrically-actuable wellbore tool. The actuation signal may be utilized to switch the electrically-actuable wellbore tool between selected operating modes.

In the preferred embodiment of the present invention, an electromagnetic programming interface is provided which is in electrical communication with the processor. The processor is programmed to provide a particular output in response to the receipt of particular electrical signals from the reception apparatus through an electromagnetic signal received by the electromagnetic program interface. This allows the processor to be programmed without having any direct electrical connection, thus eliminating a potential leak path.

In the preferred embodiment of the present invention, which is described herein, said sensor assembly generates electrical signals corresponding to elastic deformation of the rigid structural component. The reception apparatus further includes signal processing for identifying and isolating rates of change in elastic deformation of the rigid structural component above and below predetermined rate thresholds. During the step of utilizing the reception apparatus to detect coded messages, the reception apparatus detects coded messages in the fluid column through rates of change in elastic deformation of the rigid structural component.

In the preferred embodiment of the present invention, the coded messages may be impressed upon the fluid column which serves as the transmission path through utilization of either a conventional triplex (or other) drilling rig pump or a pressure pulse generator apparatus especially adapted to develop rapid pressure changes without substantially changing the absolute volume of the fluid column.

The present invention may be utilized to perform completion operations in a wellbore. A single transmission apparatus is provided at the wellhead for generating coded signals which are transmitted to a plurality of reception apparatuses which are disposed at selected locations within a string of tubular members. A plurality of wellbore tools are provided in the string in selective communication with the plurality of reception apparatuses. The wellbore tools may include (a) electrically-actuable wellbore packers; (b) electrically-actuable perforating guns; (c) electrically-actuable vales; and (d) electrically-actuable liner hangers. The transmission apparatus may be utilized to generate particular coded messages to selectively actuate the plurality of wellbore tools in a predetermined manner to complete the wellbore. Typically, liner hangers may be utilized to hang casing off cemented casing segments. Cementing operations should follow to cement all portions of the casing. Next, perforating operations should be conducted to perforate selected portions of the cased wellbore. Then, one or more packers should be set to isolate particular regions between a production tubing string and the cased wellbore. Finally, valves should be opened to allow the selective flow of wellbore fluids into the cased wellbore for production upward through the production tubing string.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 14a and 14b is an electrical schematic of the pressure change detection circuit (also known as "Delta pressure detector") of FIGS. 12a and 12b;

FIGS. 27a through 27e are simplified schematic views of the utilization of the present invention to perform a completion operation.

DETAILED DESCRIPTION OF THE INVENTION

Explanation of Alternative Embodiments

In the present invention, several alternatives are provided. There are alternative techniques for generating a coded message at a transmission node, including: a "negative pulse technique" which utilizes a conventional fluid pump and a conventional valve to generate a plurality of "negative" pressure pulses which constitute a coded message, and a "positive pulse technique" which utilizes a unique valving apparatus to generate a plurality of "positive" pressure pulses which constitute a coded message.

There are also alternative techniques for sensing the coded message at a remotely located reception node, including: a "pressure transducer technique" which utilizes a pressure transducer which is maintained out-of-contact with wellbore fluids but which nonetheless detects the coded message in a wellbore fluid column through changes in elastic deformation of a rigid structural component, and a "strain gage technique" which utilizes a conventional strain gage bridge to detect directly a sequence of circumferential elastic deformations of a rigid structural component, such as a mandrel.

Overview of the System

Figure 1:
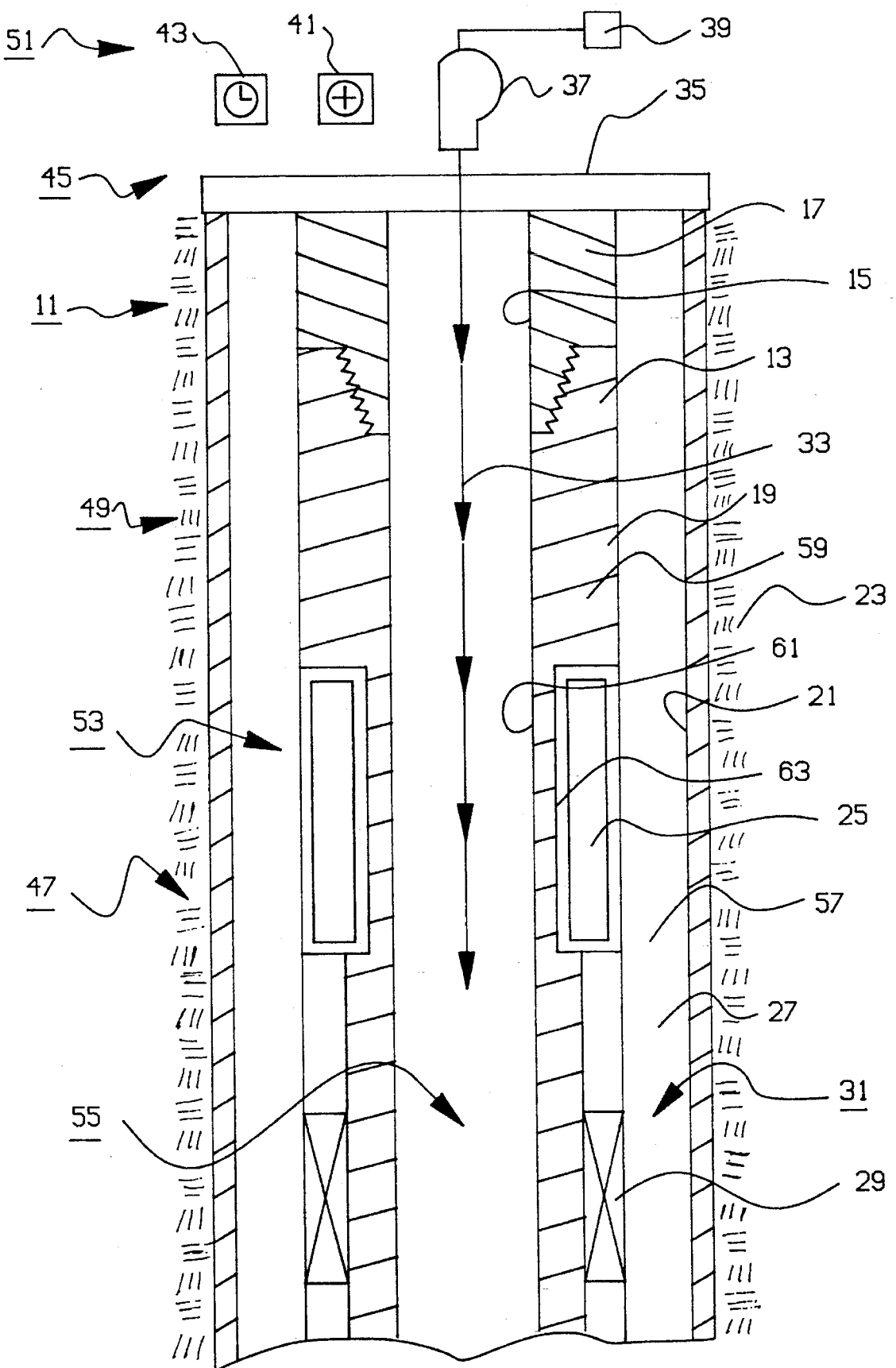
FIG. 1 is a simplified and schematic view of one embodiment of the wellbore communication apparatus of the present invention, which will be utilized to present the broad concepts underlying the present invention.

FIG. 1 is a simplified and schematic view of the wellbore communication apparatus 11 of the embodiment of the present invention for the positive pulse technique. As is shown, communication apparatus 11 is disposed within wellbore 49. Considered broadly, wellbore communication apparatus 11 is utilized to communicate coded messages within any fluid column, but in the preferred embodiment fluid column 55, from transmission apparatus 51 which is located at transmission node 45 to reception apparatus 53 which is located at reception node 47 within wellbore 49. In this embodiment, reception apparatus 53 is located within wellbore 49 on tubular conduit string 13 which is composed of a plurality of tubular members, such as tubular member 17 and tubular member 19, which are threaded together at conventional pin and box threaded couplings. In the view of FIG. 1, tubular conduit string 13 is greatly simplified; in actual practice, typically, several hundred tubular conduit members are coupled together to define tubular conduit string 13 which extends from the wellhead to a remote wellbore location, possibly several thousand feet below the earth's surface. Central bore 15 is defined within tubular conduit string 13. As is shown in FIG. 1, tubular conduit string 13 may be concentric with other wellbore tubulars, such as casing 21 which is utilized to prevent the washout or deterioration of formation 23, and to allow for the selective communication of oil, gas, and formation water with wellbore 49 through perforations within casing 21 which are provided at selected locations (and which are not shown in this figure).

Wellbore communication apparatus 11 includes sensor assembly 25 for detecting changes in the pressure of fluid column 55 within central bore 15, drive mechanism 27 which is electrically-actuated by sensor assembly 25, and tool mechanism 29 which achieves an engineering objective within the wellbore in response to interaction with drive mechanism 27. Viewed broadly, drive mechanism 27 and tool mechanism 29 comprise an electrically-actuated wellbore tool 31 which may be selectively switched between operating modes or states in response to electrical signals received from sensor assembly 25. Preferably, sensor assembly 25 includes a microprocessor which is "taught" to provide a particular output to electrically-actuated wellbore tool 31 in response to identification of one or more coded messages within fluid column 55, but which provides no actuating electrical signal to electrically-actuated wellbore tool 31 when other coded messages are detected. This allows wellbore communication apparatus 11 to be utilized in an engineering environment wherein a plurality of electrically-actuated wellbore tools are provided at selected locations within tubular conduit string 13, each of which is responsive to one or more coded messages and which is thus independently operable.

Sensor assembly 25 is partially housed within mandrel member 59 which comprises a rigid structural component with an exterior surface 61 which is in contact with fluid column 55, and interior surface 63 which is not in contact or communication with fluid column 55. As is shown in FIG. 1, mandrel member 59 cooperates with adjoining tubular members to define central bore 25 within tubular conduit string 13. In the preferred embodiment of the present invention, sensor assembly 25 is utilized to detect elastic deformation of mandrel member 59 in response to changes in pressure amplitude of fluid column 55, and in particular to detect changes in the elastic deformation of mandrel member 59. In the preferred embodiment of the present invention, mandrel member 59 is formed of 4140 steel, which has a modulus of elasticity of 30,000,000 pounds per square inch, and a Poisson ratio of 0.3. Also, in the preferred embodiment, the portion of mandrel member 59 which is adjacent reception apparatus 53 is cylindrical in shape, having an outer diameter of 5.5 inches, and an inner diameter of 4.67 inches. As can be seen from FIG. 1, mandrel member 59 serves to form a substantially imperforate conduit wall within tubular member 19 of tubular conduit string 13.

The Negative Pressure Pulse Generator

In the particular embodiment of the present invention which employs the negative pulse technique, wellbore communication apparatus 11 includes transmission apparatus 51 which is shown in FIG. 1 as being located at the wellhead, which for purposes of discussion can be considered to be a "transmission node" 45. Also, as is shown in FIG. 1, reception apparatus 53 is distally located from transmission apparatus 51, and in particular is shown as being located at reception node 47 within wellbore 49. Coded messages are communicated from transmission apparatus 51 for detection by reception apparatus 53. In the present invention, reception apparatus 53 is utilized to detect rapid changes in amplitude of the pressure exerted by fluid column 55 upon mandrel member 59, while maintaining sensor assembly 25 out of direct, or indirect, contact or communication with fluid column 55. The amplitude, and rate of change of the amplitude, of fluid column 55 is manipulated with respect to time by a human operator who operates and monitors fluid pump 37, which communicates through valve assembly 35 with fluid column 55. Pressure gage 39 is utilized to monitor the pressure of fluid column 55, while amplitude control 41 is utilized by a human operator to urge fluid column 55 toward a preselected pressure amplitude, or to maintain a particular amplitude. Timer 43 is also utilized by a human operator to monitor time intervals.

In this embodiment of the present invention, the human operator manually first operates valve assembly 35, which is shown in simplified form in FIG. 1, to allow for the pressurization of fluid column 55 by pump 37, and then allows the selective venting of high pressure fluid from central bore 15 to annulus 57, or more preferably to a reservoir, which is maintained at a lower pressure. After pressurizing fluid column 55 a predetermined amount, the human operator may vent fluid from fluid column 55 through valve assembly 35 to such a reservoir in a predetermined pattern with respect to time. The coded message is composed of a plurality of message segments, each of which is defined by the presence of rapid changes in the pressure amplitude of fluid column 55 within central bore 15, or, in alternative embodiments, by the presence or absence of rapid changes in pressure amplitude of any particular fluid column. These rapid changes in the amplitude of the pressure of fluid column 55 affect the elastic deformation of mandrel member 59 of reception apparatus 53 in a manner, which will be discussed herebelow, which is detected by sensor assembly 25. Timer 43 is utilized to maintain timing for the message segments.

In the preferred embodiment of the present invention, pump 37 should have sufficient capacity to provide fluid pressurized to a selectable amount in the range of zero pounds per square inch to twenty thousand pounds per square inch, and should preferably have an output capacity of between six to twenty gallons per minute. In its most rudimentary form, timer 43 may comprise a standard clock which is not coordinated in operation with pump 37. In the preferred embodiment of the present invention, valve assembly 35 is a conventional one-quarter turn cock valve which is utilized at wellheads. In alternative embodiments, the operation of timer 43, amplitude control 41, pump 37, pressure gage 39, and valve assembly 35 may be coordinated and subjected to computer control to render wellbore communication apparatus 11 easier to utilize.

Figure 2:
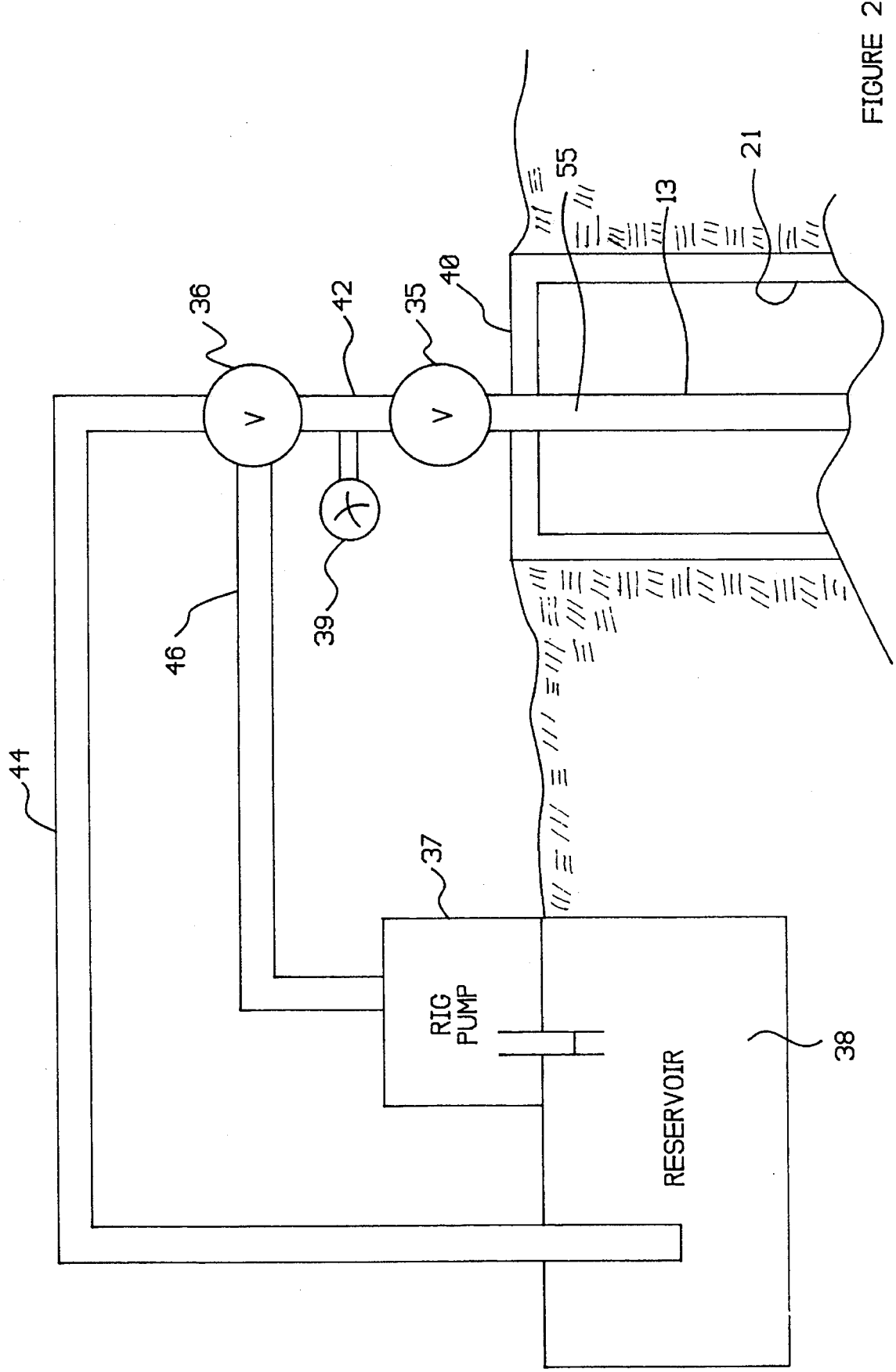
FIG. 2 is a simplified and schematic view of a pressure pulse generator, in accordance with one embodiment of the present invention, for generating "negative" pressure pulses.

FIG. 2 is a more detailed view of the pressure pulse generator which can implement the "negative pulse technique". As is shown, valves 35, 36 are utilized to allow the selective communication of rig pump 37 and reservoir 38 with fluid column 55 disposed within tubular conduit string 13. As is shown, valve 35 is disposed adjacent wellhead 40. As identified above, valve 35 comprises a one-quarter turn cock valve, which may be physically operated by a human operator at the wellhead. Valve 36 is also manually-operable to allow the selective communication of conduits 44, 46 with conduit 42 which extends between valve 35 and valve 36. Conduit 44 extends between valve 36 and reservoir 38, while conduit 46 extends between valve 36 and rig pump 37.

When the operator desires to increase the pressure of fluid column 55 within tubular conduit string 13, valve 35 and valve 36 are manually operated to allow the passage of fluid from rig pump 37 to fluid column 55 by passage through conduit 46, valve 36, conduit 42, valve 35, and wellhead 40. As is shown in FIG. 2, rig pump 37 draws fluid from reservoir 38. When a sufficient fluid pressure amplitude is obtained within fluid column 55, as determined by readings of pressure gage 39, valve 35 is manually closed. When the operator desires to create one or more message segments of a coded message, valve 36 is manually operated to allow the communication of fluid from fluid column 55 to reservoir 38, by allowing passage from conduit 42 to conduit 44. Then, the operator manually operates valve 35 in a predetermined sequence to create a series of rapid changes in fluid pressure amplitude, as will be discussed in greater detail herebelow. In this negative pressure pulse technique of generating coded message segments, it is the rapid decrease in fluid pressure amplitude of fluid column 55 which comprises the message segments. The volume of fluid evacuated from fluid column 55 to reservoir 38 need not be great in order to create a plurality of sequential rapid decreases in pressure amplitude, and the absolute volume of fluid within fluid column 55 need not be altered to a great extent in order to create coded messages. Utilizing an alternative pressure pulse generator, coded messages can be generated from a plurality of rapid, and momentary, increases in the fluid pressure amplitude of fluid column 55.

The Positive Pressure Pulse Generator

Figure 3:
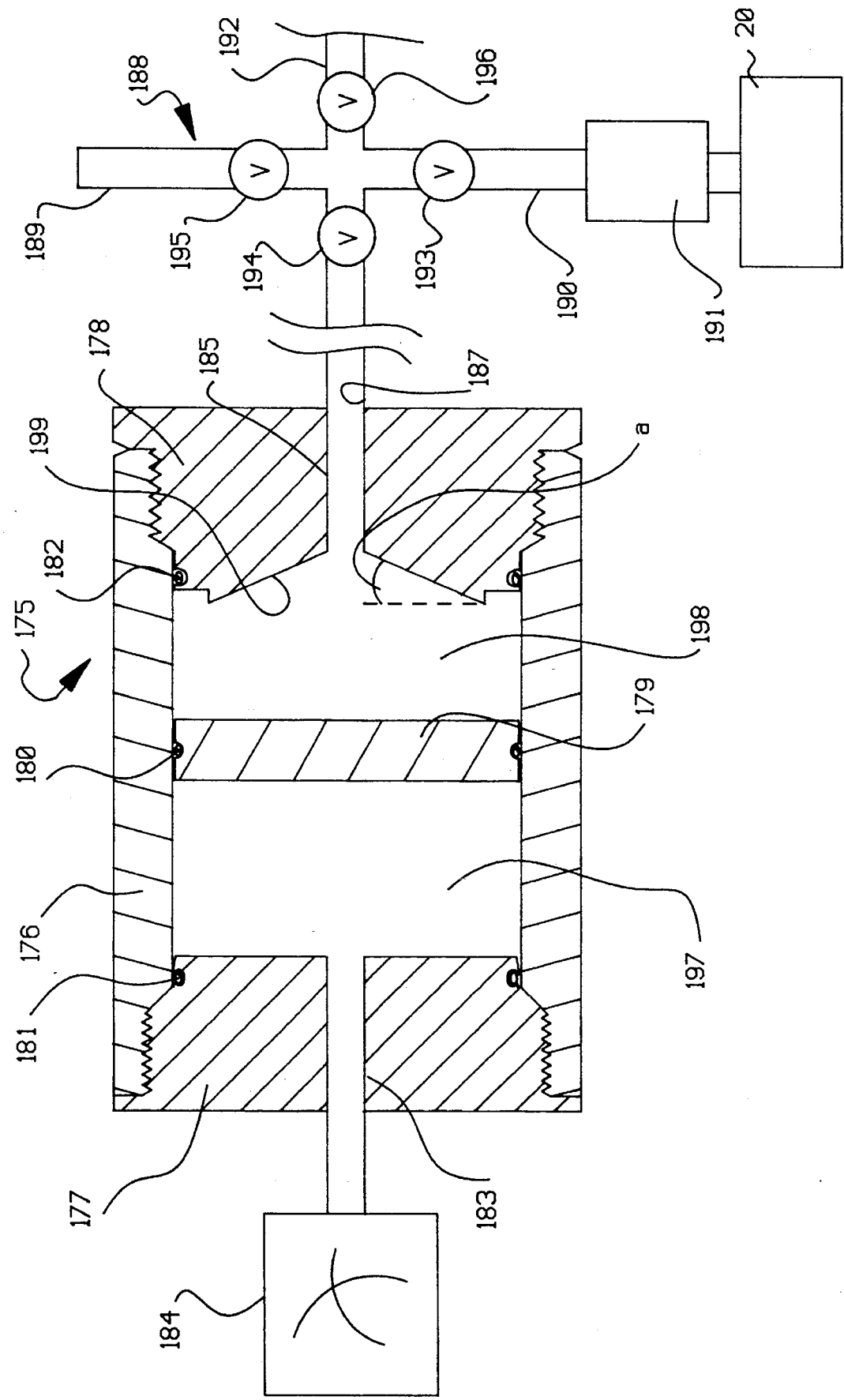
FIG. 3 is a simplified and schematic view of a unique pressure pulse generator, in accordance with another embodiment of the present invention, for generating "positive" pressure pulses.

An apparatus which can be utilized to perform an alternative positive pulse transmission technique is depicted in FIG. 3. In this view, pressure pulse generator 175 is shown in longitudinal section view, and the remainder of the components which interact therewith are depicted in simplified and block diagram form. As is shown, pressure pulse generator 175 includes cylindrical housing 176, which is preferably approximately eighteen and one-half inches long, having an internal diameter of just under twelve inches. Cylindrical housing 176 is threaded at both ends for engaging end caps 177, 178. O-ring seals 181, 182 are provided at the interface of end caps 177, 178 and the interior surface of cylindrical housing 176. Preferably, a disk-shaped piston 179 is disposed within cylindrical housing 176, and includes O-ring 180 to provide for a dynamic sealing engagement with the interior bore of cylindrical housing 176. In the preferred embodiment, end caps 177, 178 include bores 183, 185, which preferably have a diameter of approximately 0.17 inches, and a length of three inches. Bore 183 is utilized to allow pressure gage 184 to monitor the pressure within compartment 197 which is defined between end cap 177 and disk-shaped piston 179. Bore 185 is utilized to allow the selective communication between compartment 198 and four-way valve 188.

In the preferred embodiment of the present invention, compartment 197 is filled with an inert gas. The compartment is air-tight, and leak-free. Displacement of disk-shaped piston 179 toward end cap 177 will cause an increase in pressure of the inert gas contained within compartment 197, which is detected by pressure gage 184. In the preferred embodiment of the present invention, compartment 198 is filled with a liquid, such as water, which is propelled outward through bore 185 if disk-shaped piston 179 is urged right-ward toward end cap 178. In the preferred embodiment of the present invention, end cap 178 includes conical region 199 which defines an angle 198 of thirty degrees, and a diameter at its base of ten inches. This conical-shaped surface 199 serves to direct fluid from compartment 198 into bore 185. Bore 185 communicates through hose 187 to four-way valve 188. In the preferred embodiment of the present invention, hose 187 comprises a five foot length of rubber hose, which is rated to three thousand, five hundred pounds per square inch, and which is identified by Model No. SS-8R8-PM8-PM8-60. Fluid pump 191 communicates with four-way valve 188 through hose 190, which is identical to hose 187. Additionally, hose 192 is utilized to communicate fluid between four-way valve 188 and fluid column 55 (of FIG. 1). Four-way valve 188 also communicates with bleed port 189.

Four-way valve 188 includes pump valve 193, pressure pulse generator valve 194, bleed valve 195, and well valve 196. Well valve 196 allows selective communication of fluid between four-way valve 188 and hose 192, which is preferably a rubber hose, which is fifty feet long, and which is identified by Model No. SS-8R8-PM8-PM8-600.

In the preferred embodiment of the present invention, pressure pulse generator 178 is utilized to discharge a small amount of fluid, such as water or wellbore fluid, into fluid column 55 (of FIG. 1) which produces a rapid pressure change which may be detected at substantial distances within the wellbore, but which does not substantially impact the absolute volume of the fluid contained within fluid column 55. Preferably, compartment 198 is configured in size to allow the discharge of between one-half gallon to one gallon of fluid, an infinitesimal amount of fluid considering that fluid column 55 may be thousands of feet in length. Pressure pulse generator 175 may be utilized in a manner to provide a plurality of rapid pressure pulses in a particular pre-defined sequence, each pulse occurring at a preestablished time, to create a coded message which may be detected at reception node 47 by reception apparatus 53 (of FIG. 1).

The low-volume pressure pulses are generated utilizing pressure pulse generator 175 in the following manner:

1. pressure pulse generator valve 194 of four-way valve 188 is closed to prevent communication of fluids into compartment 198;
2. bleed valve 195 is opened to allow communication of fluid between four-way valve 188 and bleed port 189;
3. pump valve 193 of four-way valve 188 is closed to prevent communication between fluid pump 191 and four-way valve 188;
4. well valve 196 is opened to allow communication between fluid column 55 and four-way valve 188;
5. the rig pump (not depicted) is then utilized to completely fill central bore 15 (of FIG. 1) to provide a fluid column which extends from the wellhead (not depicted) downward through the wellbore conduit string which defines central bore 15 (of FIG. 1);
6. bleed port 89 is then monitored by a human operator until fluid is detected as flowing outward therefrom, an indication that central bore 15 is completely full of fluid, and that hose 192 is likewise completely full of fluid;
7. operation of the rig pump is then terminated;
8. bleed port 195 is then closed to prevent fluid from escaping through bleed port 189;
9. well valve 196 is then closed to prevent fluid from passing between four-way valve 188 and hose 192;
10. pump valve 193 is opened to allow the communication of fluid from pump 191 to four-way valve 188;
11. pressure pulse generator valve 194 is opened to allow the communication of fluid from four-way valve 188 to compartment 198 through hose 187;
12. pump 191 is then utilized to pump fluid, such as water or wellbore fluid, from reservoir 202, through four-way valve 188, through hose 187, to fill compartment 198 with fluid, causing the left ward displacement of disk-shaped piston 179, and corresponding compression of the inert gas contained within compartment 197;
13. gage 184 is monitored to detect the compression of the inert gas to one thousand pounds per square inch (1,000 p.s.i.) of force;
14. upon obtaining a force of one thousand pounds per square inch within compartment 197, the operation of pump 191 is discontinued;
15. pump valve 193 is then closed to prevent the communication of fluid between four-way valve 188 and pump 191;

16. well valve 196 is then opened, allowing the compressed inert gas within chamber 197 to urge disk-shaped piston 180 right ward to discharge fluid contained within compartment 198 through hose 187, through four-way valve 188, and into fluid column 55 of FIG. 1.

The execution of these operating steps generates a low volume, low frequency pressure pulse, with a volume of approximately one-half to one gallon of fluid, and a frequency of approximately one to two Hertz. The pressure pulse is essentially a step function of fixed (short) duration. Hose 187, four-way valve 188, and hose 192 serve to attenuate the pressure pulse and ensure that only the main harmonic of the pressure pulse is introduced into fluid column 55 (of FIG. 1). However, the pulse does not substantially change the absolute volume of fluid column 55 (of FIG. 1). The low frequency (one to two Hertz) pressure pulse travels downward within fluid column 55 of FIG. 1 to reception node 47 where it is detected by reception apparatus 53.

A comparison of the pressure pulse generating techniques of FIGS. 1 and 2 reveal that the technique of FIG. 1 operates by providing a brief negative pressure pulse by venting fluid from fluid column 55, while pressure pulse generator 175 is utilized to create a "positive" pressure pulse by introducing fluid into fluid column 55.

Viewed broadly, the positive pressure pulse generator is utilized to generate a series of pressure pulses in a fluid column, each of which creates a temporary and transient change in fluid pressure amplitude in the column which travels the length of a column, but which does not substantially change the absolute volume of a fluid column. The known volume of fluid which is discharged from the positive pressure pulse generator must be introduced into the fluid column at a very rapid rate in order to ensure that the pressure "pulses" have the above-identified attributes. For optimal performance, the fluid which is discharged from the positive pressure pulse generator into the fluid column should be introduced at or about a velocity which approximates the velocity of sound within the particular transmission medium. Of course, the velocity of sound varies with the viscosity of the transmission medium. A rather clean fluid, such as water, has one transmission velocity for sound, while a more viscous fluid, such as water containing numerous impurities and additives, will have a different transmission velocity for sound. For all practical purposes, the pressure pulses generated by the positive pressure pulse generator are "acoustic" waves which travel the length of the fluid column and have only a temporary and transient impact on the fluid pressure amplitude at any particular location within the fluid column. It is the impulse nature of the fluid pressure pulses generated by the positive pressure pulse generator which allow for the transmission of pulses over significant distances, without requiring a significant change in the absolute volume of the fluid contained within the fluid column.

Pressure-Transducer Type Sensor

Figure 4A:
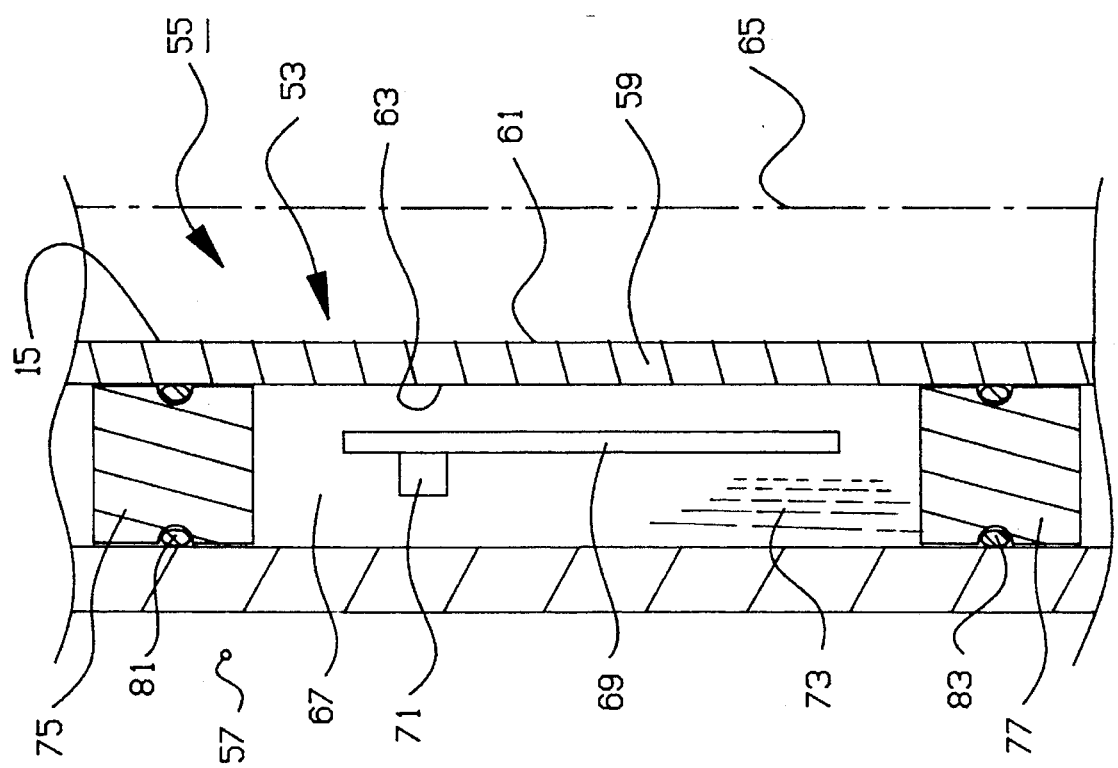
FIGS. 4a and 4b are simplified one-quarter longitudinal section views of a pressure-transducer type reception apparatus, in accordance with one embodiment of the present invention, for detecting rapid changes in fluid pressure amplitude in a wellbore fluid column which serves as a communication channel.
Figure 4B:
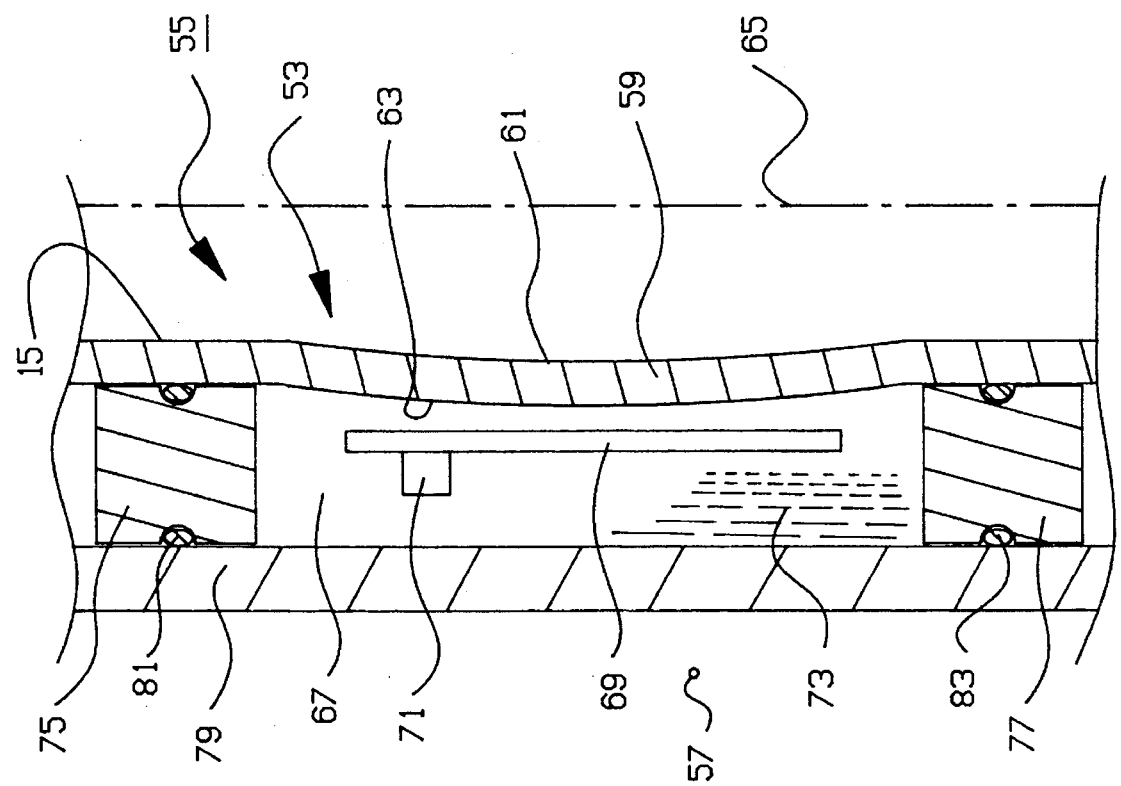

FIGS. 4a and 4b are detail views of reception apparatus 53 of wellbore communication apparatus 11, depicted in fragmentary longitudinal section view, and in simplified form which may be utilized with either the negative pressure pulse generation technique or the positive pressure pulse generation technique, but which is depicted and described as used in conjunction with the negative pressure pulse generation technique. As is shown, mandrel member 59 helps define central bore 15 in the region of reception apparatus 53. Central axis 65 of fluid column 55 is depicted to provide orientation in these figures.

FIG. 4a depicts reception apparatus 53 when the pressure of fluid column 55 equals the pressure within sensor cavity 67, which is preferably maintained at atmospheric pressure. In contrast, FIG. 2b depicts, in exaggerated form, reception apparatus 53, when the pressure of fluid column 55 is far greater than that of sensor cavity 67. As is shown, mandrel member 59 is elastically deformed radially outward from central axis 65 by the pressure differential between fluid column 55 and sensor cavity 67. As is shown in both FIGS. 2a and 2b, reception apparatus 53 sensor cavity 67 which is defined between mandrel member 59, outer mandrel 79, and end pieces 75, 77 which are ring-shaped, and which include O-ring seals 81, 83 to provide a fluid-tight seal at the interface of end piece 75 with mandrel member 59 and outer mandrel 79, and end piece 77 with mandrel member 59 and outer mandrel 79. As is shown, circuit board 69 is disposed within sensor cavity 67. Pressure sensor 71 is coupled to circuit board 69. The electrical components which are disposed within sensor cavity 67 will be discussed in greater detail below. In the preferred embodiment, sensor cavity 67 is completely filled with a substantially incompressible fluid 73. When the rigid mandrel member 59 is elastically deformed by the pressure differential between fluid column 55 and sensor cavity 67, pressure is applied to pressure sensor 71 through the substantially incompressible fluid 73.

In this embodiment, pump 37 (of FIG. 1) and valve assembly 35 (of FIG. 1) are utilized to create and maintain the pressure differential between fluid column 55 and sensor cavity 67. In this embodiment, it is desirable to utilize pump 37 to create a pressure differential between fluid column 55 and sensor cavity 67 which is in the range of 1 pound per square inch to 10 pounds per square inch. Once this pressure differential is obtained, valve assembly 35 is utilized to selectively vent fluid from fluid column 55 to a reservoir at the surface, or more-rarely to annulus 57, in an operator-controlled manner to provide a plurality of sequential rapid changes in the pressure amplitude of fluid column 55 which result in the gradual return of mandrel member 59 from the position shown in FIG. 2b to the position shown in FIG. 2a. Therefore, mandrel member 59 is maximally elastically deformed at the beginning of a transmission of the coded message, and returns eventually, to the undeformed condition shown in FIG. 2a. Of course, FIG. 2b is an exaggerated depiction of the elastic deformation of mandrel member 59. Keep in mind that mandrel member 59 is formed of 4140 steel, and has a thickness of approximately 0.4 inches, so the actual elastic deformation of this rigid structural component will be slight. In the preferred embodiment of the present invention, mandrel member 59 is elastically deformed in the range of 0.001 inches to 0.003 inches, and returns to its undeformed condition as the pressure differential between fluid column 55 and sensor cavity 67 is reduced.

The elastic deformation of mandrel member 59 reduces the volume of sensor cavity 67 which is filled with substantially incompressible fluid 73, such as a light oil. An increase in the volume of sensor cavity 67 results in a decrease in pressure applied through substantially incompressible fluid 73 to pressure sensor 71. A decrease in the volume of sensor cavity 67 results in an increase in pressure applied through substantially incompressible fluid 73 to pressure sensor 71. In this embodiment of the present invention, pressure sensor 71 comprises a Model No. SX010 pressure transducer, manufactured by SenSym of California. Also, in this embodiment, the substantially incompressible fluid comprises Silicone oil, or any similar noncorrosive, electrically-inert fluid.

In this embodiment of the present invention, it is not the pressure amplitude of fluid column 55 which is important; rather, it is the change in the pressure amplitude which is detected by receiver apparatus 53, ensuring that the receiver apparatus 53 is substantially unaffected by slow changes in the amplitude of the pressure exerted by fluid column 55 on mandrel member 59. This is a desirable result, since many conventional wellbore operations require that the pressure within fluid column 55 be altered with respect to time to achieve some other engineering objectives. A pressure threshold is provided, below which reception apparatus 53 is substantially insensitive to accidental, ambient, or unintentional changes in the pressure of fluid column 55, so the accidental creation of a coded signal is unlikely.

Figure 5A:
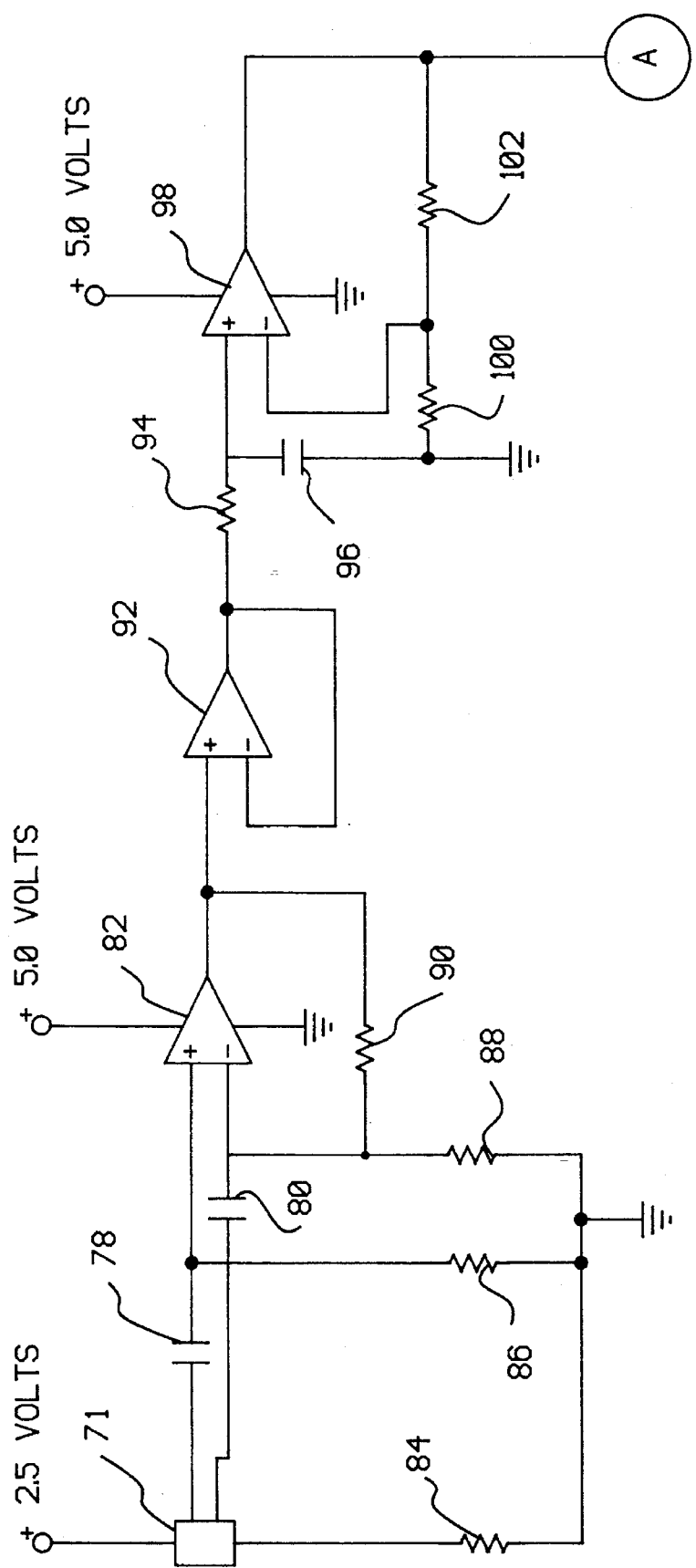
FIGS. 5a and 5b is an electrical schematic depiction of components utilized to perform signal conditioning operations upon the output of the pressure-transducer type reception apparatus depicted in FIGS. 4a and 4b.
Figure 5B:
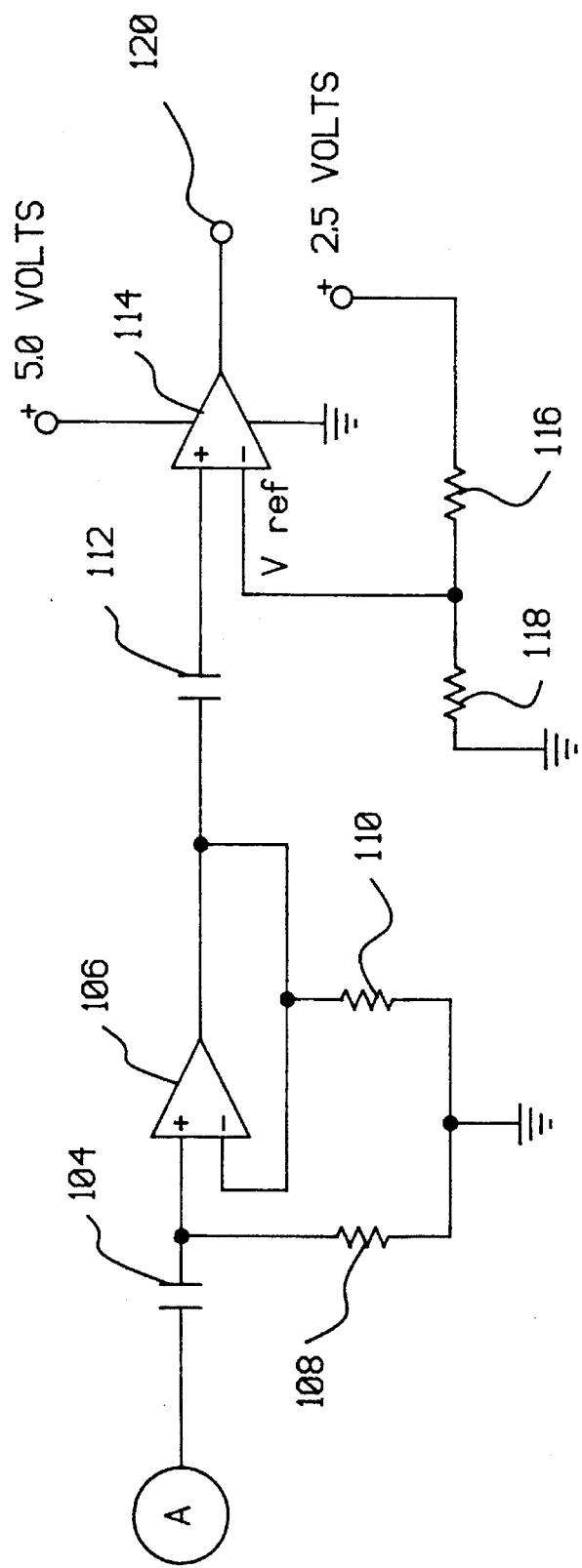

FIGS. 5a and 5b is an electrical schematic depiction of components utilized to perform signal conditioning operations upon the output of pressure sensor 71. Pressure sensor 71 develops as an output a differential voltage. The voltage at one output terminal is supplied through the integrating R-C circuit composed of capacitor 78 and resistor 86 to the non-inverting input of operational amplifier 82, while the voltage at the other output terminal of pressure transducer 71 is supplied through integrating RC circuit composed of capacitor 80 and resistor 88 to the inverting input of operational amplifier 82. Feedback resistor 80 is supplied between the inverting input of operational amplifier 82 and the output of operational amplifier 82. In this configuration, operational amplifier 82 is performing the operation of an alternating current, differential voltage amplifier. The gain of this differential voltage amplifier is established by the resistor value selected for resistors 88, 90. Preferably a gain of 500 is established by this circuit. The output of operational amplifier 82 is supplied to the non-inverting input of operational amplifier 92, which is operated as a buffer.

The output of operational amplifier 92 is supplied through resistor 94 to the non-inverting input of operational amplifier 98. Capacitor 96 is coupled between the non-inverting input of operational amplifier 98 and ground, while resistor 100 is coupled between the inverting input of operational amplifier 98 and ground, and resistor 102 is coupled between the inverting input of operational amplifier 98 and the output of operational amplifier 98. In this configuration, operational amplifier 98 is operated as a single pole, low pass filter. The cut-off frequency of this low pass filter is established by the values of resistor 94 and capacitor 96. Preferably, the cut-off frequency for this low pass filter is 2 Hertz.

The output of operational amplifier 98 is provided, through capacitor 104, to the non-inverting input of operational amplifier 106. Resistor 108 is coupled between the non-inverting input of operational amplifier 106 and ground, while resistor 110 is coupled between the inverting input of operational amplifier 106 and ground. In this configuration, operational amplifier 106 is performing the operations of a high-pass filter. The cut-off frequency for this high pass filter is preferably 1 Hertz, and is established by the values selected for capacitor 104 and resistor 108.

The output of operational amplifier 106 is supplied through capacitor 112 to the non-inverting input of operational amplifier 114. Capacitor 112 AC-couples operational amplifier 106 to operational amplifier 114. Therefore, no DC component is passed to operational amplifier 114. The inverting input of operational amplifier 114 is coupled to the voltage divider established by resistors 116, 118. In this configuration, operational amplifier 114 is operating as a positive voltage level detector. As such, the output of operational amplifier 114 remains low until a voltage is supplied to the non-inverting input of operational amplifier 114 which exceeds the positive voltage ($V_{ref}$) which is applied to the inverting input of operational amplifier 114. Once the voltage at the non-inverting input exceeds the voltage applied to the inverting input, the output of operational amplifier 114 switches from low to high. Preferably, the output of operational amplifier 114 is applied through terminal 120 to a memory device, such as a flip-flop (not depicted), but it may be applied directly to an input terminal of a microprocessor.

The Strain Gage Type Sensor

Figure 6:
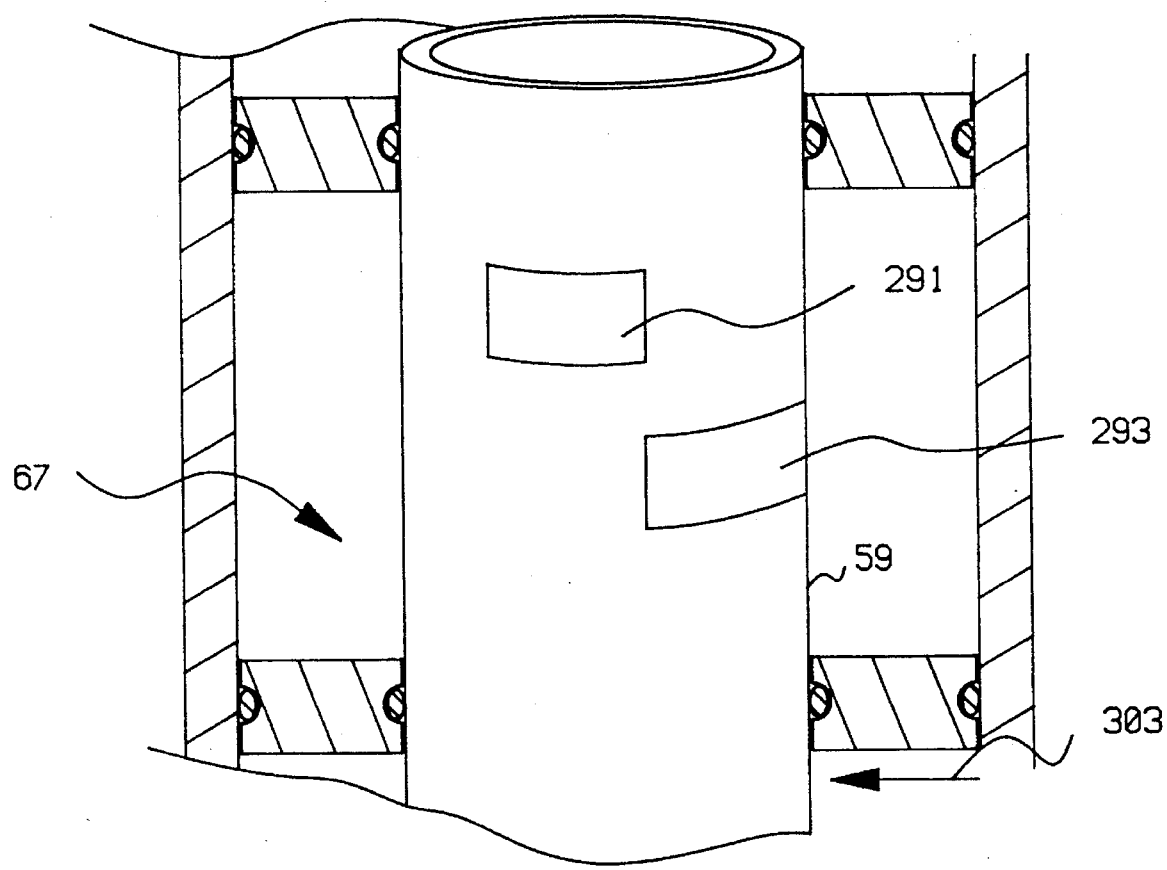
FIG. 6 is a simplified partial longitudinal section views of a strain-gage type reception apparatus, in accordance with another embodiment of the present invention, for sensing rapid changes in fluid pressure amplitude in the fluid column which serves as a communication channel.

The strain gage technique, which is an alternative to the pressure transducer technique, is depicted in simplified form in FIGS. 6a and 7b The strain gage technique requires the utilization of one or more strain gage sensors to detect circumferential elastic deformation of central bore 15 of tubular member 19. FIG. 6 depicts the placement of tangential strain sensor elements 291, 293. As shown, tangential strain sensor elements 291, 293 are placed substantially traverse to the longitudinal axis 299 of mandrel member 59.

In the present invention, the magnitude of the tangential strain detected by strain sensor elements 291, 293 is of little importance; as will be discussed in detail herebelow, the present invention utilizes a system which monitors only the rate of change in pressure amplitude as compared to a pressure amplitude threshold to detect components of a coded message. Accordingly, the placement of tangential strain sensor elements 291, 293 relative to tubular member 19 is of little importance. As is shown in FIG. 6, tangential strain sensor element 293 may be displaced from tangential strain sensor element 291 by fifteen to thirty degrees. In alternative embodiments, the sensors could be displaced one hundred and eighty degrees. Their physical proximity to one another is of little importance. Only their ability to detect circumferential elastic deformation matters. The tangential strain sensor elements 291, 293 need not be calibrated or temperature compensated, since the present invention monitors only for rapid rates of change in fluid pressure amplitude, and is not the least concerned with the magnitudes of fluid pressure within the fluid column.

Figure 7:
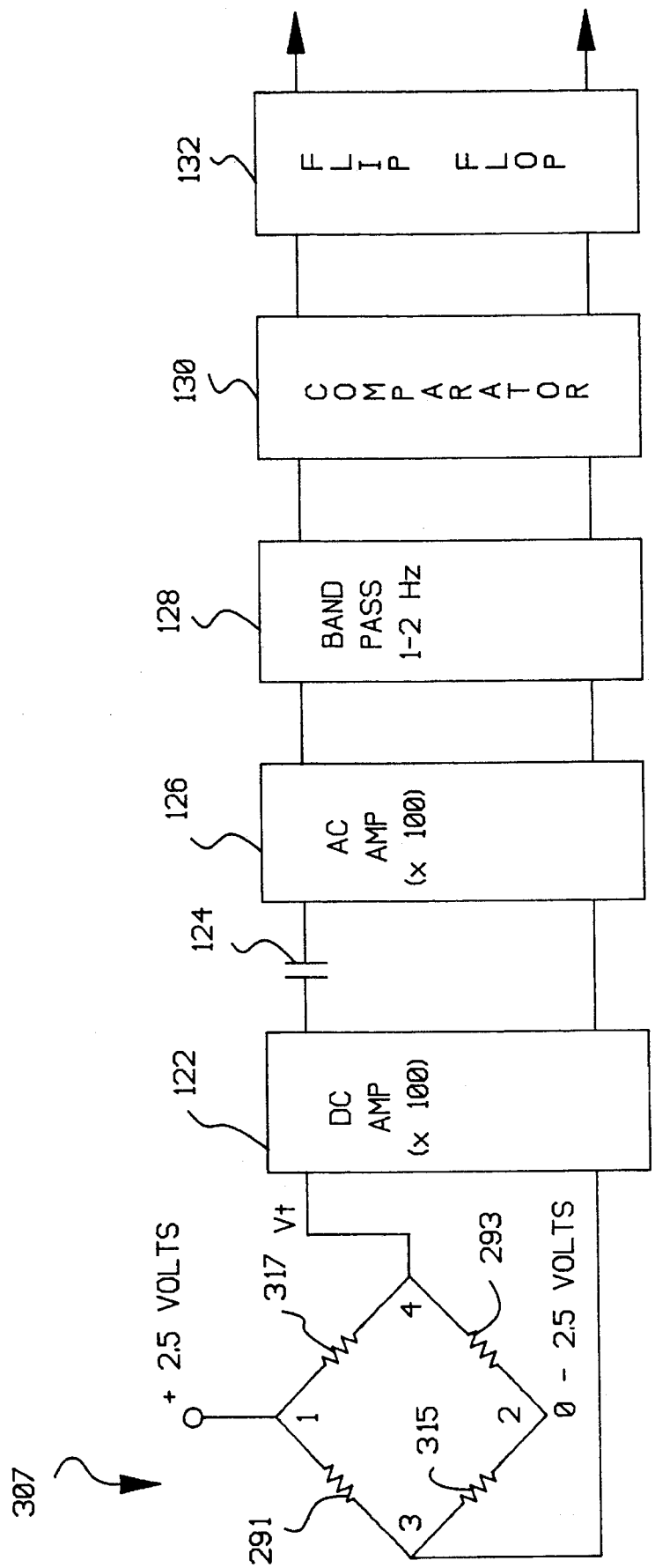
FIG. 7 is an electrical schematic representation of the strain-gage type reception apparatus, which is depicted in FIGS. 6, and includes a block diagram view of signal conditioning which is performed upon the output of the strain-gage type reception apparatus when it is utilized to sense rapid changes in fluid pressure amplitude in the fluid column which serves as a communication channel.

FIG. 7 is an electrical schematic view of an electrical circuit, which includes tangential bridge circuit 307. Tangential bridge circuit 307 includes four elements, two of which are used to detect stress, and two of which are used to complete the bridge circuit. Tangential bridge circuit 307 includes tangential strain sensor element 291 and tangential strain sensor element 293. In tangential half-bridge 307, tangential strain sensor 291 and tangential strain sensor 293 are placed opposite from one another in a "half-bridge" arrangement. Bridge completion resistors 315, 317 are placed in the remaining two legs of a full bridge circuit.

In FIG. 7, tangential strain sensors 291, 293 are represented as electrical resistive components. In the preferred embodiment, tangential strain sensor elements comprise Bonded Foil Strain Gages, manufactured by Micro Measurements, of Raleigh, N.C., further identified as Model No. SK-06-250BF-10c, with each element providing 1,000 ohms of electrical resistance to current flow. Likewise, bridge completion elements 315, 317 are depicted as electrical resistive elements. As shown, tangential strain sensor element 291 is coupled between nodes 1 and 3 of tangential bridge circuit 307. Tangential strain sensor 293 is coupled between nodes 2 and 4 of tangential bridge circuit 307. Bridge completion resistor 315 is coupled between nodes 2 and 3 of tangential bridge circuit 307. Bridge completion resistor 317 is coupled between nodes 1 and 4 of tangential bridge circuit 307. Positive 2.5 volts is applied to node 1 of tangential bridge circuit 307. Negative 2.5 volts is applied to node 2 of tangential bridge circuit 307.

Bridge completion resistors 315, 317 are not coupled to a conduit member 209. In fact, bridge completion elements 315, 317 do not sense any mechanical strain whatsoever. Instead, they are placed on carrier member 319 (not depicted) which is disposed within sensor cavity 67, and not subjected to any mechanical stress. They merely complete the bridge circuit.

The "active" tangential strain sensor elements 291, 293 will change electrical resistance in response to mechanical strain. Tangential strain sensor elements 291, 293, are bonded to the exterior surface of mandrel member 59, and experience stain when conduit member 209 is subjected to tangential stress. The voltage applied to nodes 1 and 4 cause current to flow in tangential bridge circuit 307. The resulting voltage developed between nodes 3 and 4 of tangential bridge circuit 307 is represented in FIG. 7 by $V_t$, which identifies the voltage representative of the tangential strain detected by tangential bridge circuit 307.

The voltage $V_t$ which is representative of the tangential strain detected by tangential bridge circuit 307 is then subjected to signal conditioning operations which are depicted in block diagram form in FIG. 7. In accordance with signal conditioning block 122, the voltage $V_t$ is subjected to DC amplification, preferably of one hundred gain. Capacitor 124 is utilized to AC couple signal conditioning block 122 with signal conditioning block 126. In signal conditioning block 126, the AC component is subjected to AC amplification of one hundred gain. The signal is then passed to signal conditioning block 128, which performs a bandpass operation to allow for the passage of signals in the range of one to two Hertz, but which blocks all other frequency components of the signal. The signal component in the range of one to two Hertz is then passed to signal processing block 130 which performs a comparison operation, preferably to identify rapid rates of change in the pressure amplitude which are greater than two hundred and fifty pounds per square inch per second.

The voltage amplitudes of various rate changes can be determined empirically through experimentation, by utilizing a test fixture to simulate a borehole and stepping through a plurality of known fluid pressure rate changes to determine corresponding voltage level of $V_{ref}$ for comparator 130. Essentially, signal processing block 130 operates to compare the voltage amplitude which is provided as an output from signal conditioning block 128 to a selected voltage threshold established by $V_{ref}$, which is representative of a rate of change which is equivalent to two hundred and fifty pounds per square inch per second. Amplitudes which exceed the reference voltage are determined to exceed the rate of change of two hundred and fifty pounds per square inch per second, and operate to switch the output of the comparator from a normally-low condition to a high condition. The output of signal processing block 130 is provided to signal conditioning block 132, which is preferably a flip-flop, which includes one or more output pins which change state as a result of detection of a transition at the output of signal conditioning block 130. The particular components of the signal conditioning operations will be discussed in greater detail herebelow in connection with FIG. 14.

Coded Messages

Figure 8:
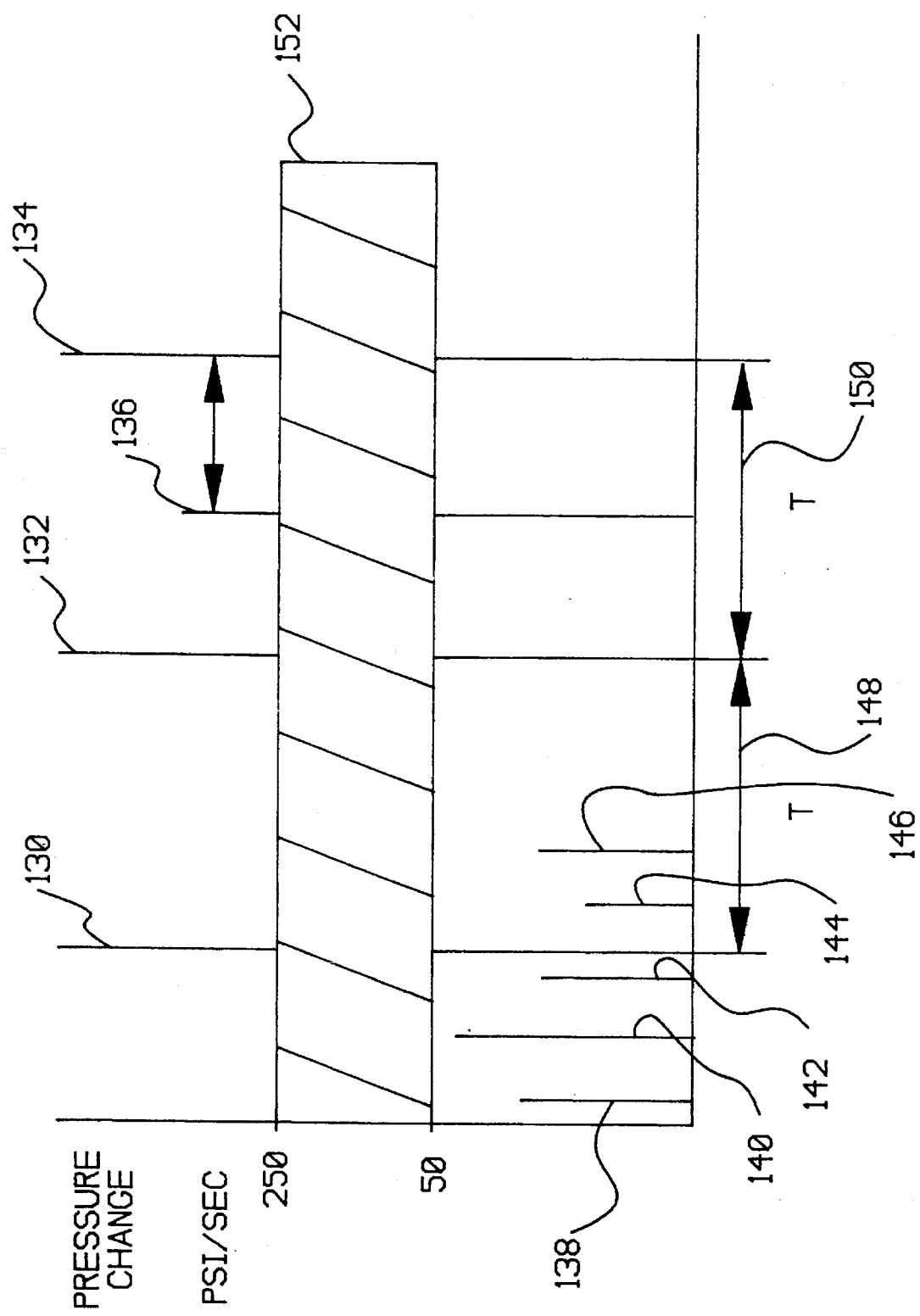
FIG. 8 is a graphical representation of the conditioned output of the pressure-transducer type reception apparatus, which depicts detected rapid changes of fluid pressure amplitude with respect to time, and includes the depiction of a coded message.

FIG. 8 is a graphical representation of the conditioned output of a pressure-transducer type of reception apparatus, which depicts detected rapid changes of fluid pressure amplitude with respect to time, and includes the depiction of a coded message; if a strain-gage type of reception apparatus is utilized, a similar conditioned output could be expected. In this figure, the x-axis is representative of time, in units of seconds; the y-axis is representative of detected pressure changes ("drops" if a negative pressure pulse technique is employed, and "rises" if a positive pressure pulse technique is employed) in units of pounds per square inch per second. In the preferred embodiment of the present invention, coded messages are represented by two discrete quantities: T, which represents the number of seconds between rapid pressure changes, plus or minus ten seconds; and N, the number of consecutive rapid pressure changes. In the preferred embodiment of the present invention, a rapid change in the pressure of fluid column 55 (of FIG. 1) must exceed 250 pounds per square inch per second in order to be considered an "event".

In FIG. 8, four such "events" are depicted, including: rapid pressure change 130, rapid pressure change 132, rapid pressure change 134, and rapid pressure change 136. Each of these rapid changes 130, 132, 134, 136 has a magnitude which far exceeds the two hundred and fifty pounds per square inch per second threshold established in the present invention. A plurality of other lesser pressure changes exist, including: pressure change 138, pressure change 140, pressure change 142, pressure change 144, and pressure change 146. Each of these pressure changes do not have a magnitude which is sufficient to be considered an "event" in the coding system of the present invention. Therefore, these lesser pressure changes are not identified as intentional, operator-generated pressure changes which constitute "events". They are more likely the result of slower pressure changes which may be accidental or operator initiated, but which are utilized to obtain some other engineering objective, and are not significant in communicating with the reception apparatus 53 (of FIG. 1), and do not constitute message segments of a coded message.

As stated before, in the preferred embodiment of the present invention, a coded message comprises a number of sequential events each occurring at a predetermined time. The x-axis of FIG. 8 is representative of time in seconds. As is shown therein, rapid pressure change 130 and rapid pressure change 132 are separated by a time interval 148 of "T" seconds (plus or minus ten seconds), thus satisfying one of the requirements for coded message segments. Likewise, rapid pressure change 132 and rapid pressure change 134 are separated in time by a time interval 150 of "T" seconds, and thus also satisfy the basic requirement for a message segment, and thus constitute components of a coded message. However, rapid pressure change 136, which satisfies the amplitude requirement for being a component of a coded message, fails insofar as it is not separated in time from adjoining rapid pressure changes by a time interval of "T" seconds, plus or minus ten seconds; accordingly, it does not constitute a component of a coded message, and is ignored by the reception apparatus 53. In FIG. 8, region 152 extends between pressure change amplitudes of fifty pounds per square inch per second and two hundred and fifty pounds per square inch per second, and constitutes a region for which the state of a detected pressure change is unknown. This region is inherent in the utilization of electrical and electronic components to detect rapid pressure changes, and constitutes an ample margin of safety to prevent false positives from occurring.

The Programming Terminal

Figure 9A:
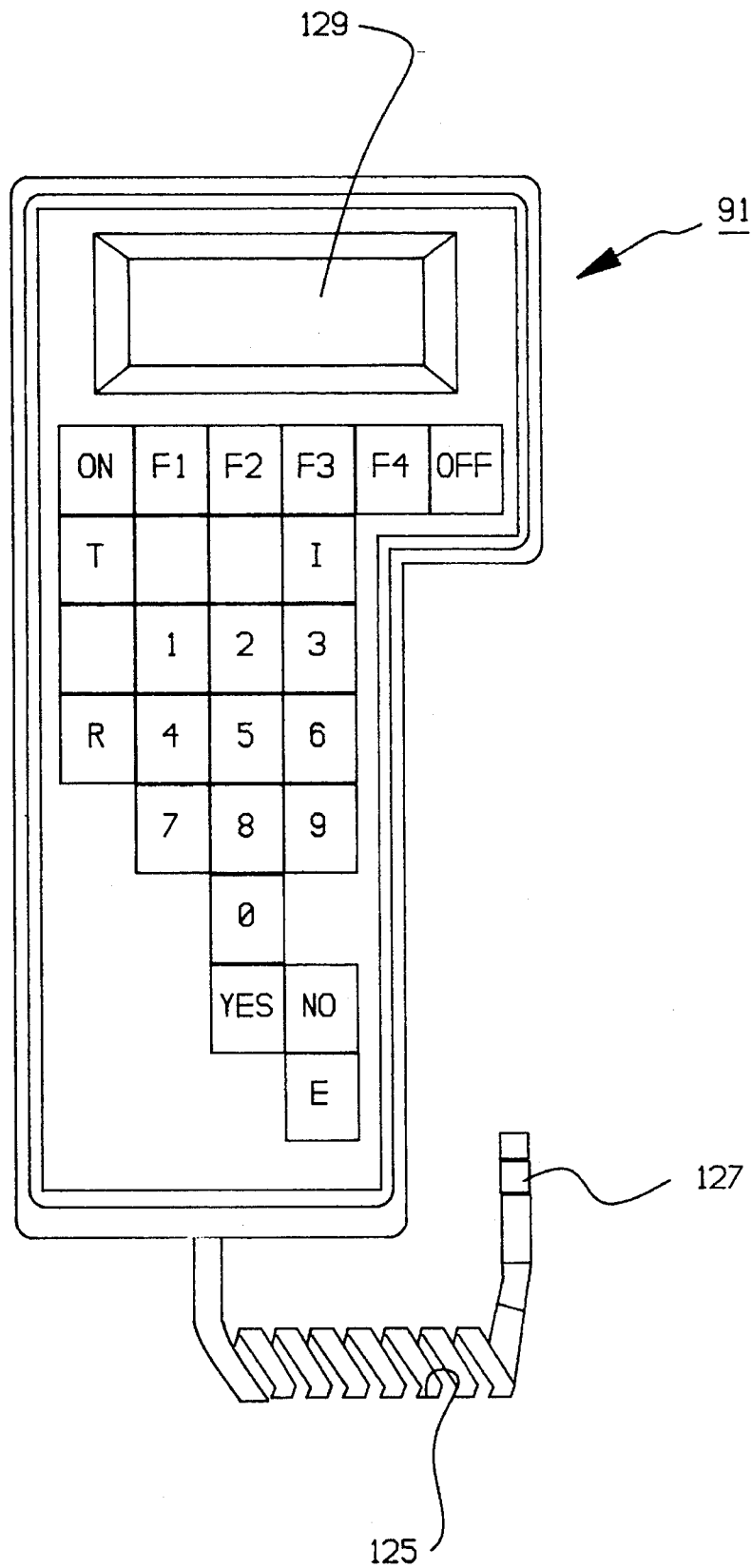
FIG. 9a is a pictorial representation of a programming terminal which is utilized to program the processor of the reception portion the wellbore communication apparatus and FIGS. 9b, 9c, and 9d are examples of the utilization of the display and keyboard to achieve bidirectional communication with the processor of the reception apparatus.

FIG. 9a is a pictorial representation of a programming terminal 91. In the preferred embodiment of the present invention, programming terminal 91 may be utilized in either a transmitting mode of operation or a receiving mode of operation. In the transmitting mode of operation, programming terminal 91 is utilized to produce a plurality of different ASCII characters. As is shown in FIG. 9a, a plurality of dedicated keys are provided with human-readable alphanumeric characters disposed thereon. The depression of a particular key by the human operator will result in the generation of a particular, predetermined ASCII character which is directed through electrical cord 125 and electrically connector 127 to reception apparatus 53. In a receiving mode of operation, programming terminal 91 is utilized to receive ASCII characters from receiver apparatus 53 through electrical cord 125. Programming terminal 91 includes a liquid crystal display (LCD) 129 which is utilized to present human readable alphanumeric text which contains useful information from reception apparatus 53. In the preferred embodiment of the present invention, programming terminal 91 is electrically connected to receiver apparatus 53 only during programming and testing operations. Programming terminal 93 is disconnected from reception apparatus 53 after it has been adequately programmed and tested. Thereafter, reception apparatus 53 is run into a desired location within a wellbore, and requires no further interaction with programming terminal 91 to perform its program functions.

As can be seen from FIG. 9a, programming terminal 91 includes a plurality of alphanumeric keys, including: an "ON" key and an "OFF" key which are utilized to turn programming terminal 91 on and off; an initialize key which carries the letter "I" which is utilized to enter a programming mode of operation during which reception apparatus 53 is programmed to respond to one or more particular coded messages, each coded message including message attributes (including the number of messages "events" N, and time between message "events" T); a test key which carries the character "T" which is utilized to test a variety of electrical characteristics of reception apparatus 53, as will be described herebelow in further detail; a read key which carries the character "R", and which is utilized to read data from reception apparatus 53 to allow confirmation of the programmed content of reception apparatus 53. Keys with the numeric characters 0 through 9 are also provided in programming terminal 91, as well as a "YES" key, a "NO" key, and an enter key which carries the character "E", all of which are utilized to respond to microprocessor generated queries displayed at LCD display 129.

In the preferred embodiment of the present invention, exchanges of information between the human operator and reception apparatus 53 are facilitated by a plurality of automatically generated prompts and operator queries. The "YES" key and the "NO" key can be utilized to confirm or deny the accuracy of a human operator entry at programming terminal 91. For example, if an operator accidentally enters an incorrect value during the programming mode of operation, the user prompt provides an opportunity to correct the error before receiver apparatus 53 is programmed.

Figure 9B:
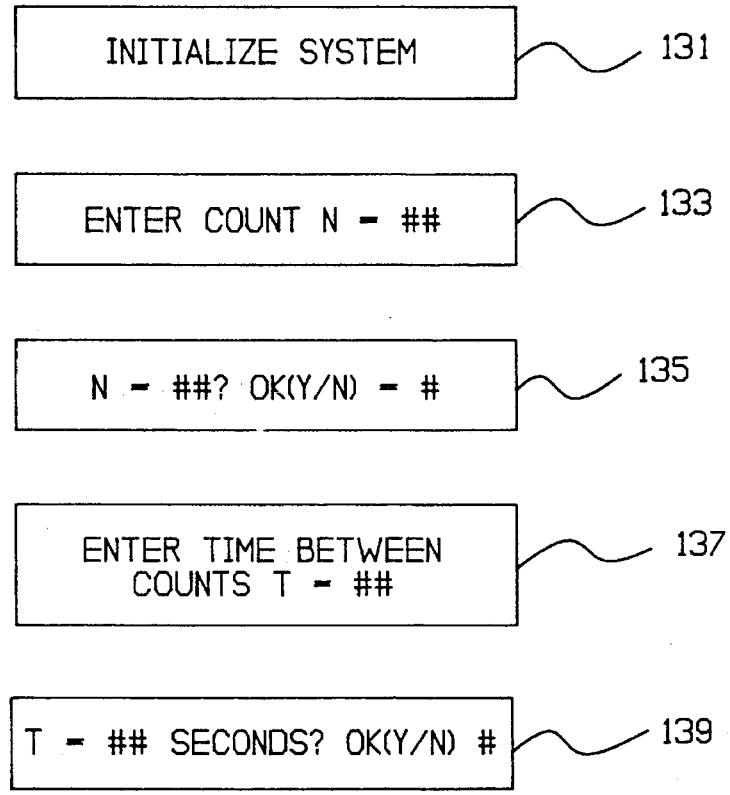
Figure 9C:
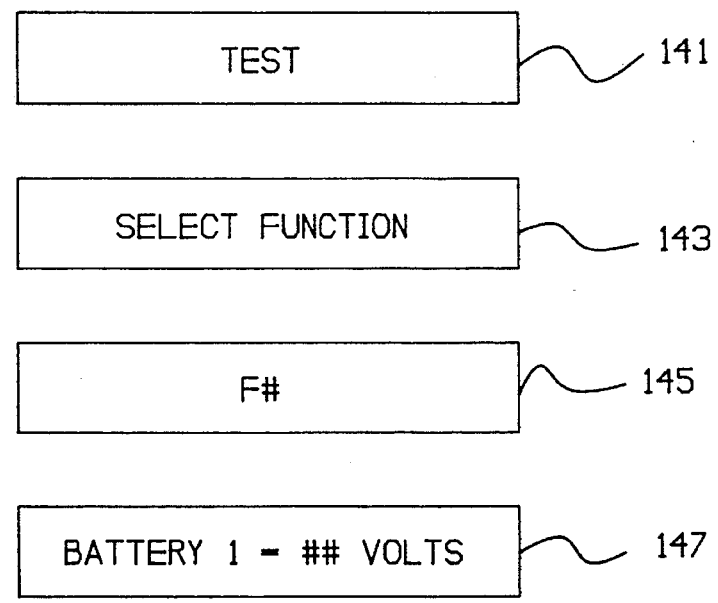
Figure 9D:
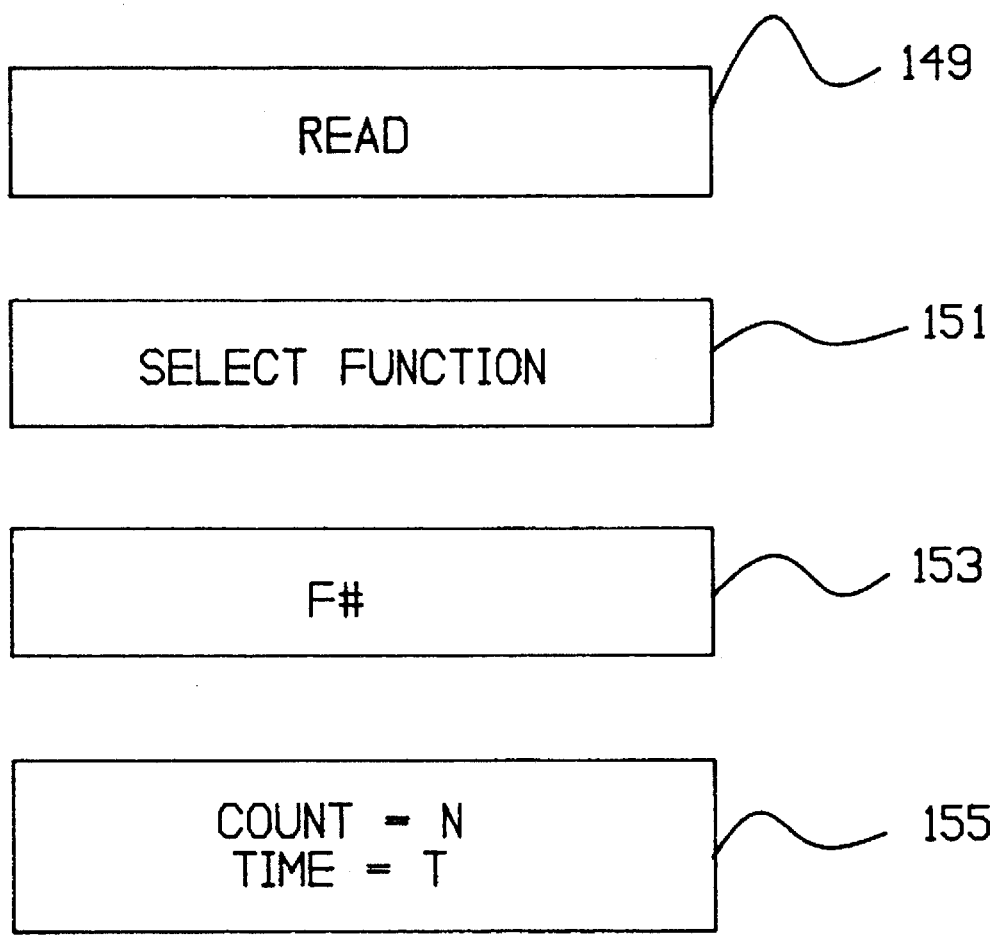

FIGS. 9b, 9c, and 9d provide graphic representation examples of the utilization of programming terminal 91 to program reception apparatus 53, to test particular functions of reception apparatus 53, and to read particular data from programming apparatus 53. FIG. 9b depicts the alphanumeric characters displayed in LCD display 129 during a programming mode of operation. Once the initialize key is depressed, LCD display 129 displays the message "initialize system" as depicted in block 131. The microprocessor within programming terminal 91 then provides the user prompt which is depicted in block 133 which prompts the user to enter the count "N", which corresponds to the number of sequential rapid pressure changes which identify a coded message. In accordance with block 135, the user then enters a number from the keypad of programming unit 91, and the LCD display 129 provides an opportunity for the user to delete an incorrect entry and provide a correct entry by prompting "OK (Y/N)", which prompts the user to depress either the "YES" key or the "NO" key. Then, in accordance with block 137, programming terminal 91 prompts the user to enter the time "T" between rapid pressure changes. The operator should respond by pressing particular ones of the numeric keys in programming terminal 91. In accordance with block 139, programming terminal 91 informs the user of his or her selection and prompts the user to depress the "YES" key or the "NO" key to confirm the accuracy of the entry.

In another embodiment, reception apparatus 53 can be preprogrammed with a plurality of predefined codes each of which is assigned a predetermined identifying numeral, to simplify the programming process. For example, the following identifying numerals can be assigned as follows:

| Identifying Numeral | N<br>Number of Events | T<br>Time Between Events<br>In Seconds |
| --- | --- | --- |
| 1 | 3 | 120 |
| 2 | 3 | 150 |
| 3 | 3 | 200 |
| 4 | 3 | 250 |
| 5 | 3 | 275 |
| 6 | 4 | 170 |
| 7 | 4 | 190 |
| 8 | 3 | 500 |
| 9 | 3 | 1000 |
| 10 | 3 | 2000 |

In this embodiment, the programming terminal should prompt the user to enter the identifying material which corresponds to a desired coded message.

FIG. 9c is a representation of a test operation. Alphanumeric display 129 displays the prompt "TEST" in response to the operator selection of the test key. In accordance with block 143, the operator is prompted to select a particular function for which the test is desired. The function keys F1, F2, F3, and F4 are predefined to correspond to a particular functions. In accordance with block 145, the operator selects a particular function. The microprocessor reads the data from reception unit 53 and displays it, in accordance with block 147.

In the preferred embodiment of the present invention, programming terminal 91 will provide the following diagnostic capabilities:

1. it will display the approximate battery life remaining on command from the user;
2. it will display the initialization variables on command from the user;
3. it will conduct an EEPROM Test on command from the user;
4. it will conduct a timer test on command from the user;

5. it will enable any igniter circuits on command from the user;

6. it will conduct a battery load test to verify that the batteries are capable of supplying the necessary current to ignite the actuation system;

7. it will determine if any of the igniters in the actuation system are open;

8. it will display a ROM Check Sum on command from the user; and 9. it will display an EEPROM Check Sum on command from the user.

FIG. 9d is a representation of a read operation, which is initiated by depressing the read key. LCD display 129 displays a prompt to the user that the read mode of operation has been entered, as depicted in block 149. Next, in accordance with block 151, the user is prompted to select a particular function. Once again, the functions keys F1, F2, F3, and F4 are preassigned to particular data which may be accessed through a read operation. The operator enters a particular function, as depicted in block 153. Then, in accordance with block 155, the LCD display provides an alphanumeric representation of the particular data requested by the operator. In the case shown in FIG. 9d, the LCD display 129 displays the number of counts N programmed for the particular reception apparatus 53, and the time interval T designated by the operator as being required between successive rapid changes in pressure. This is depicted in block 155.

In the preferred embodiment of the present invention, programming terminal 91 is a hand-held bar code terminal which is manufactured by Computerwise of Gathe, Kans., and which is further identified by Model No. TTT-00. It may be programmed for particular functions in accordance with instructions provided by the manufacturer. In the present invention, it is customized by the addition of an interface circuit which will be described in detail in FIGS. 10a, 10b, and 11.

Overview of the Reception Apparatus

Figure 10A:
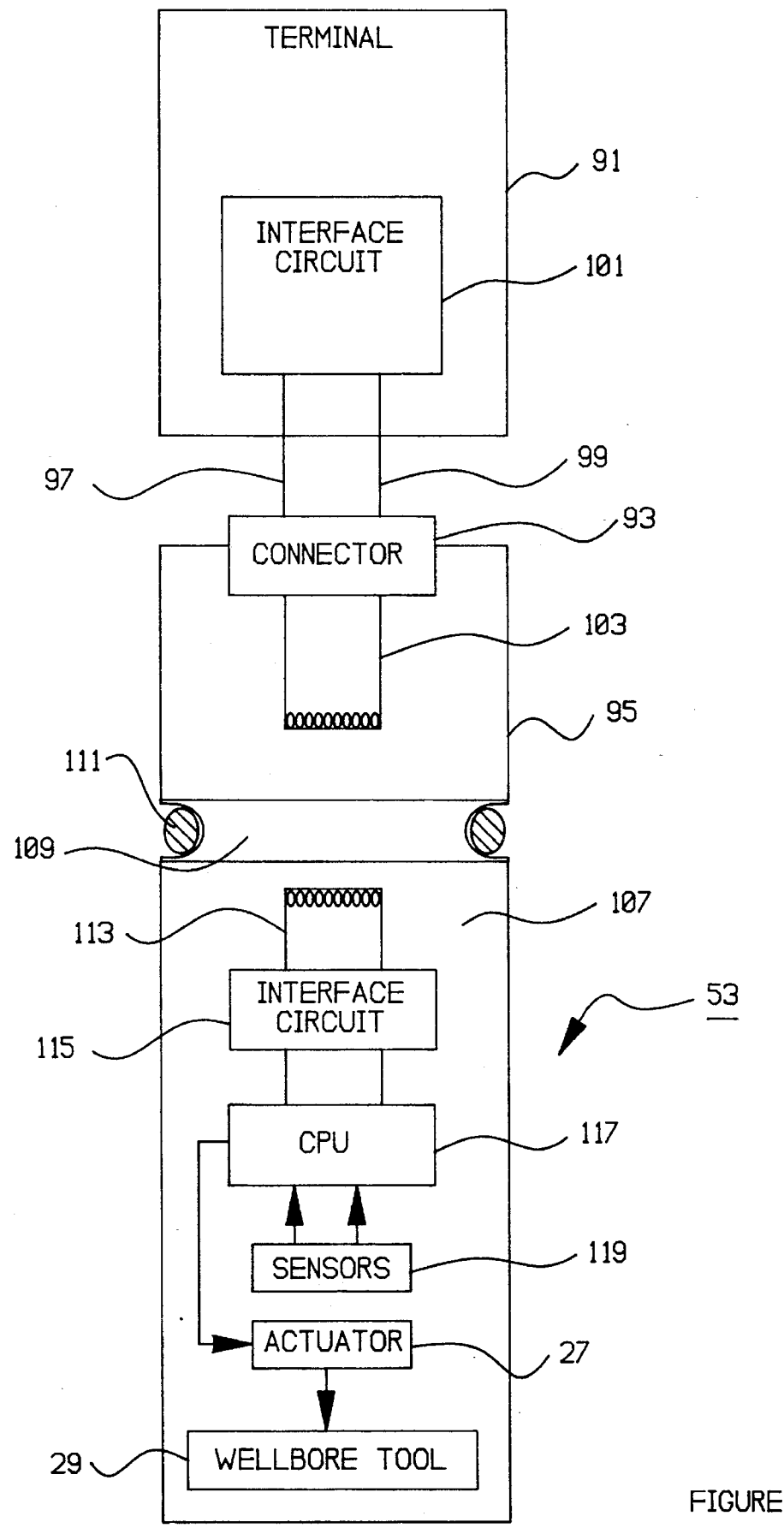
FIG. 10a is a simplified block diagram representation of a magnetic interface which facilitates communication between the programming terminal and the processor of the reception apparatus, without requiring a direct electrical connection.

FIG. 10a is a block diagram view of reception apparatus 53, actuator 27, and wellbore tool 29, disposed within housing 95, and releasably electrically coupled to programming terminal 91. As is shown, programming terminal 91 includes interface circuit 101 which is electrically connected by electrical connectors 97, 99 to connector 93 which is carried by housing 95. As is shown, connector 93 allows for the electrical connection between interface circuit 101 and electromagnetic coil 103. Electromagnetic coil 103 is separated from chamber 107 by barrier 109 which includes seal 111 which serves to prevent the leakage of fluid into chamber 107 which includes delicate electronic instruments which may be easily damaged by moisture. Electromagnetic coil 113 is disposed within chamber 107. Electromagnetic coils 103, 113 are utilized to transmit information across barrier 109, allowing an operator to program central processing unit 117 to respond to particular coded messages through the utilization of programming terminal 91, and to allow programming terminal 91 to be utilized to receive information from central processing unit 117. As is shown in FIG. 10a, interface circuit 115 is provided between electromagnetic coil 113 and central processing unit 117. Sensor(s) 119 provide data to central processing unit 117. Central processing unit 117 continuously analyzes data provided by sensor(s) 119, and provides an actuation signal to actuator 27 upon recognition of a coded message which it is programmed to respond to during a programming mode of operation. Actuator 27 in turn actuates wellbore tool 29 to perform a wellbore operation. Wellbore tool 29 may be a packer, perforating gun, valve, liner hanger, or any other conventional wellbore tool which may be utilized to accomplish an engineering objective during drilling, completion, and production operations.

Figure 10B:
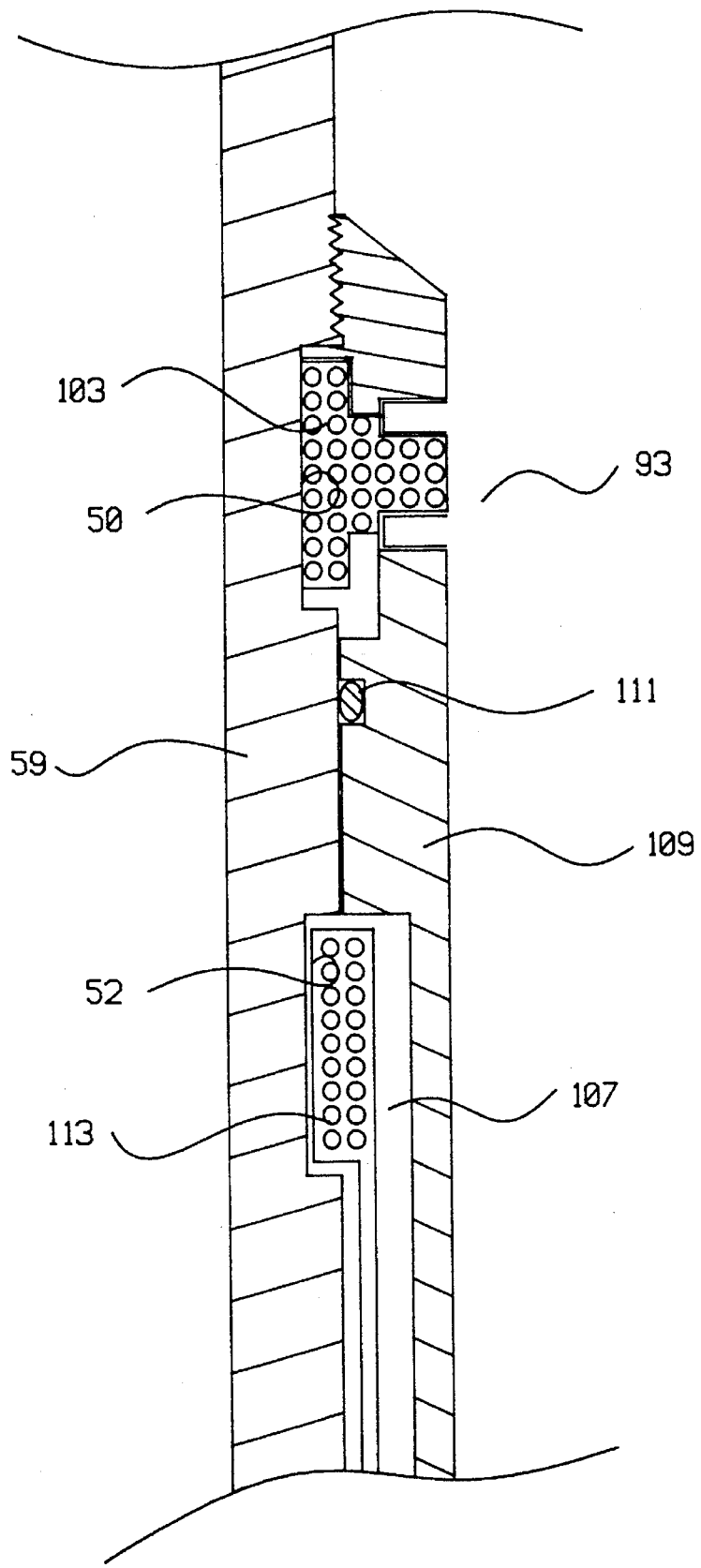
FIG. 10b is a simplified partial longitudinal section view of the magnetic circuit component of the magnetic interface.

FIG. 10b is a simplified and partial longitudinal section view of wellbore communication apparatus 11, and depicts the interaction of electromagnetic coil 103 and electromagnetic coil 113. As is shown, mandrel member 59 includes recessed region 50 which is adapted to receive the windings of electromagnetic coil 103. In this figure, connector 93 is depicted in simplified form; it allows the releasable electrical connection with programming terminal 91. Mandrel member 59 further includes recessed region 52 which is adapted for receiving the windings of electromagnetic coil 113. Seal 111 is disposed in a position intermediate electromagnetic coil 103 and electromagnetic coil 113, and is carried by barrier 109 which at least partially defines a housing which surrounds chamber 107. As is shown, electromagnetic coil 113 is disposed within the sealed chamber 107, while electromagnetic coil 103 is disposed exteriorly of the sealed chamber 107. In this configuration, mandrel member 59 operates as the core of a transformer. Electrical current which passes through electromagnetic coil 103 generates a magnetic field within the ferromagnetic material of mandrel member 59 (mandrel member 59 is typically formed of oil-field grade steel). This magnetic field passes through mandrel member 59 and induces a current to flow within the windings of electromagnetic coil 113. In this manner, the windings of electromagnetic coils 103, 113 and mandrel member 59 together form a magnetic circuit component which incorporates the structural ferromagnetic component 59 in a manner which facilitates communication across seal 111 and barrier 109 without having direct electrical connection therebetween. These components together cooperate as a "transformer" with a gain of approximately one. When communication is desired in the opposite direction, electrical current is passed through the windings of electromagnetic coil 113. This causes a magnetic flux to flow through the ferromagnetic material of mandrel member 59. The magnetic flux passing through mandrel member 59 causes a current to be generated in the windings of electromagnetic coil 103. The electrical current is directed outward through connector 93 to programming terminal 91.

The Magnetic Interface Terminal of the Programming Unit

Figure 11:
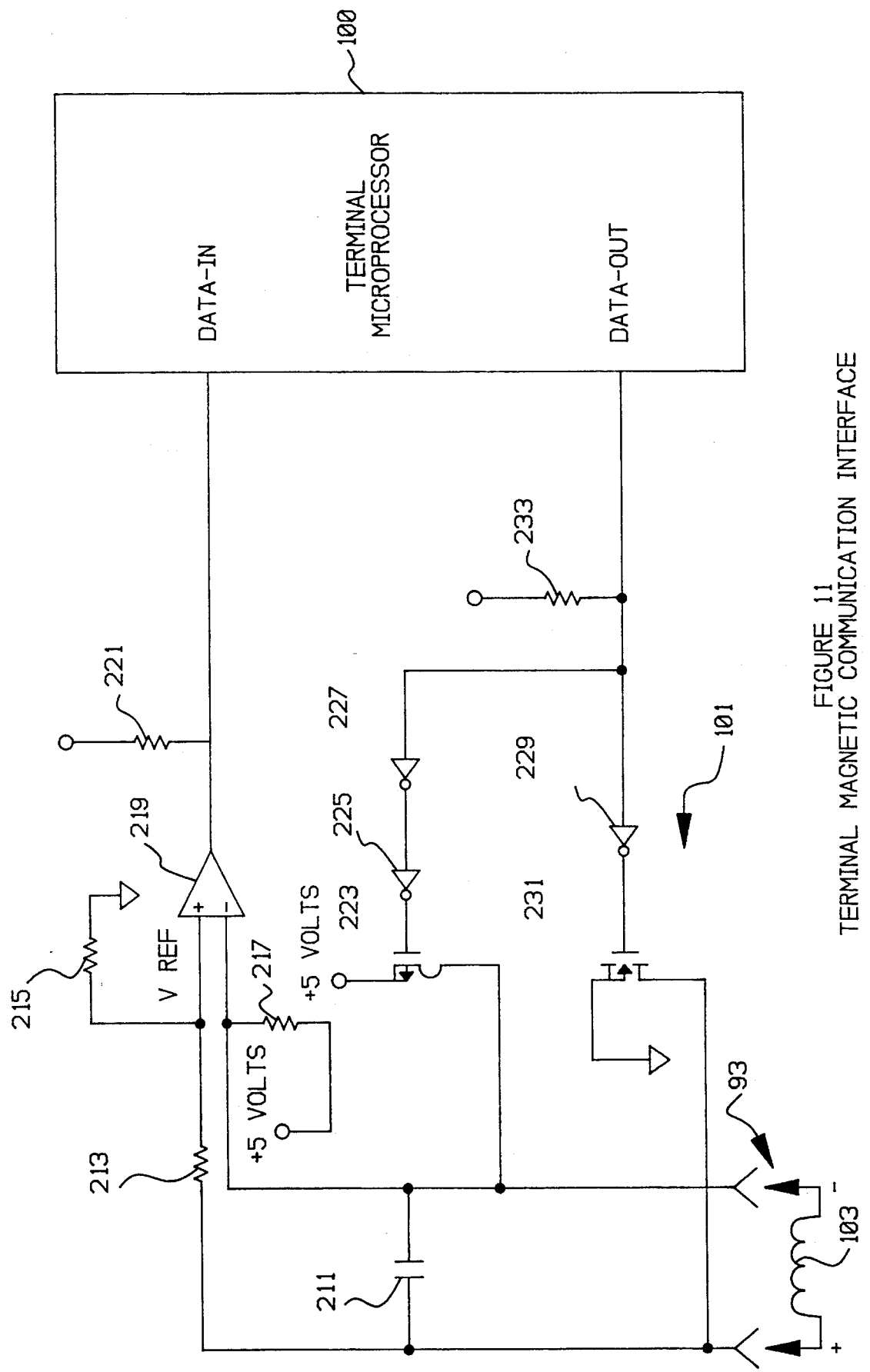
FIG. 11 is an electrical schematic of the interface circuit of the programming terminal.

FIG. 11 is an electrical schematic depiction of interface circuit 101 of programming terminal 91, which is coupled to terminal microprocessor 100 at DATA-IN pin and DATA-OUT pin. The passage of current through electromagnetic coil 113 (of FIG. 10a) generates an electromagnetic field which causes the development of a voltage across electromagnetic coil 103. Snubber capacitor 211 allows electromagnetic coil 103 to change its voltage level more rapidly, but also limits the voltage across electromagnetic coil 103. As shown, a voltage of slightly less than five volts is applied to the non-inverting input of operational amplifier. The inverted voltage which is developed across electromagnetic coil 103 is also provided to the non-inverting input of operational amplifier 219. Operational amplifier 219 is configured to operate as a positive voltage level detector. As such, the output of operational amplifier 219 remains high, for so long as the voltage provided at the non-inverting input of operational amplifier 219 exceeds the small voltage $V_{ref}$ which is supplied to the inverting input of operational amplifier 219. The reference voltage $V_{ref}$ which is applied to the inverting input of operational amplifier 219 is established by selection of the resistance values for resistor 217, resistor 213, and resistor 215. As is shown in FIG. 11, five volts is applied to one terminal of resistor 217; this five volts causes a small current to flow through resistors 217, 213, and 215, establishing the reference voltage $V_{ref}$ at the inverting input of operational amplifier 219. When the sum of voltages applied to the non-inverting input of operational amplifier 219 falls below the voltage level of the voltage applied to the inverting input of operational amplifier 219, the output of operational amplifier 219 goes from high to low, and is detected by terminal microprocessor 100 at the DATA-IN pin.

The DATA-OUT pin of terminal microprocessor 100 may be utilized to selectively energize electromagnetic coil 103 to communicate a binary stream of ASCII characters to electromagnetic coil 113 (of FIG. 10a) and interface circuit 115 (of FIG. 10a). As is shown in FIG. 11, the output of the DATA-OUT pin of terminal microprocessor 100 is applied through inverter 229 to field effect transistor 231. The output of the DATA-OUT pin of terminal microprocessor 100 is also applied through inverters 227, 225 to field effect transistor 223. Field effect transistor 223 is a P-channel field effect transistor, but field effect transistor 231 is an N-channel field effect transistor. When the DATA-OUT pin of terminal microprocessor 100 goes high, field effect transistors 223, 231 switch on, allowing the five volts DC (which are applied to one input of field effect transistor 223) to be applied across electromagnetic coil 103, to cause an electromagnetic field to be generated which is detected by electromagnetic coil 113 (of FIG. 10a). A stream of binary ASCII characters may be provided as a serial output of terminal microprocessor 100 at the DATA-OUT pin. The binary characters cause the selective application of voltage to electromagnetic coil 103, which is detected by electromagnetic coil 113. Interface circuit 115 (of FIG. 10a) is utilized to reconstruct the serial binary character string which is representative of ASCII characters.

Detailed Description of the Reception Apparatus

Figure 12A:
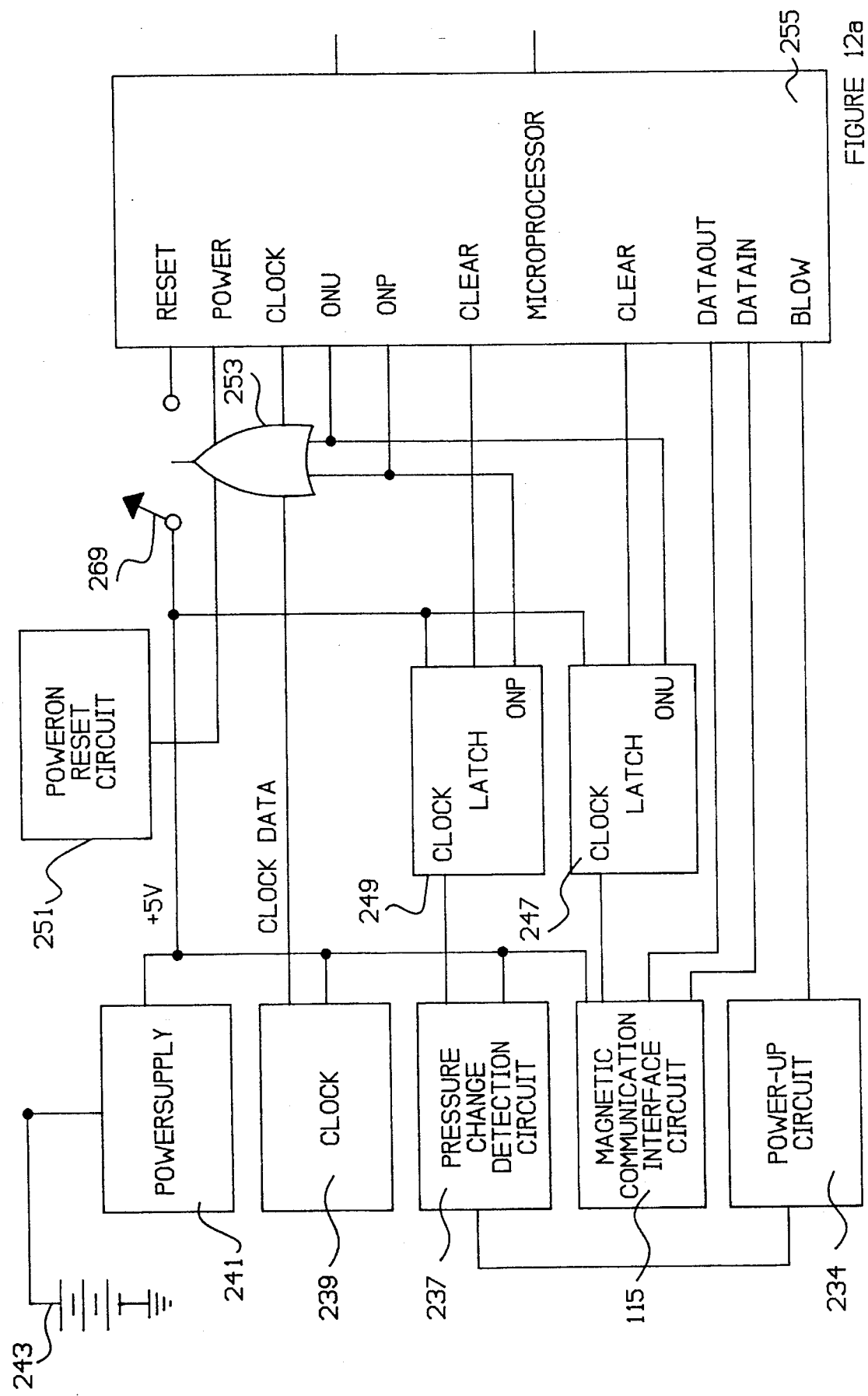
FIGS. 12a and 12b is an electrical schematic and block diagram view of the electronic and processor components of the reception portion of the wellbore communication apparatus of the present invention.
Figure 12B:
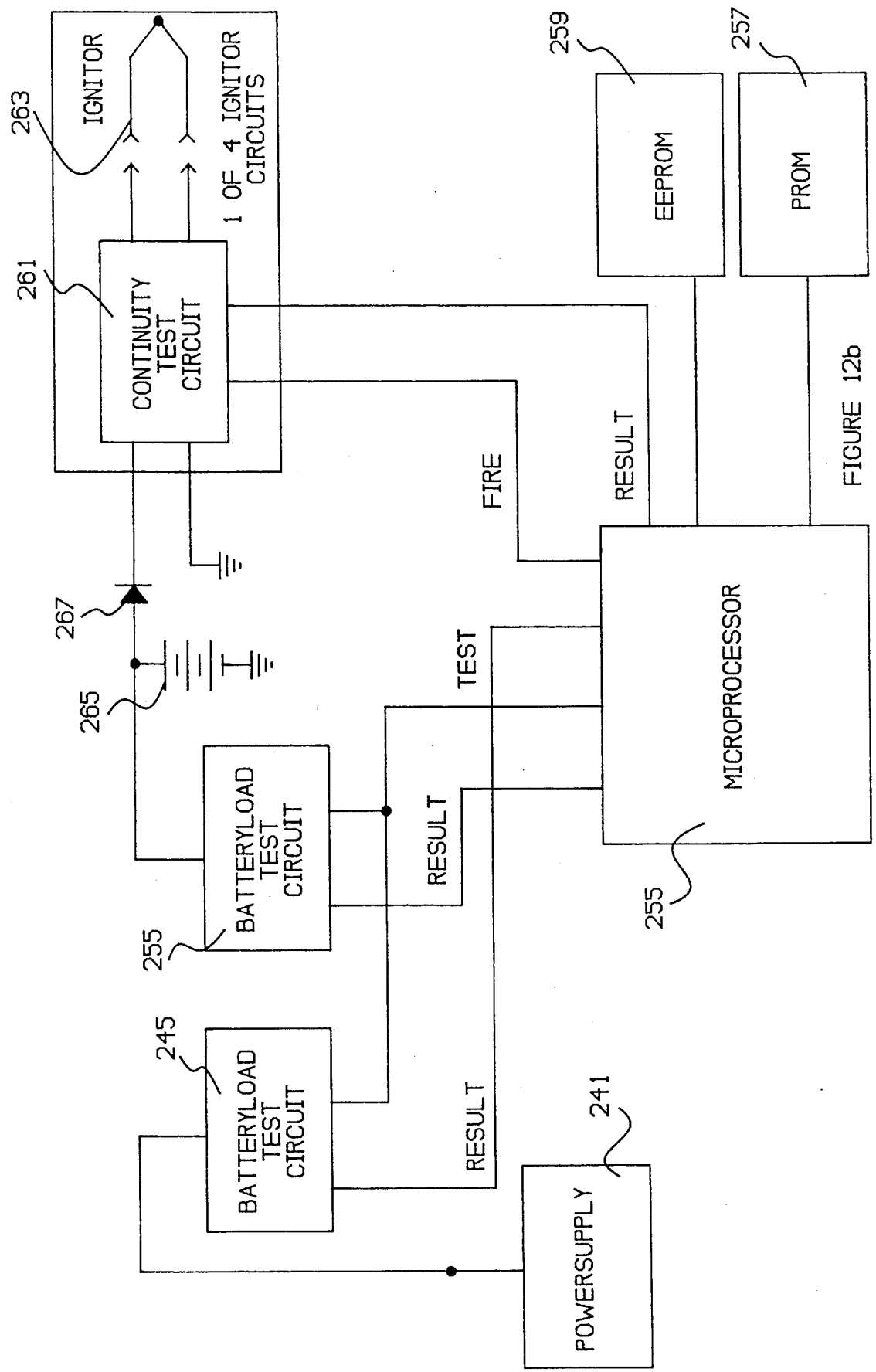

FIGS. 12a and 12b is a block diagram depiction of the electrical components which cooperate together to perform the operations of reception apparatus 53. FIGS. 13 through 18 provide detailed electrical schematic views of various components of the block diagram view of FIGS. 12a and 12b. As is shown in FIGS. 12a and 12b, microprocessor 255 interfaces with a plurality of electrical components. Clock 239 provides a clock signal for microprocessor 255. EEPROM 259 provides an electrically-erasable memory space which is utilized to record information provided by the operator during the programming mode of operation (such as the initialization variables N and T). EEPROM 259 is also utilized to provide a memory buffer for recording the occurrence of rapid changes in pressure which are detected by pressure change detection circuit 237. PROM 257 is utilized to store a computer program which is executed by microprocessor 255. The flowcharts of FIGS. 19a through 19kk provide a visual representation of the program which is stored in PROM 257.

Also, as is shown in FIGS. 12a and 12b, microprocessor 255 communicates through dedicated pins to battery load test circuit 245 and battery load test circuit 255 to test the condition of batteries 243, 265 during a test mode of operation. Microprocessor 255 communicates with continuity test circuit 261 to test for open circuits in igniter 263.

Microprocessor 255 either (1) receives information through either pressure change detection circuit 237, which is utilized to detect rapid changes in fluid pressure which may comprise components of a coded message, or (2) receives and transmits information through magnetic communication interface circuit 215 during initialization of the system, testing of system components, or reading operations, all of which are performed through utilization of programming terminal 91. Pressure change detection circuit 237 communicates with microprocessor 255 through latch 249, which is preferably a flip-flop. The ONP terminal of latch 249, is provided as an input to the ONP terminal of microprocessor 259. Magnetic communication interface circuit 115 likewise communicates with microprocessor 255 through latch 247, which is also preferably a flip-flop. The ONU terminal of latch 247 communicates with the ONU terminal of microprocessor 255. Magnetic communication interface 115 also communicates with microprocessor 255 through DATA-OUT pin and DATA-IN pin to transmit serial binary data streams which are representative of ASCII characters. In addition, microprocessor 255 utilizes CLEAR pins to change the output condition of latches 247, 249, as will be discussed in further detail herebelow.

In the preferred embodiment of the present invention, no power is provided to microprocessor 255 until a signal is received at either pressure change detection circuit 237 or magnetic communication interface circuit 115; once such a signal is received, power is supplied to microprocessor 255. For the pressure change detection circuit 237, detection of a rapid pressure change (in the present case, a rise or fall in pressure which exceeds the rate of 250 pounds per square inch per second) results in power being provided to microprocessor 255. For the magnetic communication interface 115, the detection of a binary character from electromagnetic coil 103 (of FIGS. 10 and 11) results in power being supplied to microprocessor 255. Thus there are two ways to cause in power to be provided to microprocessor 255.

Latches 247, 249 are utilized as one bit memory devices which record the origin of the event which results in power being provided to microprocessor 255. If the ONP terminal of latch 249 is high, a change in pressure, as detected by pressure change detection circuit 237, caused power to be provided to microprocessor 255. If the ONU terminal of latch 247 is high, the receipt of a binary character at magnetic communication interface circuit 115 caused power to be provided to microprocessor 255. As can be seen from FIGS. 12a and 12b, the ONP terminal and the ONU terminal are provided as inputs to or-gate 253. If either one of the ONP terminal or the ONU terminal go high, or-gate 253 goes high, causing the closure of electrically-actuated switch 269 which results in five volts being applied to the reset input pin of microprocessor 255. Simultaneously, power-on reset circuit 251 is utilized to provide power to the power input of microprocessor 255.

In this manner, batteries 243, 265 may be preserved, since power is not applied to microprocessor 255 until an indication is received at either pressure change detection circuit 237, or magnetic communication interface circuit 115, that communication with microprocessor 255 is desired. As will be discussed in further detail herebelow in connection with the flowchart representation of the program resident in PROM 257, microprocessor 255 is programmed to turn itself off if no data is communicated through either pressure change detection circuit 237 or magnetic communication interface circuit 115 after a predetermined time interval has lapsed from the provision of power to microprocessor 255. Of course, power should always be provided to pressure change detection circuit 237 and magnetic communication interface circuit 115. As is shown in FIGS. 12a and 12b, the CLEAR terminals of microprocessor 255 are utilized to reset latches 247, 249 to place them in condition for determining the source of the application of power to microprocessor 255. The CLEAR outputs of microprocessor 255 are utilized to return the ONP or ONU terminal to a low condition, prior to microprocessor 255 terminating power to itself after the lapse of a predetermined interval during which no communication occurs through either pressure change detection circuit 237 or magnetic communication interface circuit 115. Power-up circuit 234 is provided to further conserve energy by preventing the powering of pressure change detection circuit 237 until microprocessor 255 has been "initialized" to recognize a particular coded message.

Viewed broadly, the present invention has a power saving feature which is carried by the reception apparatus which includes a plurality of power-consuming electrical components. During a communication mode of operation, at least a portion of the power-consuming electrical components are maintained in an off condition until at least one change in a fluid column attribute is detected by the reception apparatus. The reception apparatus further includes means for receiving signals from a programming unit during a programming mode of operation. At least a portion of the power-consuming electrical components of the reception apparatus are maintained in an off condition until at least one signal is received from the programming unit.

In the preferred embodiment of the present invention, the power-consuming components of the reception apparatus are only provided with power for so long as certain preconditions are satisfied. During the communication mode of operation, many power-consuming electrical components are returned to an off condition if at least one of the following conditions occur:
(1) rapid pressure changes in the fluid column fail to conform to the operator-selectable number of consecutive changes which have been preprogrammed into the reception apparatus; or
(2) rapid pressure changes in the fluid column fail to conform to the operator-selectable time between consecutive changes which is preprogrammed into the reception apparatus.

Also, during the programming mode of operation, many power-consuming electrical components are maintained in an off condition until communication from the programming unit is received. During the programming mode of operation, many power-consuming electrical components are returned to the off condition if no signals are received from the programming unit for a predetermined time interval.

These power-saving features will be discussed in greater detail herebelow in connection with the description of the computer program which is resident in memory in the reception apparatus.

The Magnetic Communication Interface of the Reception Apparatus

Figure 13A:
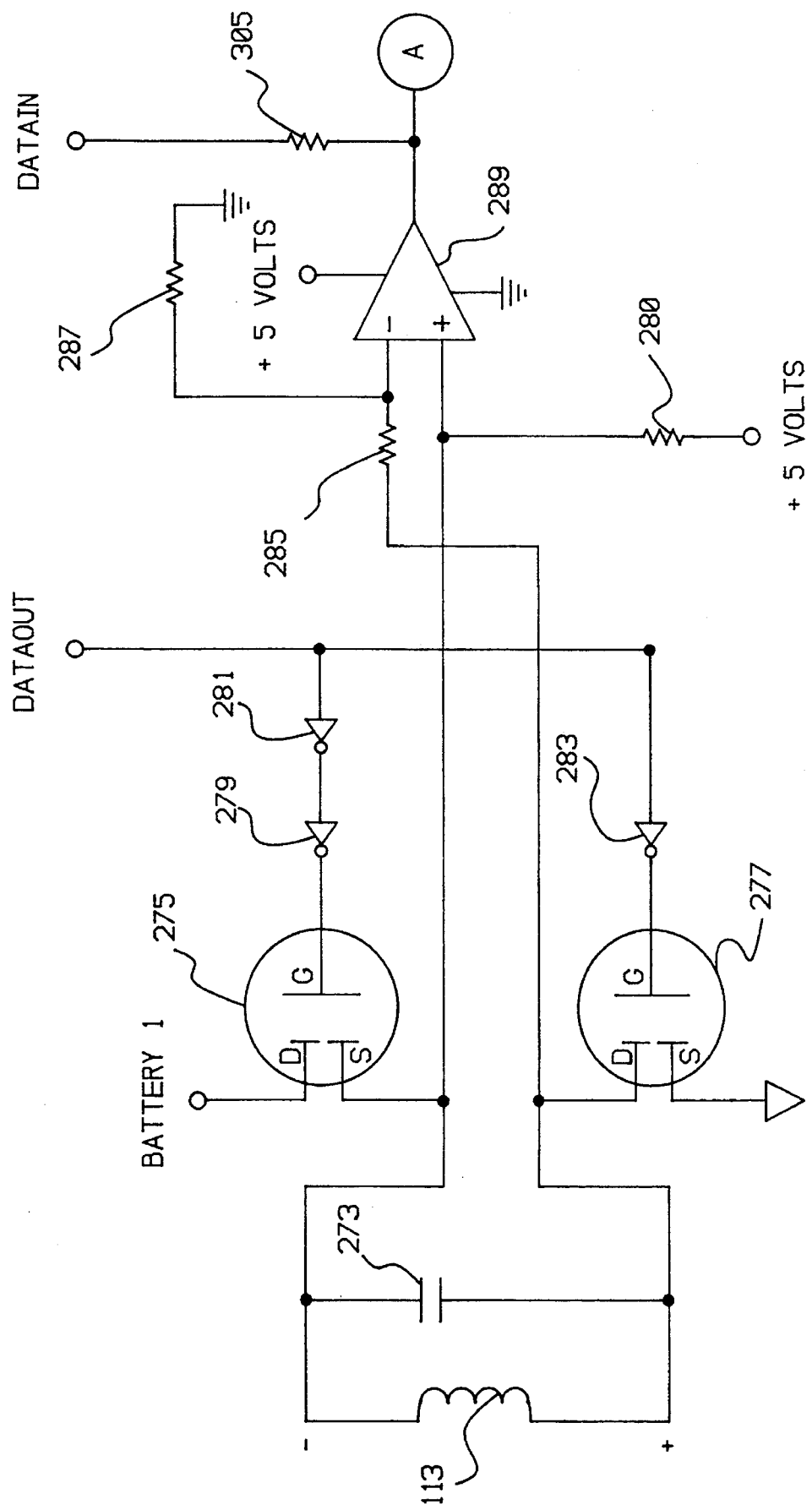
FIGS. 13a and 13b is an electrical schematic of the magnetic communication interface of FIGS. 12a and 12b.
Figure 13B:
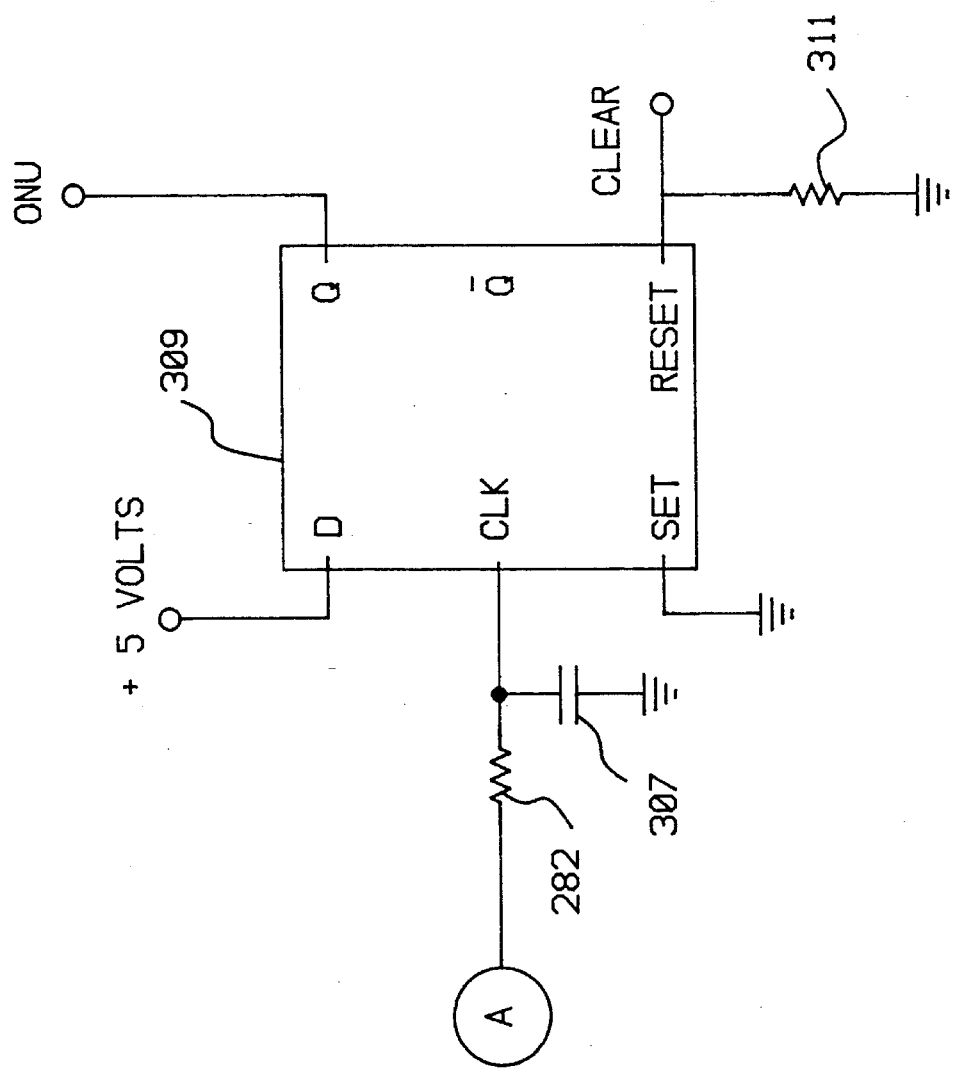

FIGS. 13a and 13b are an electrical schematic depiction of magnetic communication interface circuit 115, which receives signals from electromagnetic coil 103, which is part of programming terminal 91. The voltage which is developed across electromagnetic coil 113 is applied to operational amplifier 289, which is operated as a positive voltage level comparator. Positive five volts DC is applied through resistor 280 to the non-inverting input of operational amplifier 289. The inverse of the voltage which is developed across electromagnetic coil 113 is also applied to the non-inverting input of operational amplifier 289. A small DC current flows through resistor 280, electromagnetic coil 113, resistor 285, and resistor 287, to ground. The voltage developed across resistor 287 is applied to the inverting input of operational amplifier 289. When a digital signal is received, the voltage developed across electromagnetic coil 113 is subtracted from the slightly less than five volts applied to the non-inverting input of operational amplifier 289, causing the voltage detected at this input to decrease and eventually fall below the voltage level applied to the inverting input of operational amplifier 289. As a consequence, the normally-high output of operational amplifier 289 switches low for the duration of the binary signal received by electromagnetic coil 113. This voltage is applied through resistor 305 to the DATA-IN terminal of microprocessor 255. Additionally, the voltage is passed through the low-pass filter established by resistor 282 and capacitor 307 to the CLOCK input of flip-flop 309, causing the Q output of flip-flop 309 to go from a normally-low state to a high state. As is shown in FIGS. 13a and 13b, the Q output of flip-flop 309 is supplied to the ONU terminal of microprocessor 255. As will be discussed in greater detail herebelow, the CLEAR output of microprocessor 255 may be utilized to reset flip-flop 309 and cause the output of the Q pin to go from high to low.

The magnetic communication interface circuit 115 also allows microprocessor 255 to transmit a serial stream of binary bits, which are representative of ASCII characters, through electromagnetic coil 113. The binary character string is applied to the magnetic communication interface circuit 115 through the DATA-OUT pin of microprocessor 255. A binary zero which is applied to the DATA-OUT pin of microprocessor 255 causes a binary zero to be applied to the gate of N-channel field effect transistor 275, and a binary one to be applied to the gate of P-channel field effect transistor 277, allowing current to flow from BATTERY 1 through field effect transistor 275, inductor 113, field effect transistor 277 to ground. The passage of current through electromagnetic coil 113 creates an electromagnetic field which may be detected by electromagnetic coil 103 (of FIG. 10a and FIG. 11). The application of a binary one to the DATA-OUT pin of microprocessor 255 prevents the passage of current through field effect transistors 275, 277, thus preventing the passage of current through electromagnetic coil 113 and preventing the generation of an electromagnetic field. In this manner, a binary zero is represented by the creation of an electromagnetic field at electromagnetic coil 113, while a binary one is represented by the absence of an electromagnetic field at electromagnetic coil 113. The sequential presence or absence of the electromagnetic fields at electromagnetic coil 113 represents a serial binary data stream, which may be detected by electromagnetic coil 103 (of FIGS. 10 and 11) and which may be reconstructed by interface circuit 101 (of FIGS. 10 and 11) and directed to the terminal microprocessor 100 (of FIG. 11).

The Pressure Change Detection Circuit

Figure 14A:
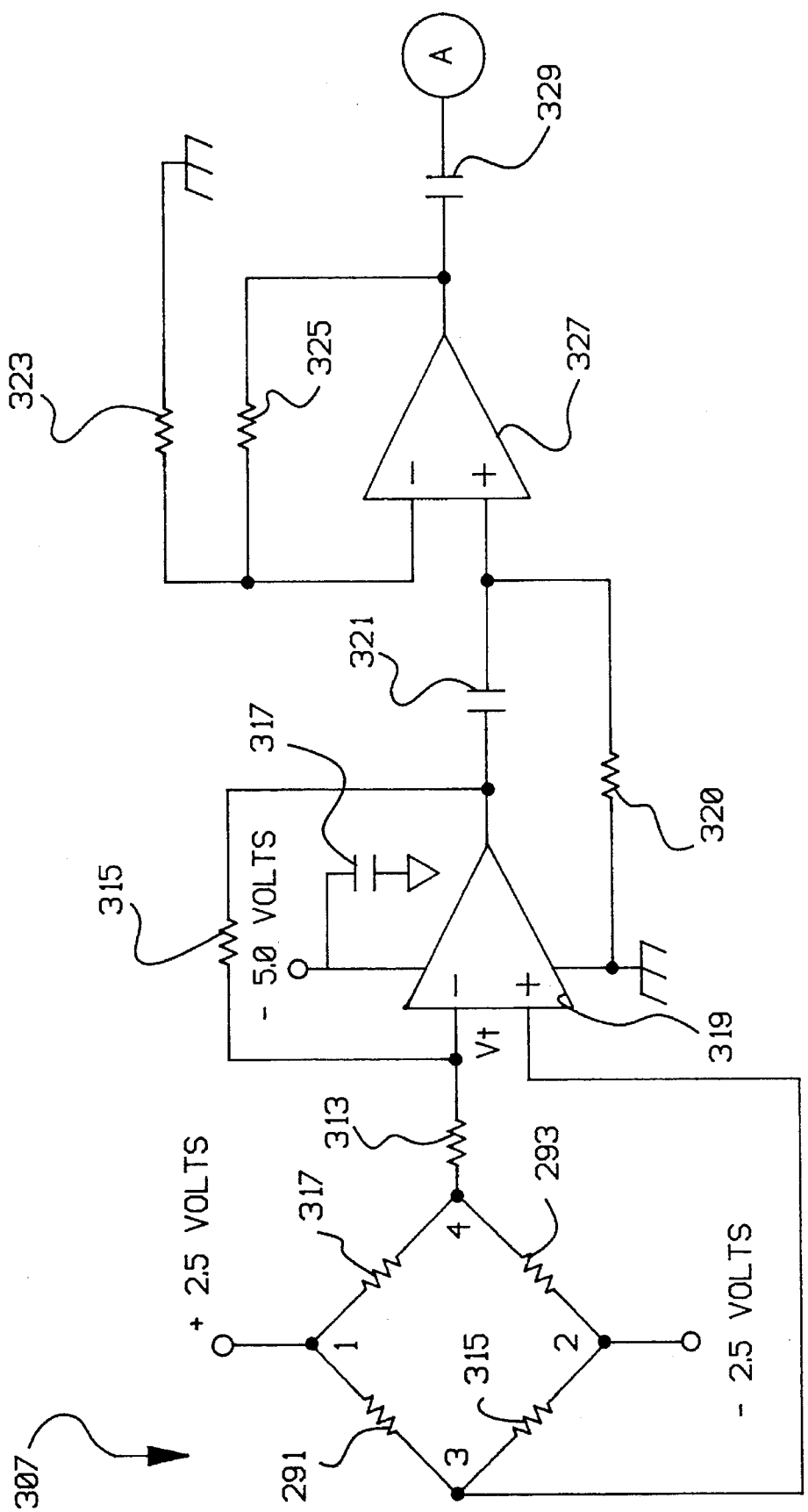

FIGS. 14a and 14b are an electrical schematic depiction of pressure change detection circuit 237 of FIGS. 12a and 12b, coupled to tangential bridge circuit 307, which was discussed in considerable detail above in connection with FIG. 7. As is shown in FIGS. 14a and 14b, $V_t$, the voltage which is representative of the tangential strain, is applied between the inverting and non-inverting inputs of operational amplifier 319, which is operated as a differential DC amplifier, with a gain of approximately 100, as determined by the selection of the resistance values for resistor 313, and resistor 315. The output of operational amplifier 319 is supplied through capacitor 321 to the non-inverting input of operational amplifier 327. Capacitor 321 and resistor 320 provide AC coupling between operational amplifier 319 and 327, to allow only the alternating current components of the output of operational amplifier 319 to pass to operational amplifier 327. Operational amplifier 327 operates as an AC amplifier to provide a gain of approximately 100, as determined by selection of the resistance values for resistors 323, 325. The output of operational amplifier 327 is supplied through a bandpass filter established by capacitor 329, resistor 331, resistor 335, and capacitor 333, to the non-inverting input of operational amplifier 341. The band-pass filter established by the capacitive and resistive components allows the passage of frequencies of 1 to 2 Hertz only, and blocks all other frequency components of the output of operational amplifier 327.

The Power-Up Circuit for the Pressure Change Detection Circuit

Operational amplifier 341 is operated as a positive voltage level comparator. The voltage applied to the inverting input of operational amplifier 341 is established by the voltage divider network of resistors 337, 339. The output of operational amplifier 341 is normally low, but goes high when the voltage at the non-inverting input of operational amplifier 341 exceeds the voltage level of $V_{ref}$, which is applied to the inverting input of operational amplifier 341. The output of operational amplifier 341 is passed through a noise filtration circuit established by resistor 345, capacitor 347, and resistor 349, which is especially adapted to block high frequency noise components which may have been picked-up by the pressure change detection circuit of FIGS. 14a and 14b. As is shown, the output of operational amplifier 341 is supplied through the noise filtration circuit to the CLOCK input of flip-flop 351. When a digital one is applied to the CLOCK input of flip-flop 351, the Q output goes high. As is shown in FIGS. 14a and 14b, the Q output corresponds to the ONP signal which is applied to the ONP pin of microprocessor 255. Also, as is shown in FIGS. 14a and 14b, the reset pin of flip-flop 351 is tied to the CLEAR output of microprocessor 255. Microprocessor 255 may send a digital signal on to the reset pin to change the Q output of flip-flop 351 from a high state to a low state. These operations will be discussed in greater detail below in connection with FIGS. 19a through 19kk, and corresponding electrical circuits.

Figure 15:
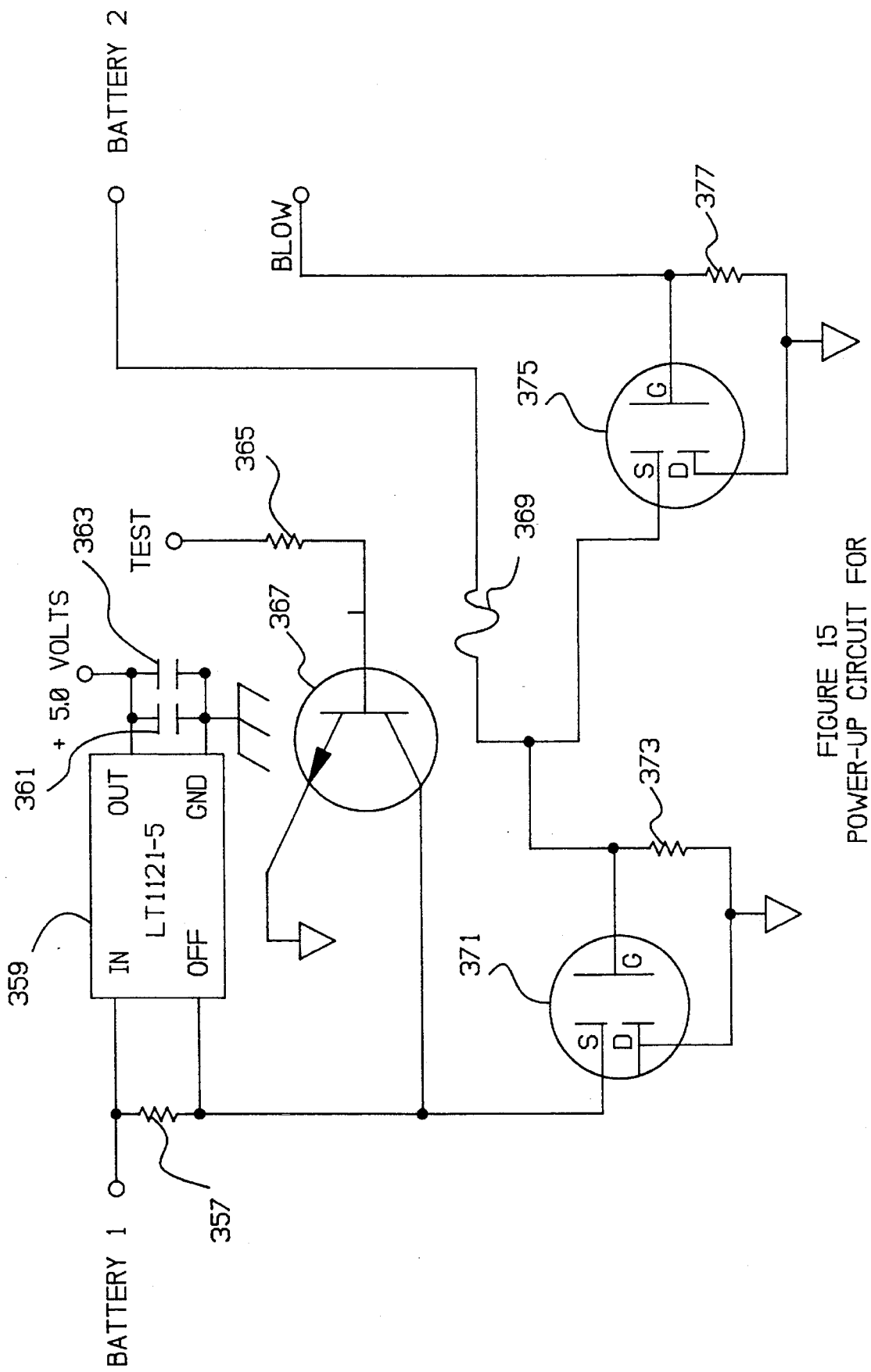
FIG. 15 is an electrical schematic of a power-up circuit of FIGS. 12a and 12b for providing power to the pressure change detection circuit of FIGS. 14a and 14b.

FIG. 15 is an electrical schematic depiction of power-up circuit 234 of FIGS. 12a and 12b, which is utilized to allow microprocessor 255 to allow the consumption of power by pressure change detection circuit 237, only after reception apparatus 53 has been initialized by the operator. Microprocessor 255 utilizes the BLOW output pin to blow fuse 369 which the causes the application of power to the components which comprise pressure change detection circuit 237. As is shown in FIG. 15, the BLOW output pin of microprocessor 255 is coupled to the gate of field effect transistor 375. The drain of field effect transistor 375 is connected to BATTERY 2 through fuse 369. Application of voltage to the gate of field effect transistor 379 allows current to flow from BATTERY 2 through fuse 369 and field effect transistor 375 to ground, causing fuse 369 to blow. Prior to blowing of fuse 369, the voltage of BATTERY 2 is directly applied to the gate of field effect transistor 371, causing the transistor to be turned off. Resistor 373 should be sufficiently large to limit the current flowing through fuse 369 to an amount which does not blow the fuse.

The application of voltage to the gate of field effect transistor 375 creates a short circuit path around resistor 373, allowing a greater current to flow through fuse 369. Once fuse 369 is blown, the gate of field effect transistor 371 is permanently tied to ground, thus locking field effect transistor 371 in a permanent conducting condition, allowing current to flow from BATTERY 1 to ground through resistor 375. This causes linear regulator 359 to go from a OFF condition to an ON condition. Linear regulator 359 only operates if there is a voltage difference between the voltage applied to the IN terminal and the OFF terminal. The voltage difference exists only if current can flow from BATTERY 1, through resistor 357 and field effect transistor 371 to ground. The blowing of fuse 369 allows current to flow in this path, and thus turns linear regulator 359 from an ON condition to an OFF condition. Linear regulator 359 receives as an input voltage from BATTERY 1, and produces as an output five volts DC at the OUT terminal. The output of linear regulator 359 supplies power to microprocessor 255 and the other components which cooperate therewith. Transistor switch 367 is provided for selectively enabling linear regulator 359 by application of voltage to the TEST pin. This allows testing of the operation of pressure change detection circuit 237 without requiring the blowing if fuse 369. When five volts DC is applied to the TEST terminal, transistor switch 367 switches from an OFF condition to an ON condition, allowing current to flow from BATTERY 1, through resistor 357 and transistor switch 367 to ground, thus enabling operation of linear regulator 359.

The Battery Load Test Circuit

Figure 16:
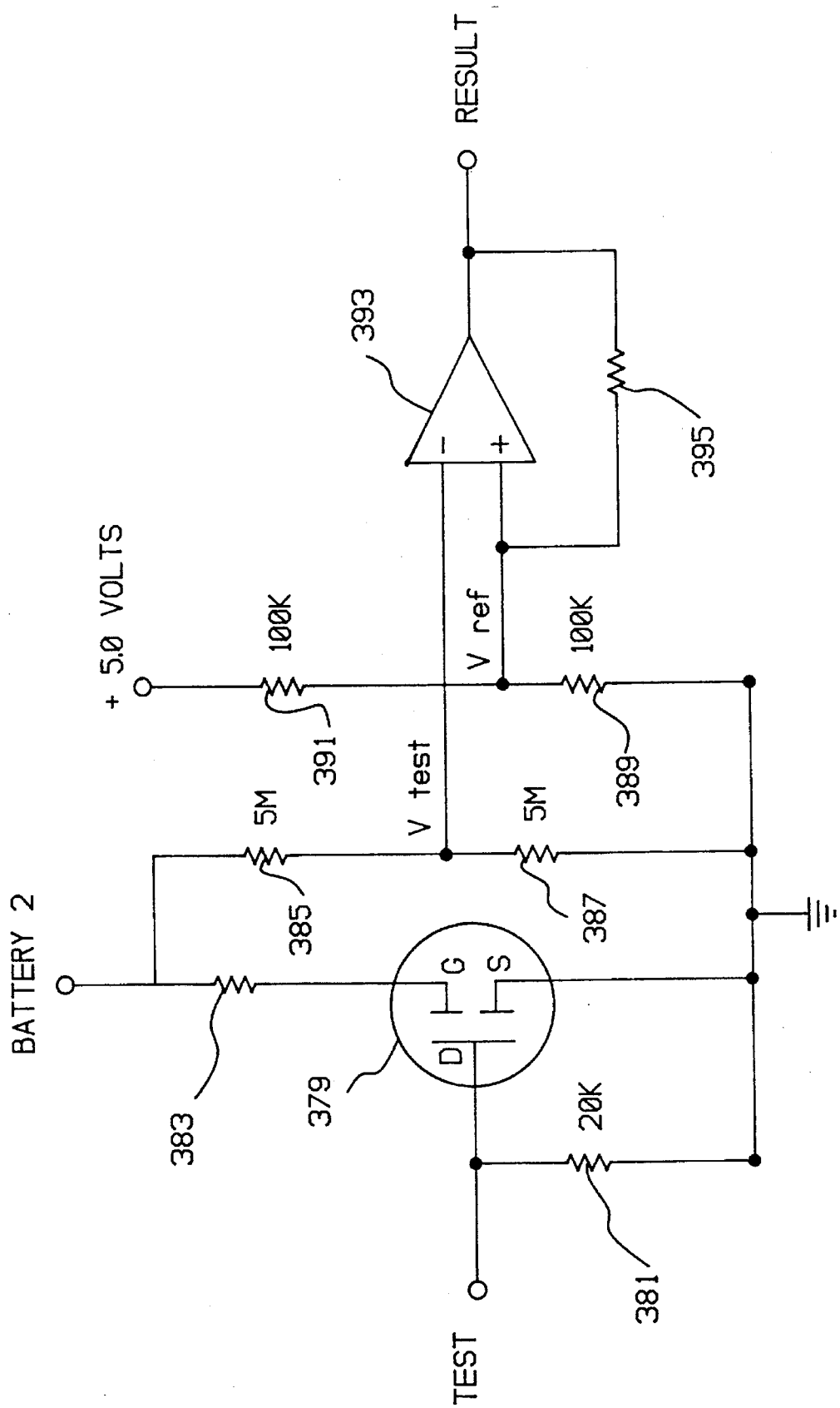
FIG. 16 is an electrical schematic of the battery load test circuit of FIGS. 12a and 12b.

FIG. 16 is an electrical schematic depiction of the battery load test circuit 255. Battery load test circuit 245, which is not shown, is identical, but is used to test BATTERY 1. In FIG. 16, the TEST output pin of microprocessor 255 is shown as connected to the drain of field effect transistor 379. The application of a digital one to the drain of field effect transistor 379 switches the transistor from an OFF condition to an ON condition, allowing the passage of current through two paths: one path being through resistor 383 and field effect transistor 379, and the other path being through resistor 385 and resistor 387. Resistors 385, 387 operate as a voltage divider, and provide a test voltage $V_{test}$, which is applied to the inverting input of operational amplifier 393. Five volts is applied to another voltage divider composed of resistors 391, 389, which establish a reference voltage $V_{ref}$ which is applied to the non-inverting input of operation amplifier 393. In this configuration, operational amplifier 393 is operating as a positive voltage level comparator. The output of operational amplifier 393 will be high if the voltage of $V_{test}$ is greater than the voltage of $V_{ref}$. If the amplitude of the voltage of $V_{test}$ falls below the amplitude of the voltage $V_{ref}$, the output of comparator 393 will go low. The result of this comparison is provided as an output from operational amplifier 393 to the RESULT pin of microprocessor 255. A binary one at the RESULT pin of microprocessor 255 indicates that BATTERY 2 is in good condition, while a binary zero at the result pin of microprocessor 255 indicates that BATTERY 2 is weak, and may not be able to perform the function of igniting igniter 263.

The Power-Up Circuit for the Microprocessor

Figure 17:
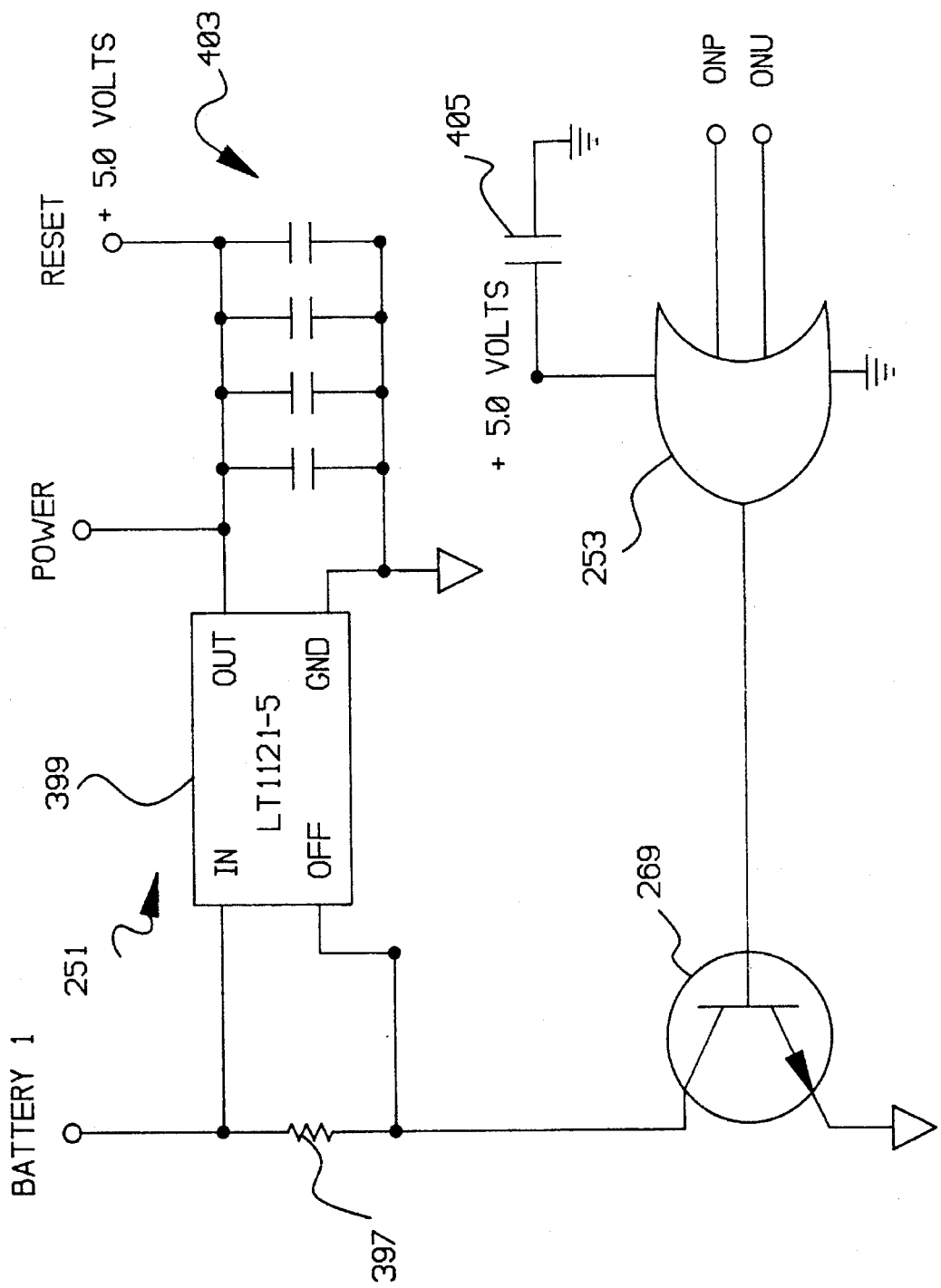
FIG. 17 is an electrical schematic of the power switching device of FIGS. 12a and 12b for selectively supplying power to the microprocessor.

FIG. 17 is an electrical schematic depiction of the power on reset circuit 251, or-gate 253, and electrically-actuated witch 269 of FIGS. 12a and 12b. As is shown in FIG. 17, the ONP signal and ONU signal are supplied as inputs to or-gate 253. The output of or-gate 253 is supplied to the base of switching transistor 269. If either ONP or ONU goes high, or-gate 253 goes high, switching transistor 269 from an OFF condition to an ON condition, allowing current to pass from BATTERY 1, through resistor 397 and transistor 269 to ground. Linear regulator 399 will operate only if a voltage difference exists between the IN pin and the OFF pin. Until switching transistor 269 switches from an OFF condition to an ON condition, linear regulator 399 is off, and no voltage is supplied at the OUT pin; however, once switching transistor 269 is switched from an OFF condition to an ON condition, a voltage is developed across resistor 397, and linear regulator 399 receives the voltage of BATTERY 1 at the IN pin and produces five volts DC as an output which is supplied to both the power pin of microprocessor 255 and the RESET pin of microprocessor 255. Capacitor array 403 are provided as a noise filter to ensure that the RESET pin is not unintentionally triggered.

The Continuity Test Circuit

Figure 18:
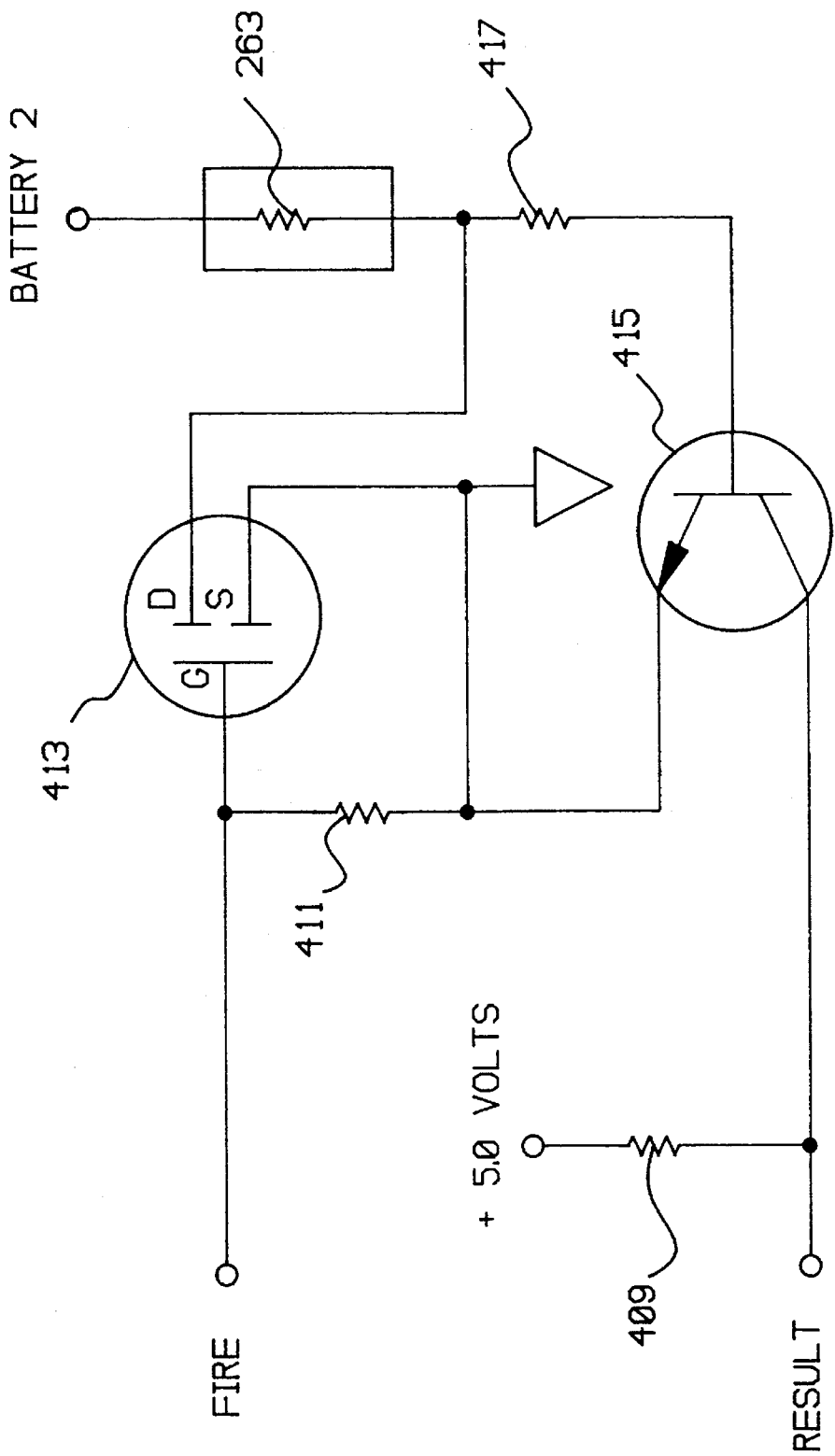
FIG. 18 is an electrical schematic of the continuity test circuit of FIGS. 12a and 12b.

FIG. 18 is an electrical schematic depiction of continuity test circuit 261 of FIGS. 12a and 12b. Microprocessor 255 may fire igniter 263 by providing five volts DC as an output on the FIRE pin, which switches field effect transistor 413 from a normally-off condition to an on condition, to allow current to flow from BATTERY 2, through igniter 263 and field effect transistor 413 to ground. Since field effect transistor 413 provides very little resistance to the flow of current, substantially all the voltage of BATTERY 2 will be dropped across igniter 263, which comprises an electrically-resistive heat-generating circuit component. Preferably, igniter 263 is embedded in a thermally-actuated gas producing substance which is utilized to drive a piston or similar device, as will be discussed in detail herebelow.

During testing and calibration operations, it is important to know the electrical condition of igniter 263; more specifically, it is important to know whether igniter 263 is properly connected between BATTERY 2 and ground. In the present invention, the condition of igniter 263 may be determined by examining the voltage level at the RESULT pin of the circuit of FIG. 18. A second current path is defined in the circuit of FIG. 18 from BATTERY 2, through igniter 263, resistor 417, transistor switch 415 to ground. BATTERY 2 will continuously supply a small amount of current which flows through this path. The small voltage applied to the base of switching transistor 415 maintains switching transistor 415 in an ON condition for so long as the current flows from BATTERY 2. If igniter 263 breaks, no current will flow through this path, and transistor switch 415 will switch from an ON condition to an OFF condition. As a consequence, the five volts applied to the collector of switching transistor 415 through resistor 405 will pull the RESULT terminal from a low voltage to a high voltage. Microprocessor 255 need only examine the binary condition of the RESULT input pin to determine the condition of igniter 263. A low condition indicates that the current path through igniter 263 exists; a high condition indicates that the current path through igniter 263 no longer exists.

The Computer Program

Figure 19A:
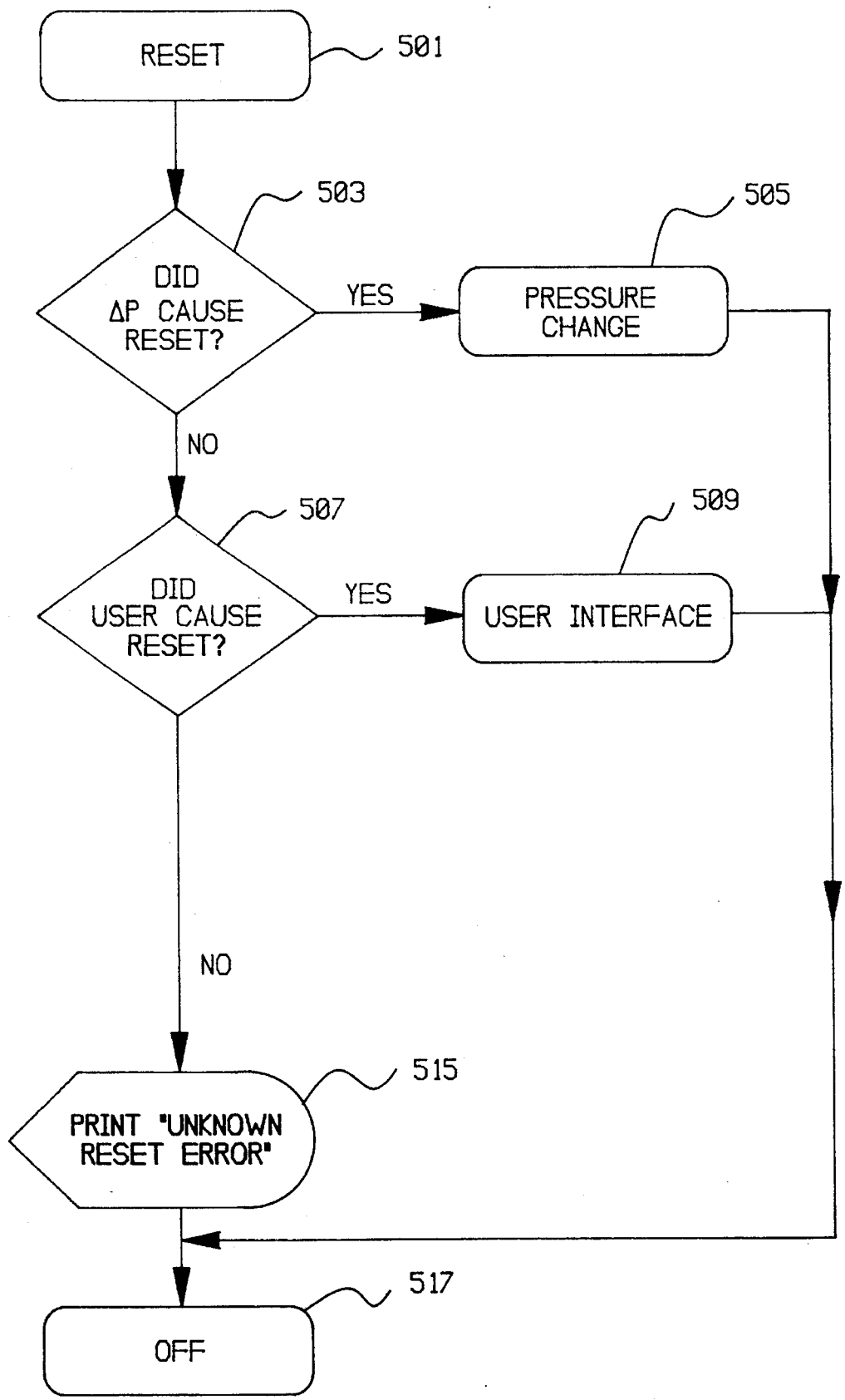
FIGS. 19a through 19kk are flowchart representations of the program which is executed by the microprocessor of FIGS. 12a and 12b.
Figure 19B:
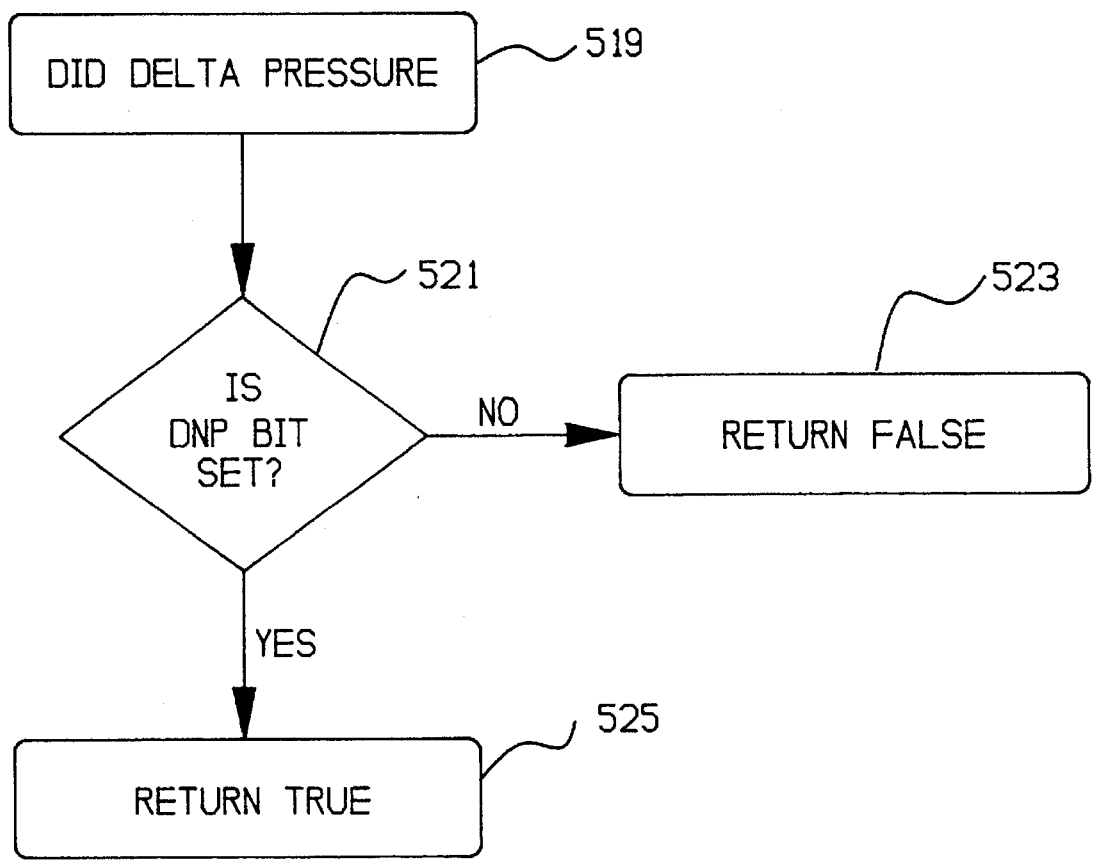
Figure 19C:
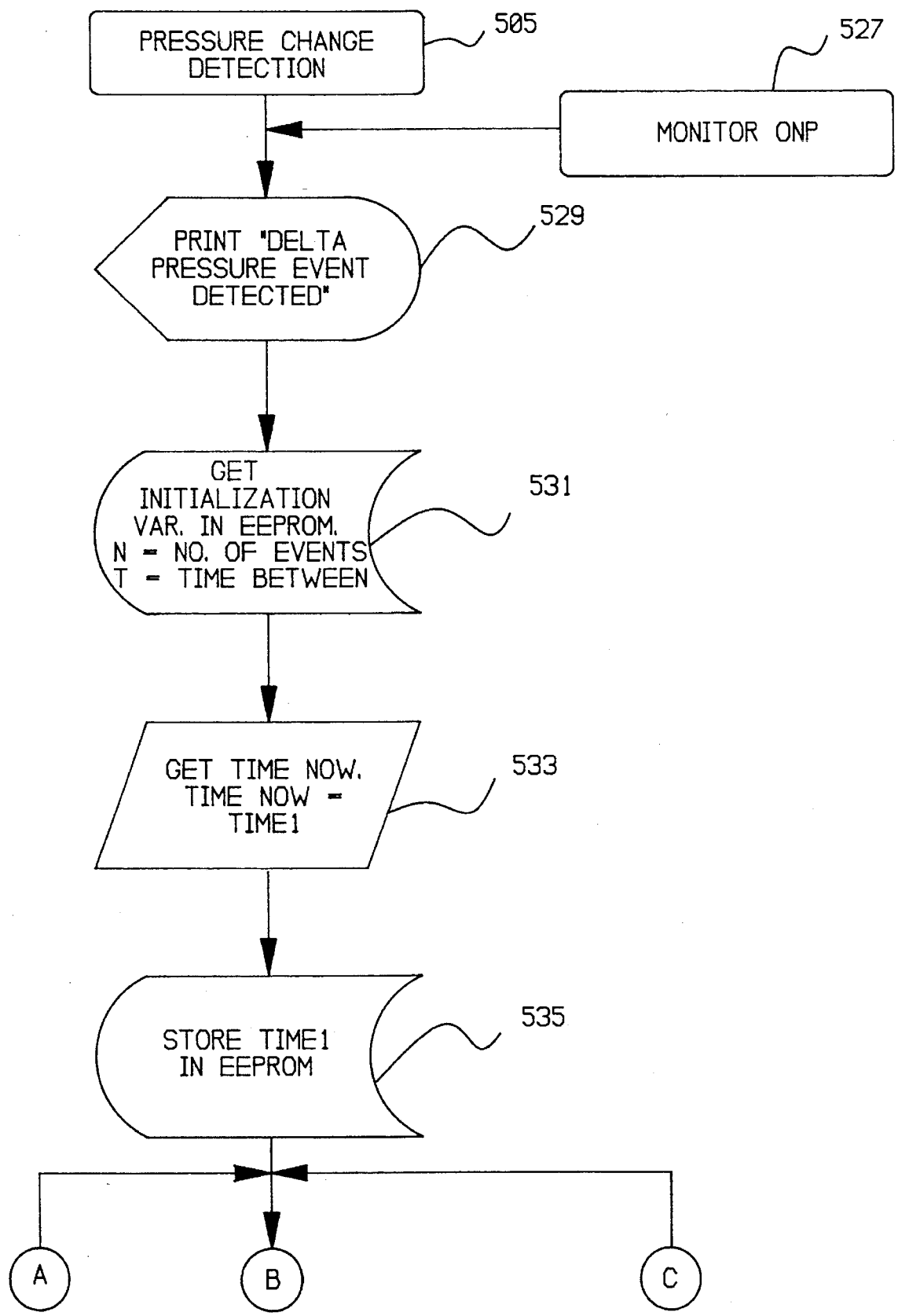
Figure 19D:
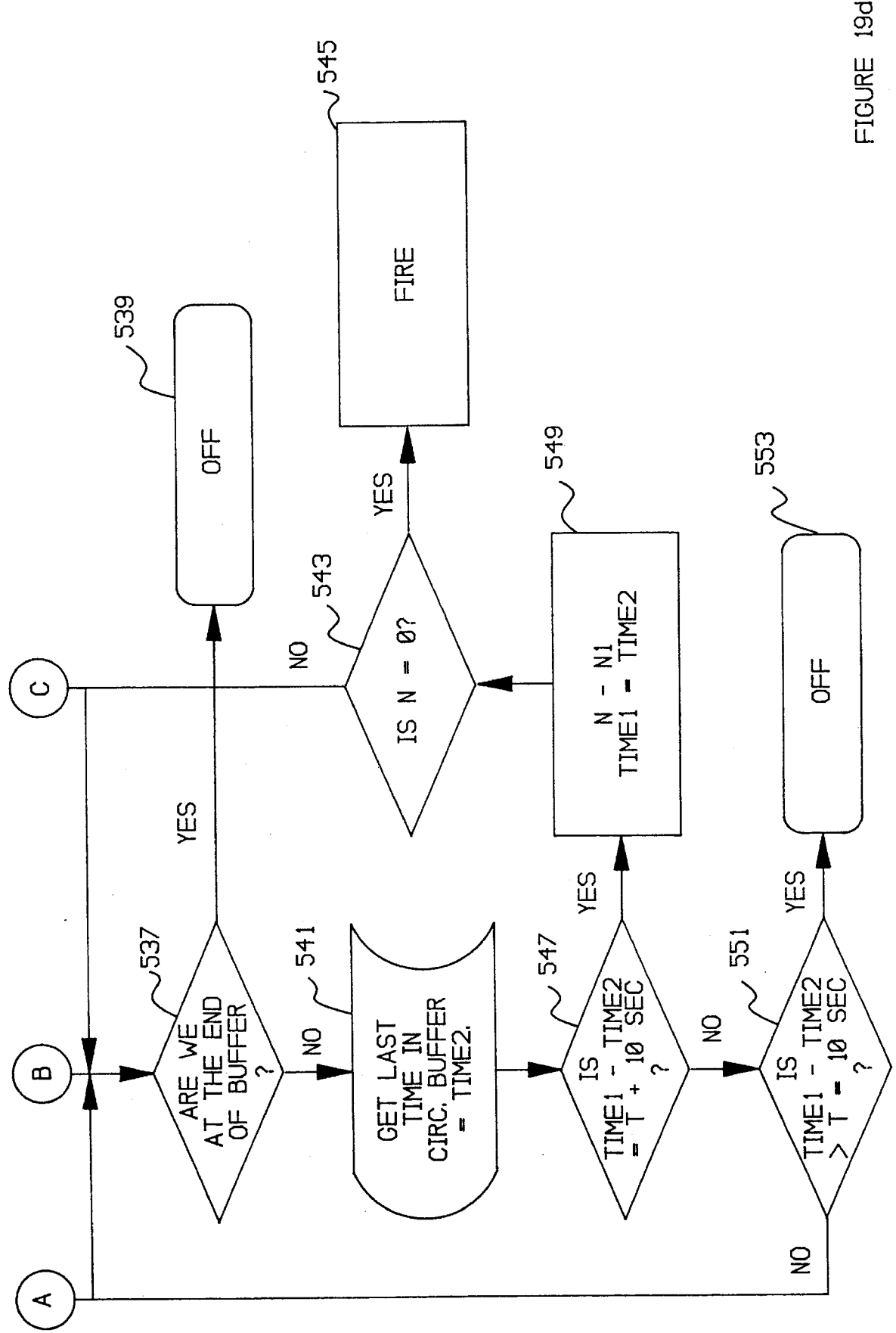

FIGS. 19a through 19kk are flowchart representations of a computer program which is resident in memory of ROM 257 and EEPROM 259 of FIGS. 12a and 12b, and which is executed by microprocessor 255 to achieve the operating objectives of the present invention. As depicted in flowchart form in FIG. 19a, microprocessor 255 receives a digital signal on its RESET pin in accordance with software block 501. In software blocks 503, 507, and 511, microprocessor 255 determines the source of the RESET signal. In software block 503, microprocessor 255 determines whether the pressure change detection circuit 237 is the source of the RESET signal; if so, the process continues in software block 505, which is representative of the pressure change detection routine which is depicted in FIGS. 19c and 19d. It is determined in software block 507 whether the magnetic communication interface circuit 235 is the source of the reset signal; if so, the process continues in software block 509, which is representative of the user interface routine which is depicted in flowchart form in FIGS. 19g and 19h. If it is determined that the RESET signal originated from neither the pressure change detection circuit 237 nor the magnetic communication interface 235, processor 255 records in memory the occurrence of an "unknown reset error", which may be displayed on programming unit 91 if it is magnetically coupled with receiver apparatus 53. Upon completion of the alternative operations of software blocks 505, 509, 515, microprocessors 255 turns itself off.

Determining the Source of a Reset

FIG. 19b is a flowchart representation of the operations of software block 503 of FIG. 19a. The process begins at software block 519, wherein, in response to the detection of a RESET signal, microprocessors 255 calls the routine of FIG. 19b to determine whether the RESET signal was caused by the pressure change detection circuit 237. The process continues at software block 521, wherein microprocessor 255 checks the status of the ONP input pin from the pressure change detection circuit of FIGS. 14a and 14b to determine its binary condition. In FIGS. 12a and 12b, latch 249 is representative of flip-flop 251. The ONP pin (the Q output of the flip-flop) will go high upon receipt of a binary one at the CLOCK input, and will remain high until a binary signal is applied through the CLEAR line to flip-flop 351 of FIGS. 14a and 14b. If the ONP pin is high, in accordance with software block 525, the microprocessor determines that the pressure change detection circuit 237 is the source of the RESET signal. If the ONP pin is low, in accordance with software block 523, microprocessor 255 determines that the pressure change detecting circuit 237 is not the source of the reset signal.

In accordance with the flowchart of FIG. 19a, if pressure change detection circuit 237 is determined to be the cause of the RESET signal, the process continues at software block 505, which is depicted in the flowchart routine set forth in FIGS. 19c and 19d.

Figure 19E:
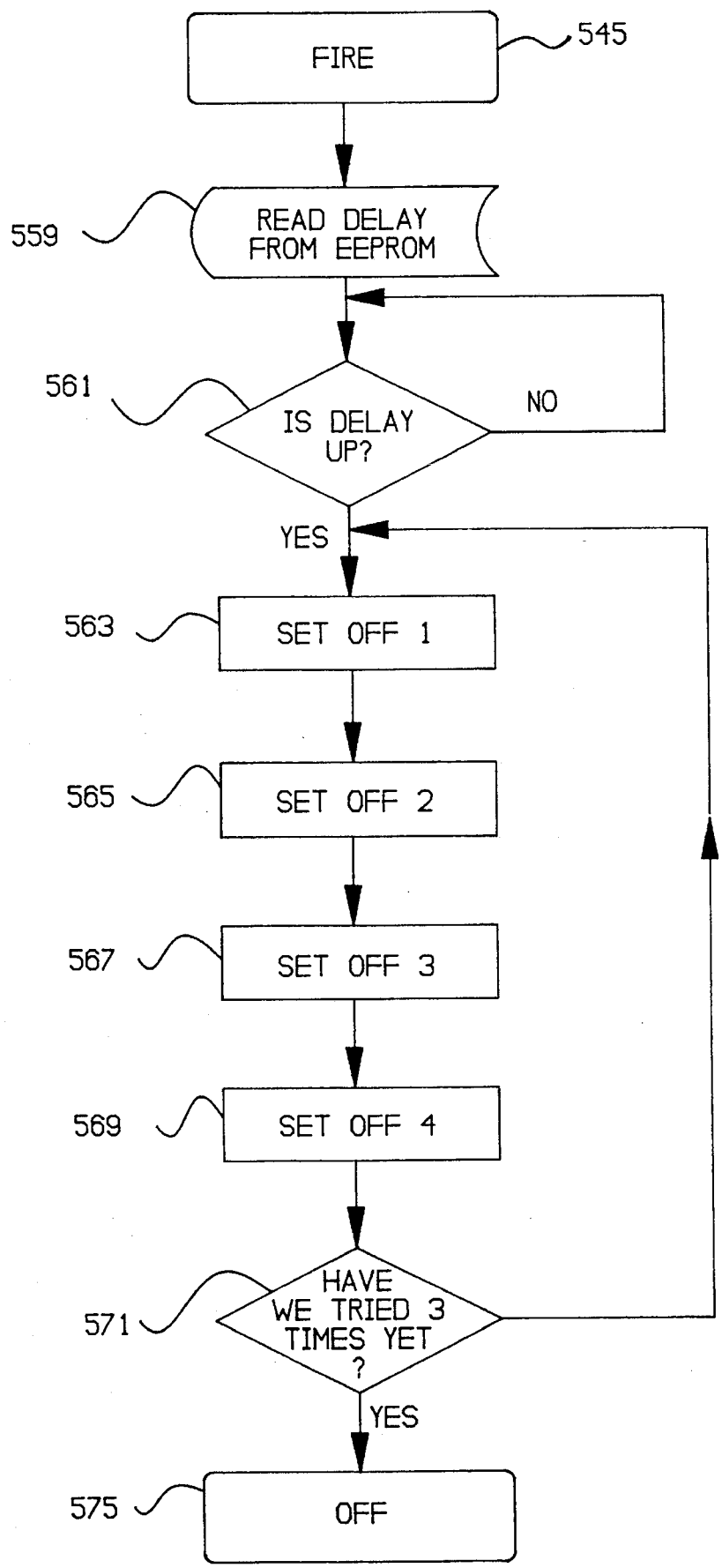
Figure 19F:
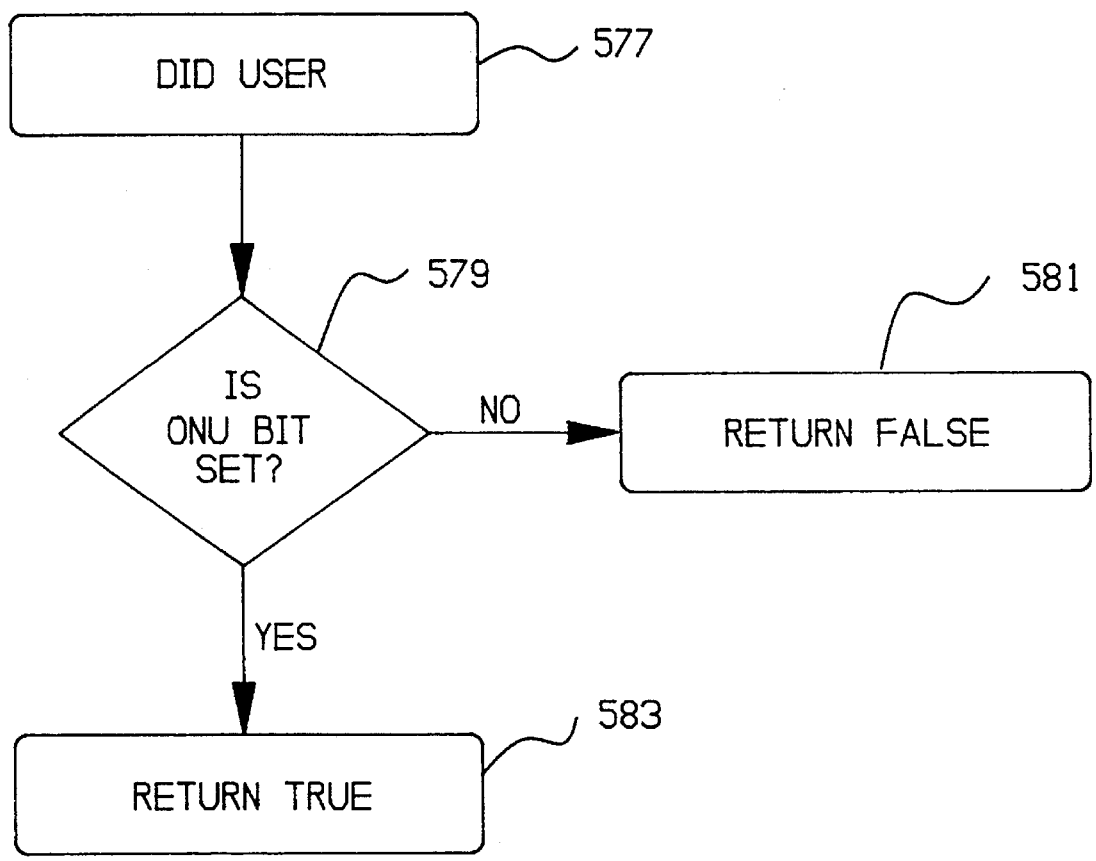

In FIG. 19f, microprocessor 255 determines if the pressure change detection circuit 237 is the cause of the RESET signal. Referring now to FIG. 19f, the process commences at software block 537, wherein microprocessor 255 calls the routine to determine whether the RESET signal was initiated by the receipt of a binary character at magnetic communication interface 235 as was described above in connection with FIGS. 13a and 13b. The receipt of a binary character results in a change in state of the Q output of flip-flop 309, from a binary low to a binary high. The binary status of the ONU output is maintained until a binary character is received at the RESET input (of FIGS. 13a and 13b) which results in a return of the ONU terminal to the low condition. As is set forth in the flowchart of FIG. 19f, in software block 579, microprocessor 255 examines the status of the ONU bit to determine whether it is high or low. If the bit is low, in accordance with software block 581, microprocessor 255 determines that magnetic communication interface 235 was not the source of the reset signal; however, if it is determined in software block 279 that the ONU bit is high, in accordance with software block 583, microprocessor 255 determines that magnetic communication interface 235 was indeed the source of the reset signal. As is set forth in FIG. 19a, if it is determined that magnetic communication interface 235 is the source of the reset signal, the user interface routine of software block 509 is entered.

The pressure change routine of software block 505 and the user interface routine of software block 509 will now be described in detail.

The Pressure Change Detection Routine

FIGS. 19c and 19d is a flowchart representation of the pressure change detection routine of software block 505 of FIG. 19a. The process commences when the routine is called, in accordance with software block 505. Then, in accordance with software block 527, microprocessor 255 continuously monitors for a change in the binary state of the input at the ONP terminal. Next, in accordance with software block 529, microprocessor 255 outputs a series of ASCII characters on the DATA-OUT pin of microprocessor 255, which communicates through magnetic communication interface 235 to programming terminal 91 of FIG. 9a. During laboratory testing of the device, this prompts the operator with the message: "Delta Pressure Event Detected". When reception device 53 is located within a wellbore, the ASCII character string produced by microprocessor 255 at the DATA-OUT pin, is neither received nor displayed.

The process continues at software block 531, wherein microprocessor 255 retrieves the operator-selected initialization variables from EEPROM 259, including: N, the number of sequential rapid pressure changes; and T, the time between each of the sequentially occurring rapid pressure changes, which together define the coded message. Then, in accordance with software block 533, microprocessor 255 receives clock data from clock 239, and sets a variable "time1" to the value of clock 239. Then, in accordance with software block 535, microprocessor 255 stores the value of the "time1" variable in EEPROM 259.

In accordance with software block 537, microprocessor 255 then determines if a dedicated memory buffer is full; if so, the process continues in step 539 by turning off the power to microprocessor 255; if, however, it is determined in step 537 that the buffer is not full, the process continues at software block 541, wherein microprocessor 255 retrieves the last recorded time in the circular memory buffer, and pushes that value to a variable identified as "time2". Then, in accordance with software block 547, microprocessor 255 subtracts the value of "time2" from the value of "time1", and determines whether it is equal to the value for T, plus or minus ten seconds; if so, in accordance with software block 549, microprocessor 255 decrements a counter, and moves the value of variable time1 to the variable of time2.

The process then continues at software block 543, wherein microprocessor 255 examines the numeric value of the counter to determine if it is zero. If so, the process continues at block 545 by calling a "fire" routine which will be discussed in detail herebelow; however, if it is determined in software block 543 that the counter has a value greater than zero, the process continues at software block 537, wherein microprocessor 255 awaits the receipt of another detected pressure change of sufficient magnitude to be detected by pressure change detection circuit 237.

If it is determined in software block 547 that the difference between the values of "time1" and "time2" is not equal to T, plus or minus ten seconds, the process continues at software block 551, wherein it is determined if the difference between the values of "time1" and "time2" is greater than T plus or minus ten seconds; if so, the process continues at software block 553 by turning off the power to microprocessor 255; however, if it is determined in software block 551 that the difference between the value of "time1" and "time2" is not greater than T, plus or minus ten seconds, then the process continues as software block 537, wherein microprocessor 255 awaits the detection of an additional rapid pressure change by pressure change detection circuit 237.

In this manner, microprocessor 255 continuously monitors for pressure changes which are detected by pressure change detection circuit 237, and then examines the content of its memory buffer to determine if each detected pressure change occurs at an appropriate time interval (T, plus or minus ten seconds) after the receipt of the last pulse to be eligible as a message component; if the detected pressure change occurs at the appropriate time interval, then microprocessor 255 examines a counter to determine if the appropriate number of consecutive rapid pressure changes have occurred; if so, the microprocessor commences to perform the operating steps of a fire routine; if not, the microprocessor 255 continues to await the arrival of additional rapid pressure changes which are detected by pressure change detection circuit 237. Energy is conserved in this process by turning off the microprocessor if it is determined that too long an interval has passed between the detection of the current rapid pressure change and the previous rapid pressure change. Power is not provided to microprocessor 255 until an additional pressure change is detected which causes the automatic powering-up of microprocessor 255.

The User Interface Routine

Figure 19G:
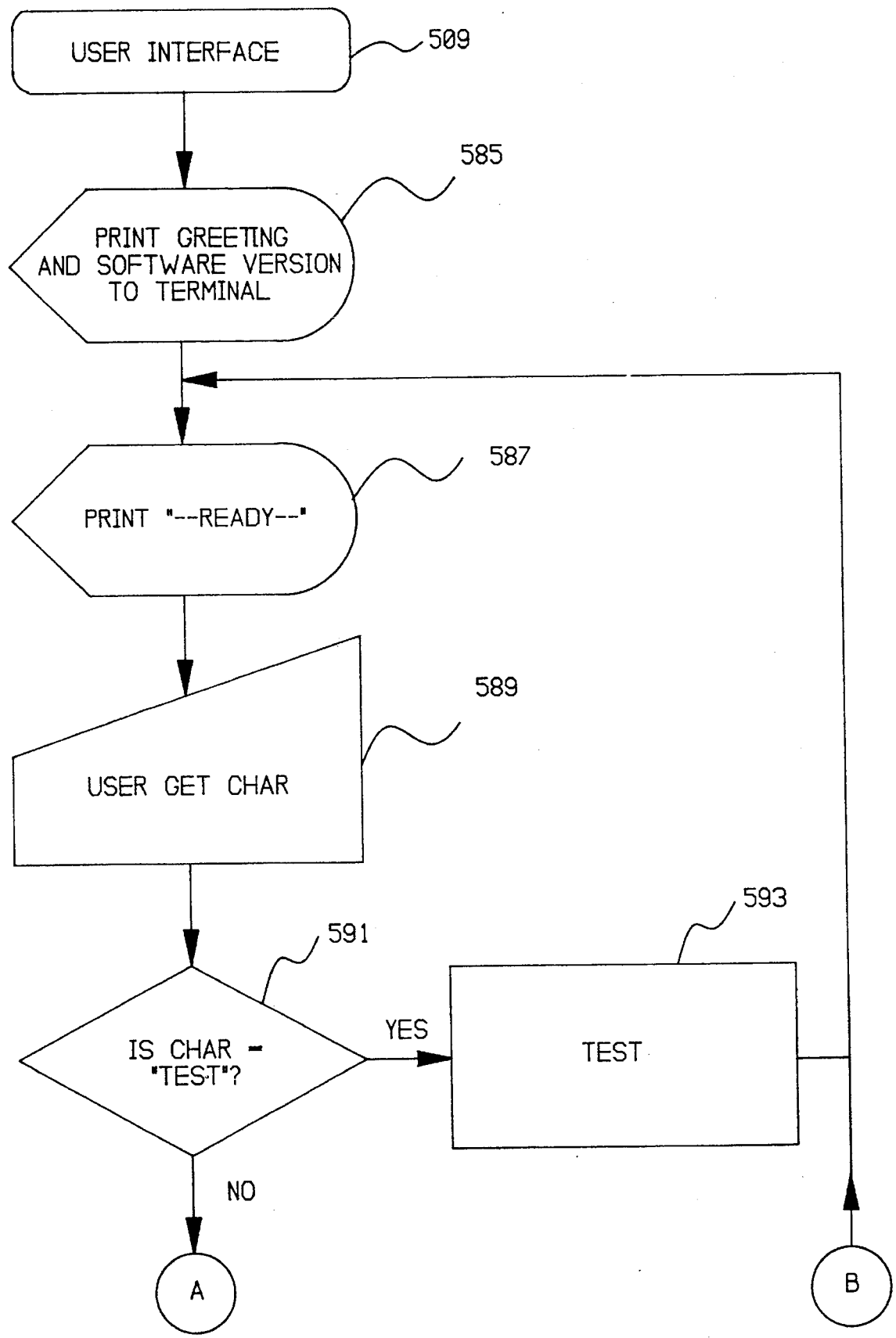
Figure 19H:
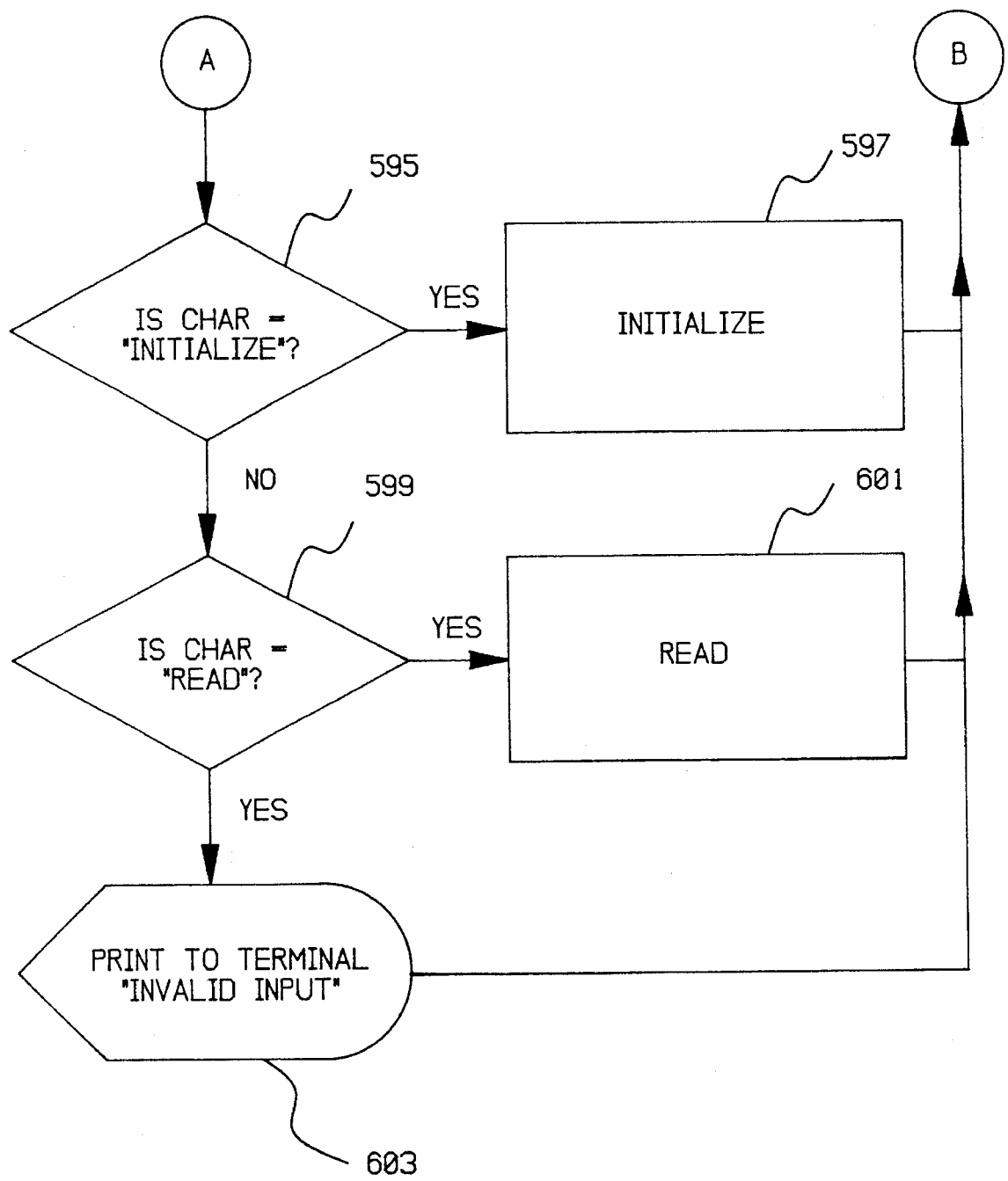
Figure 19I:
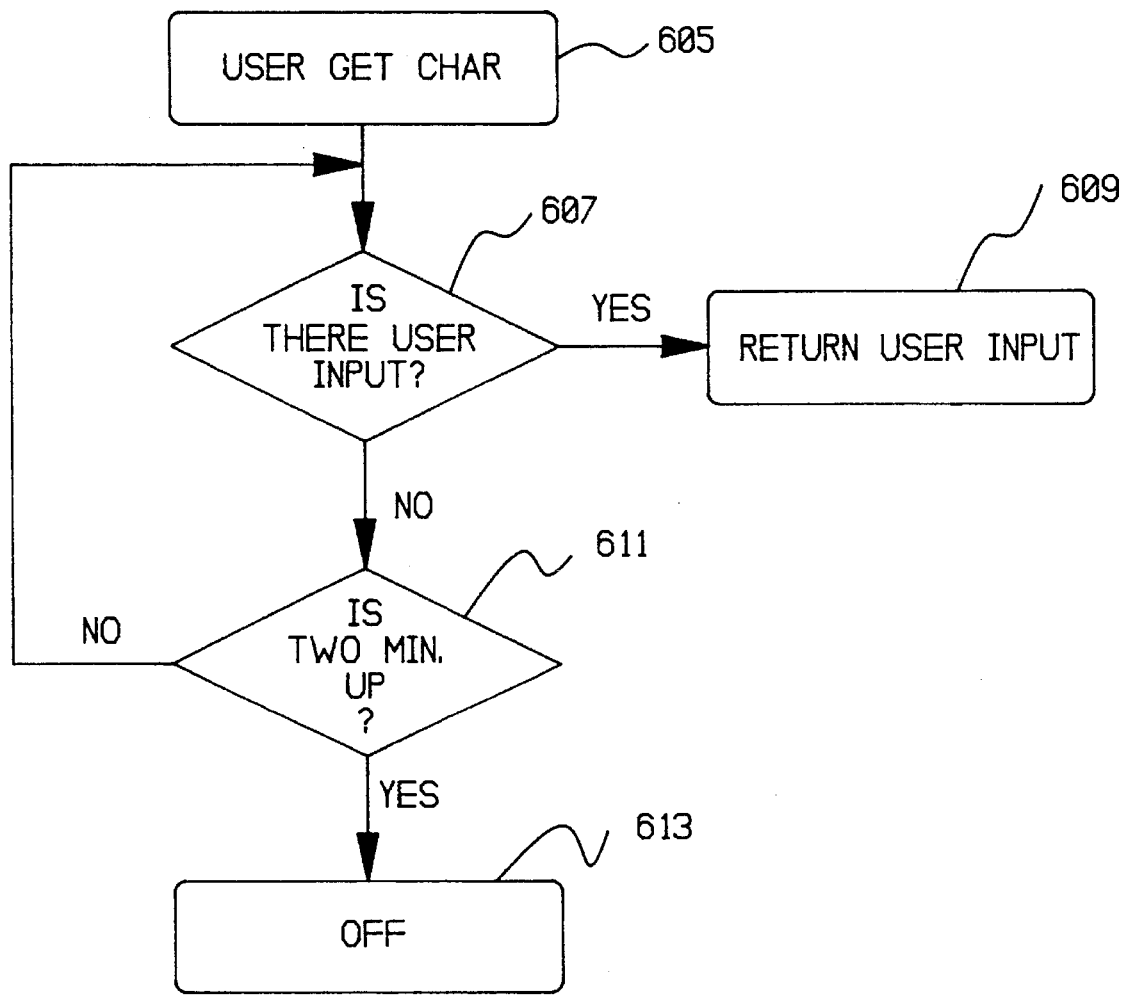

FIGS. 19g and 19h is a flowchart representation of user interface routine which is represented by software block 509 of FIG. 19a. The process begins at software block 509, wherein microprocessor 255 calls the user interface routine. In accordance with software block 585, microprocessor 255 generates and sends an ASCII character string through magnetic communication interface circuit 115; if programming terminal 91 is coupled to reception apparatus 53, the display of programming terminal 91 will print a greeting and identify the software version resident in PROM 257. Next, in accordance with software block 587, microprocessor 255 produces an ASCII character string which comprises a user prompt, which prompts the user to select a particular operation by depressing a key on programming terminal 91. Microprocessor 255 then enters a routine for retrieving the character selection of the operator, in accordance with software block 589, which is shown in further detail in FIG. 19i. Turning now to FIG. 19i, the "get character" operation begins at software block 605, wherein the routine is called. It continues in software block 607, wherein microprocessor 255 determines whether the user has selected a character; if so, the process continues at software block 609 by returning the user input to microprocessor 255. However, if in software block 607 it is determined that the user has not selected a character, the software continues at software block 611 by determining if two minutes have passed since the prompt. If two minutes has passed, the process continues in software block 613 by turning off power to microprocessor 255;

however, if two minutes have not passed since the user prompt, the process continues at software block 607 by determining if the user has made a selection at programming terminal 91.

Returning now to FIGS. 19g and 19h, the process continues in software block 591, 595, and 599, wherein the user input is analyzed to determine whether the user is requesting "test" operations, "initialization" operations, or "reading" operations. The program continues at the appropriate software block, including software block 593 for testing operations, software block 597 for initialization operations, and software block 601 for reading operations. If the user input is something other than selection of the "T", "I", or "R" keys of programming terminal 91 (of FIG. 9a), the computer program continues in software block 603 by printing to programming terminal 91 a message which states that the operator input is "invalid".

The "test", "initialize", and "read" functions will now be described with reference to FIGS. 19j, 19k, 19l, 19m, 19n, 19o, 19p, 19q, 19kk, 19s, 19t, 19u, 19v, 19w, 19x, 19y, 19z, 19aa, 19bb, 19cc, 19dd, 19ee, 19ff, 19gg, 19hh, 19ii, 19jj, and 19r.

Test Operations

Figure 19J:
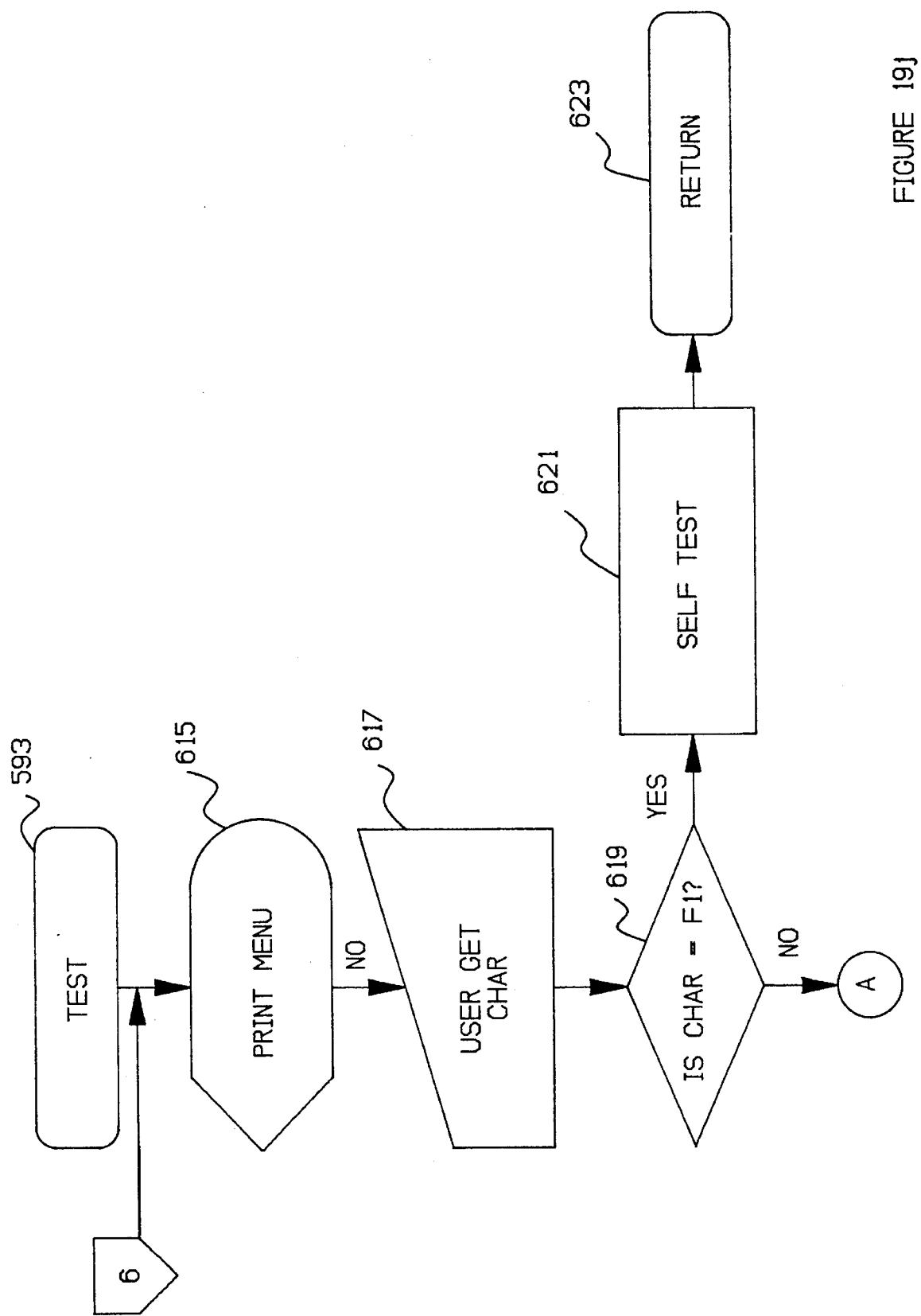
Figure 19K:
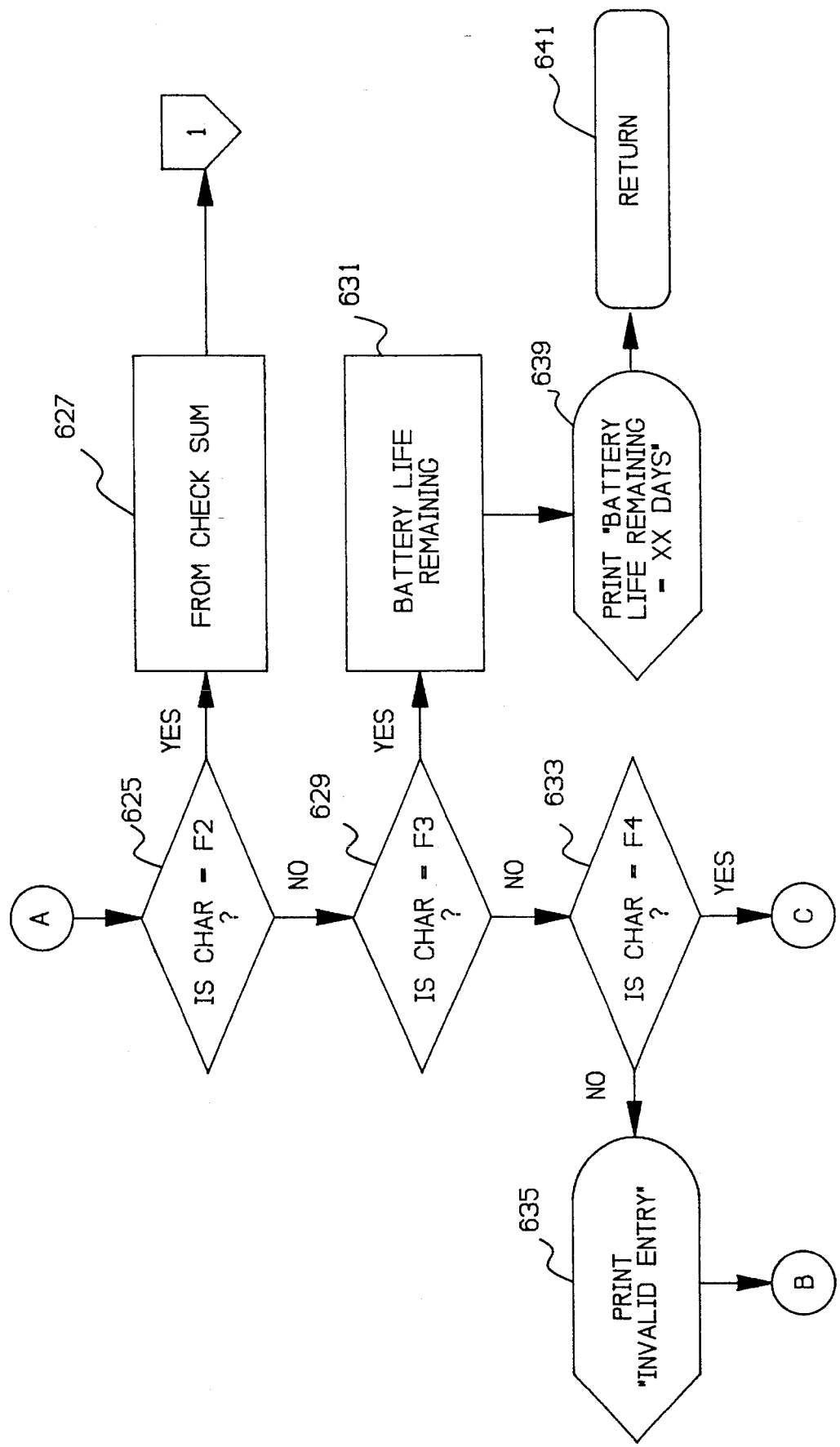
Figure 191:
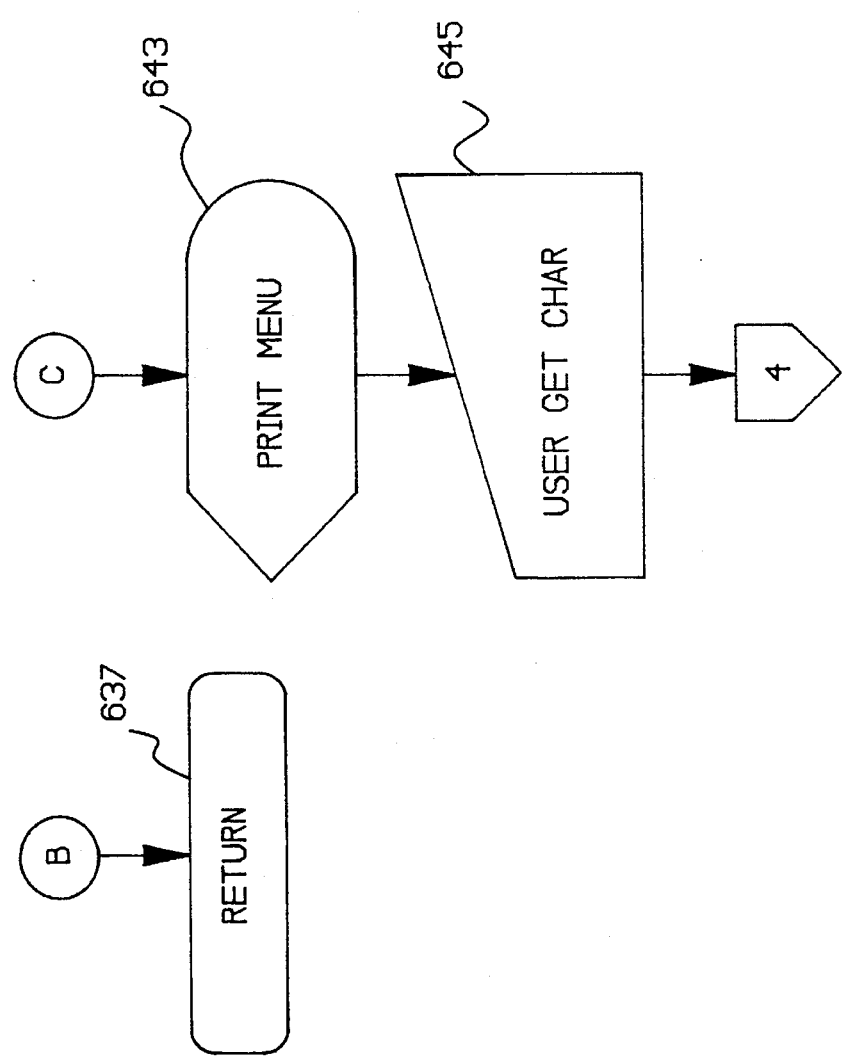

If the operator utilizes programming terminal 91 to select the test operations by depressing the "T" key after appropriate prompting, the process continues in FIGS. 19j, 19k, and 19l, wherein the test routine is called, in accordance with software block 593. In accordance with software block 615, microprocessor 255 causes a multi-page menu to be printed at programming terminal 91. In this menu, the function keys (F1, F2, F3, and F4) are utilized to identify particular test operations. On page one of the menu, F1 is utilized to identify a self-test operation; F2 is utilized to represent a ROM check sum operation; F3 is utilized to identify a battery life remaining test operation; and F4 is utilized to print the second page of the menu. On this second page, the F1 key is utilized to identify an igniter test; the F2 key is utilized to identify the EEPROM sum check operation; the F3 key is utilized to identify the battery load test operation; and the F4 key is utilized to call the third page of the menu. On the third menu page, F1 key is utilized to identify the EEPROM test; F2 key is utilized to identify the set-off igniters operation; the F3 key is not utilized to identify any operation; and the F4 key is utilized to return to the first page of the menu.

FIGS. 19j, 19k, 19l, 19m, 19n, 19o, and 19p identify this menu-driven test operation. In FIG. 19h, software block 615 identifies display of the first page of the menu. In accordance with software block 617, microprocessor 255 retrieves the operator's selection, and then in accordance with software blocks 619, 625, and 629 identifies whether the F1 key, F2 key, or F3 key has been selected by the operator. The operator selection of the F1 key causes the program to go to the self-test operation of software block 621; after the self-test operation is completed, the program returns in accordance with software block 623. If the operator has selected the F2 key, the operation continues in software block 627, wherein the ROM sum check operation is performed. If the operator has selected the F3 character, the operation continues at software block 631 which represents the battery life remaining test. At the conclusion of the battery life remaining test of software block 631, the process continues at software block 639, wherein a display is provided at programming terminal 91 of the remaining days of battery life; then, in accordance with software block 641, the microprocessor 255 returns to the main program.

If, however, it is determined that the operator has selected the F4 character on page one of the menu, the processing continues at software block 643, wherein the second page of the menu is printed. If it is determined that some character other than one of the four function keys was entered by the operator, in accordance with the software block 635, microprocessor 255 displays an "Invalid Entry" prompt and returns, in accordance with software block 637.

On the second page of the menu, microprocessor 255 fetches the selected character, in accordance with software block 645. In software blocks 647, 651, and 655 microprocessor 255 determines whether the operator has depressed the F1, F2, or F3 keys. Selection of the F1 key results in the program going to the igniter test routine of software block 649. Selection of the F2 key results in the program going to the EEPROM check sum routine of software block 653. Selection of the F3 key results in the program going to the battery load test routine of software block 657. At the termination of the battery test routine, in accordance with software block 633, microprocessor 255 determines whether the battery has succeeded in load tests; if so, the process continues at software block 665, and microprocessor 255 prints a message to programming terminal 91 which reads "battery load test pass"; however, if it is determined in software block 633, that the battery did not pass the load test, the process continues at software block 671, wherein microprocessor 255 causes the message "battery test failed" to be printed at programming terminal 91. At the termination of software blocks 665, or 671, microprocessor 255 returns to the main program, in accordance with software block 673.

If it is determined in software block 661 that the operator has depressed the F4 key, microprocessor 255 continues by displaying the third page of the menu, in accordance with software block 669. If it is determined that some character other than one of the four function keys was entered by the operator, in accordance with software block 659, microprocessor displays an "Invalid Entry" prompt and returns in accordance with software block 667. On the third page of the menu, in accordance with software block 675, microprocessor 255 fetches the operator character selection, and then examines it in accordance with software blocks 677, 683, 689, and 691 to identify the operator selection. In software block 677, the operator selection is analyzed to determine if it corresponds to the F1 key; if so, the process continues at software block 679 by performing the EEPROM test, and returning in accordance with software block 681. If it is determined in accordance with software block 683 that the operator has selected the F2 key, the process continues at software block 685 by performing the set-off igniters operation, and returning in accordance with software block 687. Since the F3 character is undefined, selection of the F3 character will result in printing of the "Invalid Entry" message, in accordance with software block 693, and return in accordance with software block 695. However, if it is determined that the operator has selected the F4 character, microprocessor 255 displays page one of the menu again. If it is determined that some character other than one of the four function keys was entered by the operator, an "Invalid Entry" prompt is provided in accordance with software block 693, and the process returns in accordance with software block 695.

The ROM Check Sum Test Operation

Figure 19M:
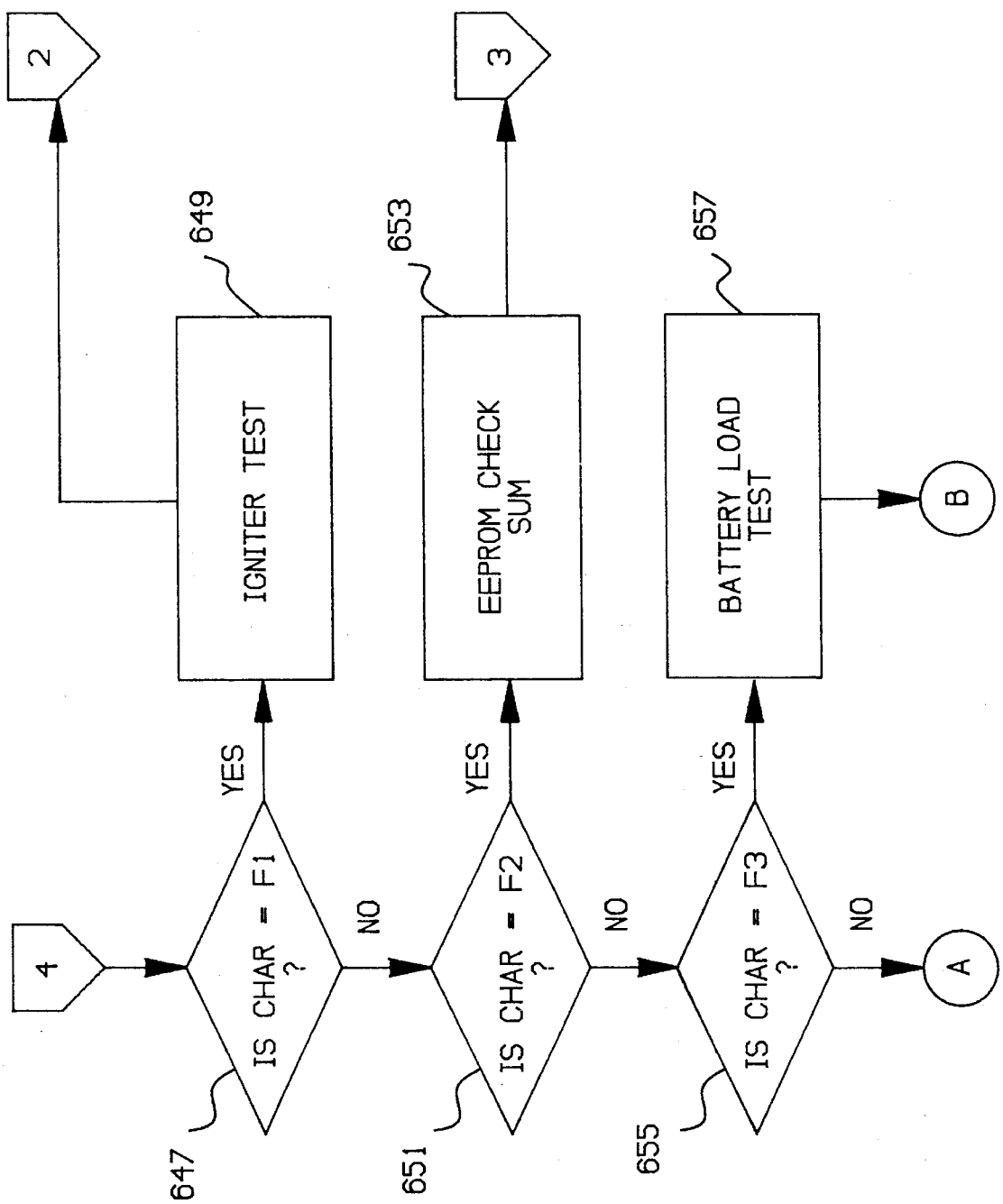
Figure 19N:
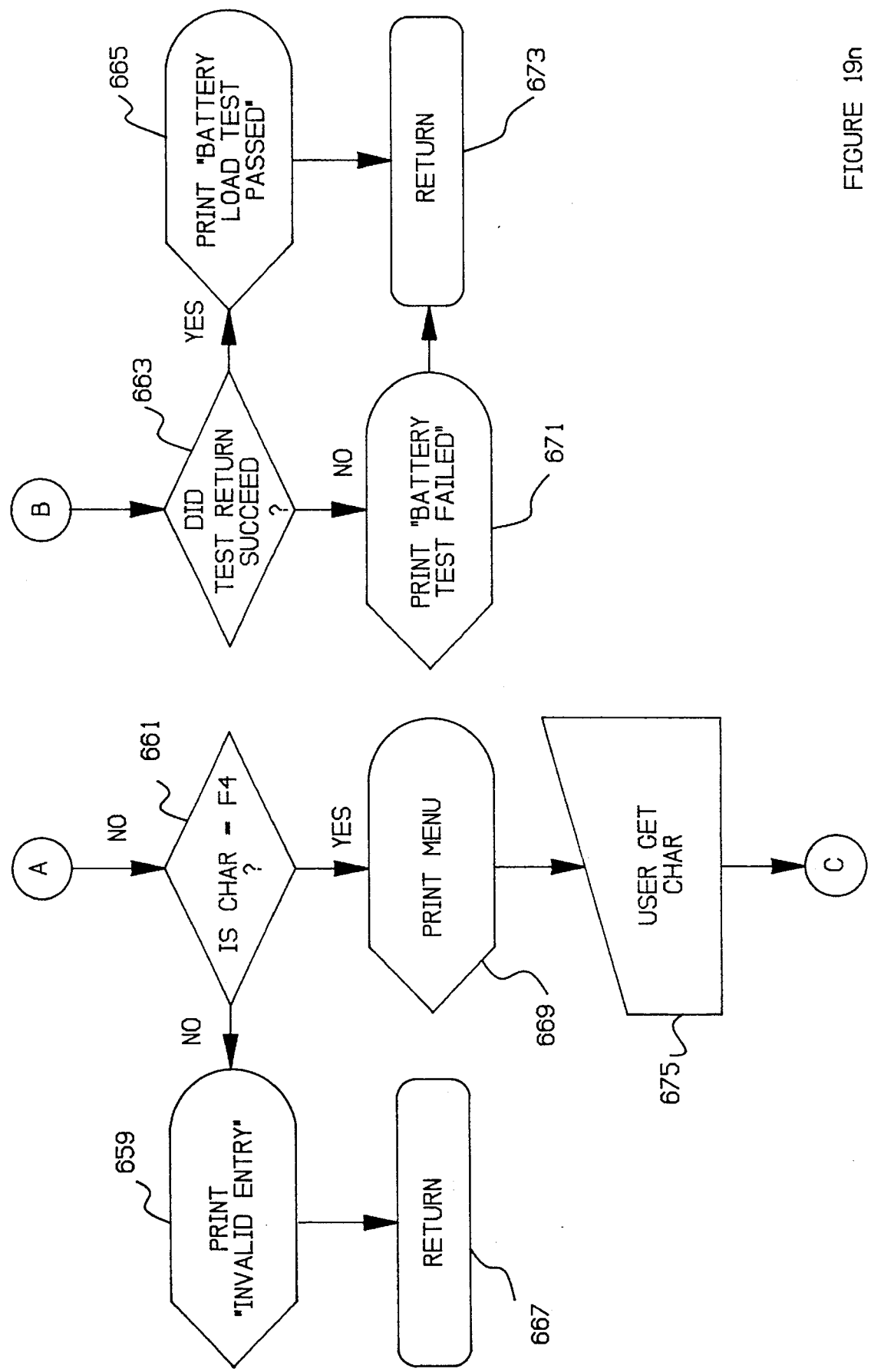
Figure 19O:
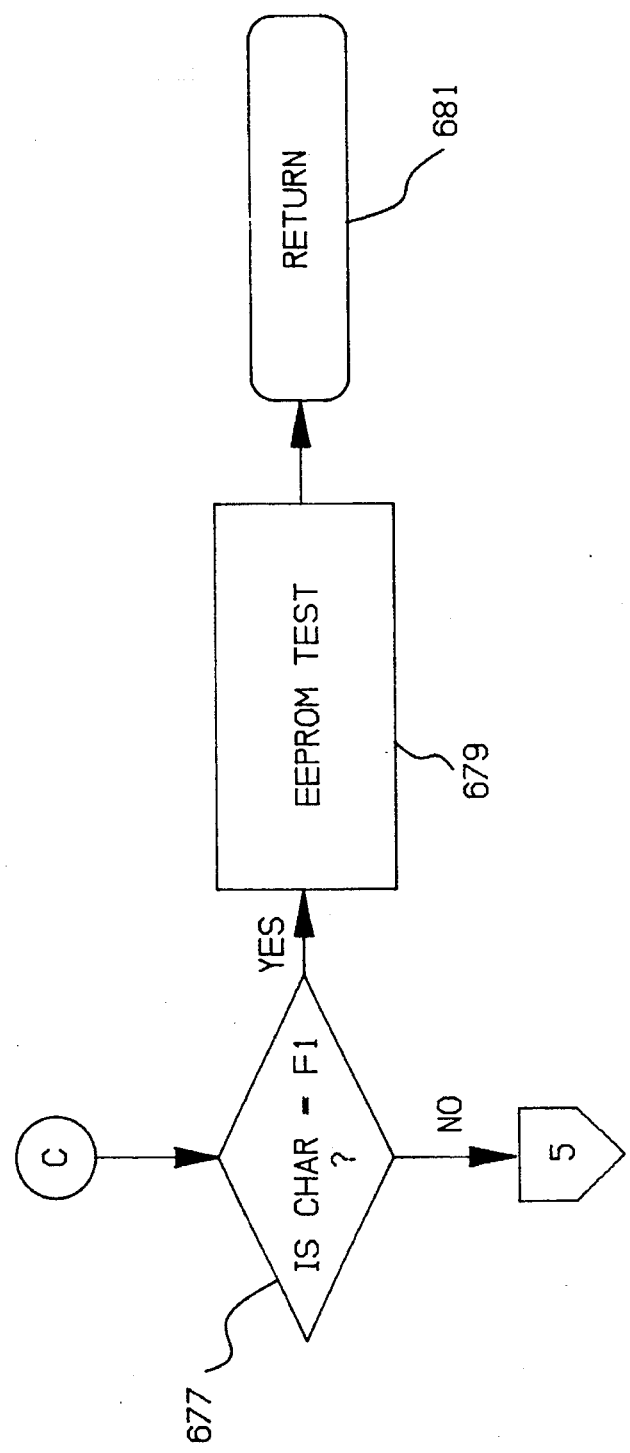
Figure 19P:
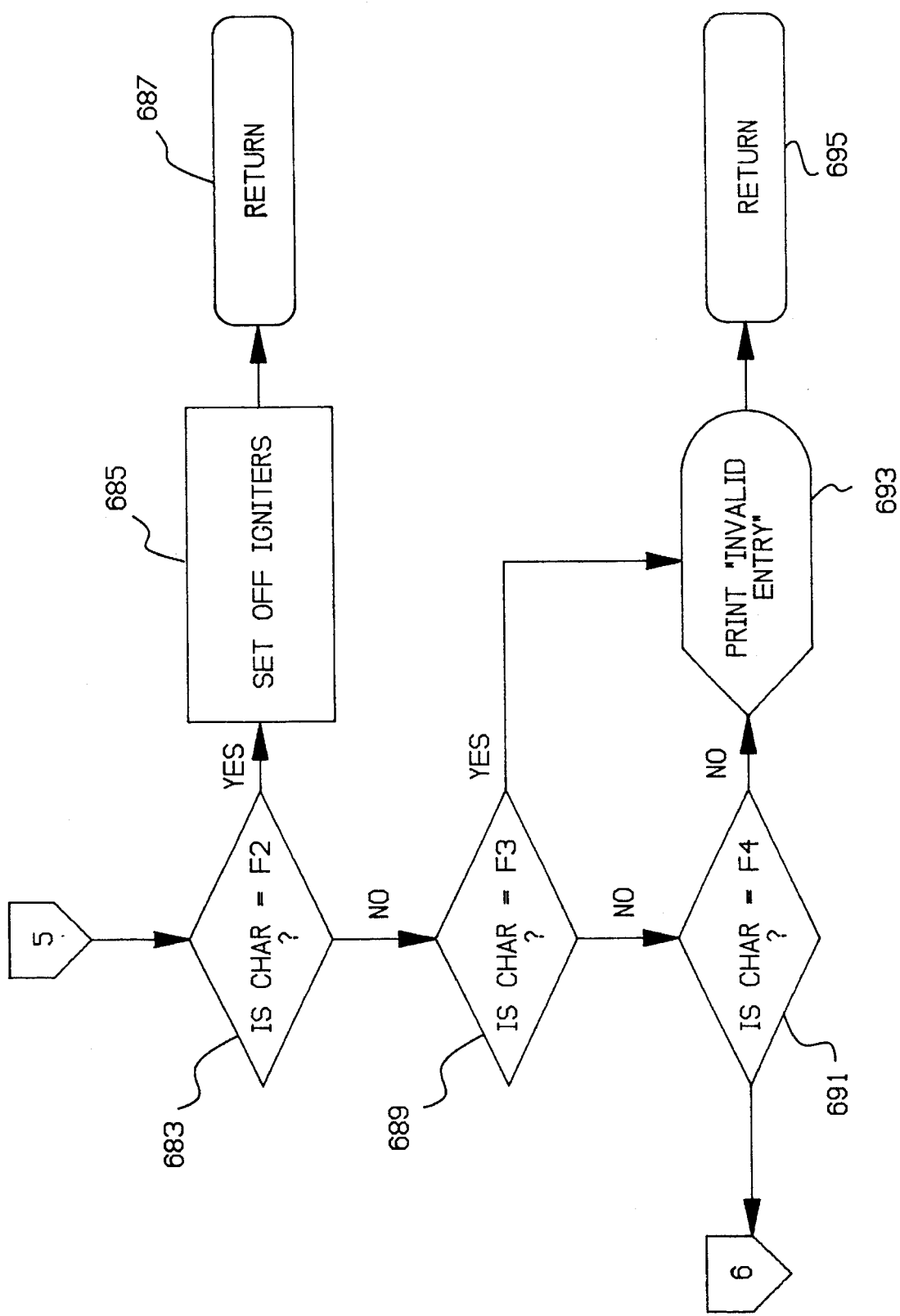
Figure 19Q:
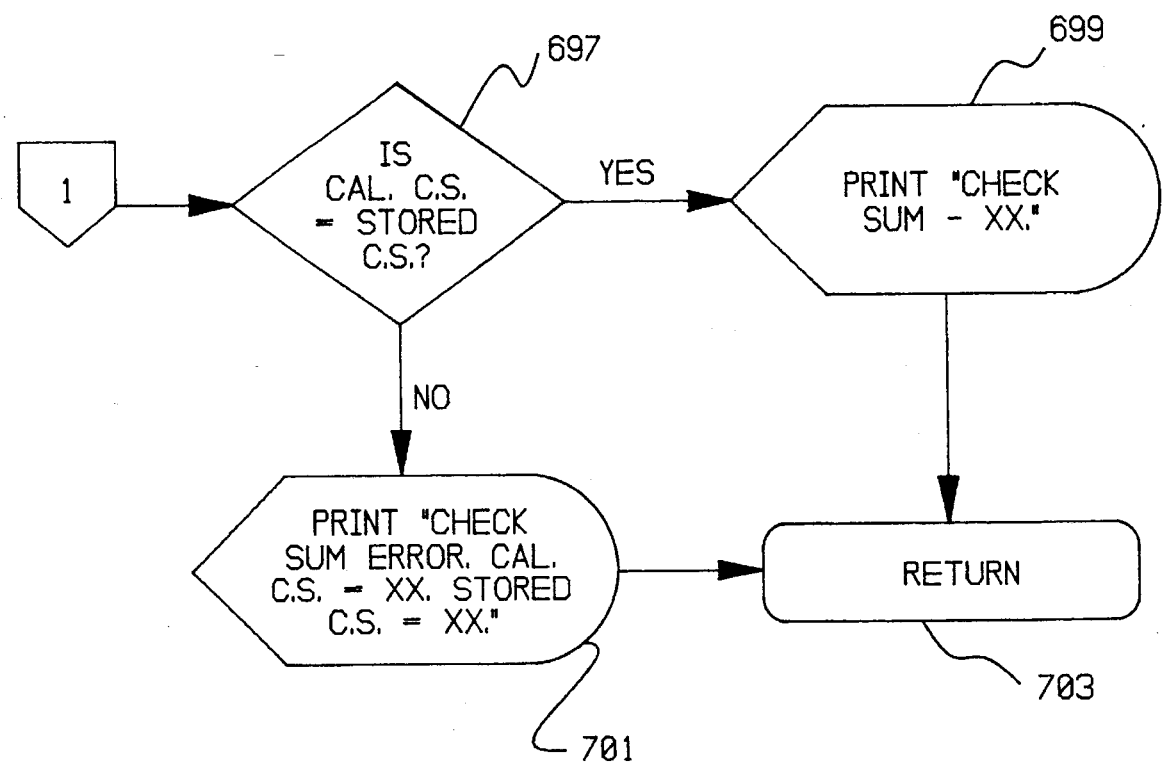
Figure 19R:
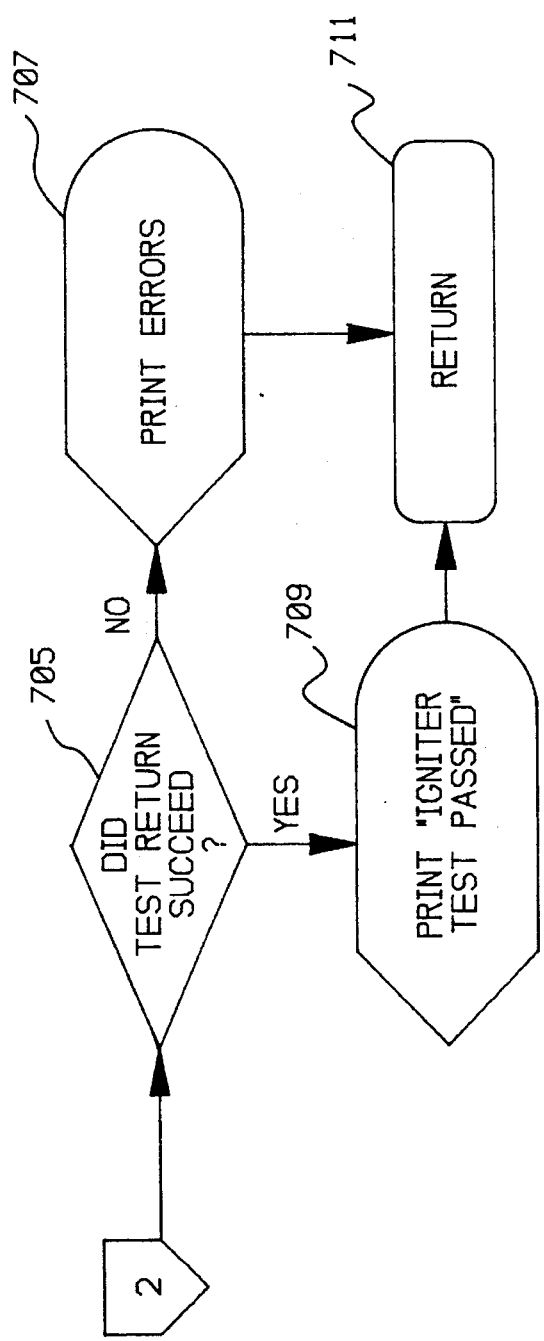
Figure 19K:
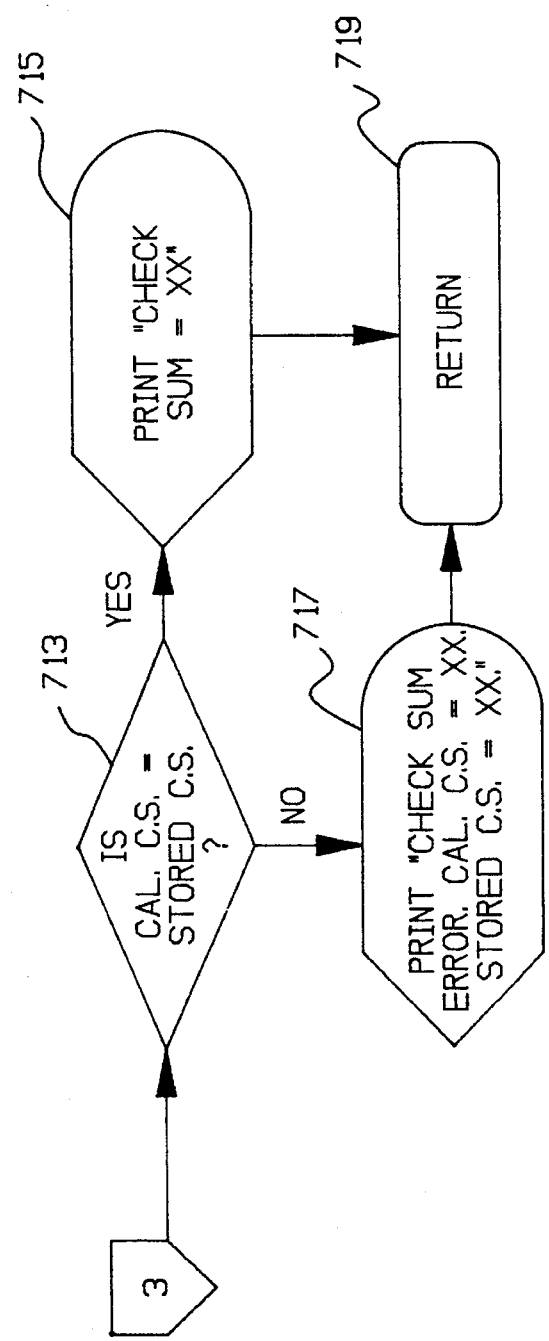

If it has been determined in accordance with the flowchart of FIG. 19 that the ROM check sum operation of software block 627 has been selected, a conventional ROM check sum operation is performed by microprocessor 255, and the process continues at software block 697 of FIG. 19q, wherein the calculated check sum value is compared to a value stored in memory for the correct check sum. If the numbers are identical, the process continues at software block 699, wherein the message "check sum equals xx" is printed on the display of programming terminal 91, providing a visual indication of the check sum value. However, if it is determined in software block 697 that the calculated check sum value does not equal the stored check sum value, the process continues at software block 701, wherein the message "check sum error; calculated check sum equals xx; stored check sum equals xx" is printed to the display of programming terminal 91. At the termination of either software block 699 or 701, the process continues in accordance with software block 703 by returning to the main program.

The Battery Life Remaining Test Operation

Figure 19S:
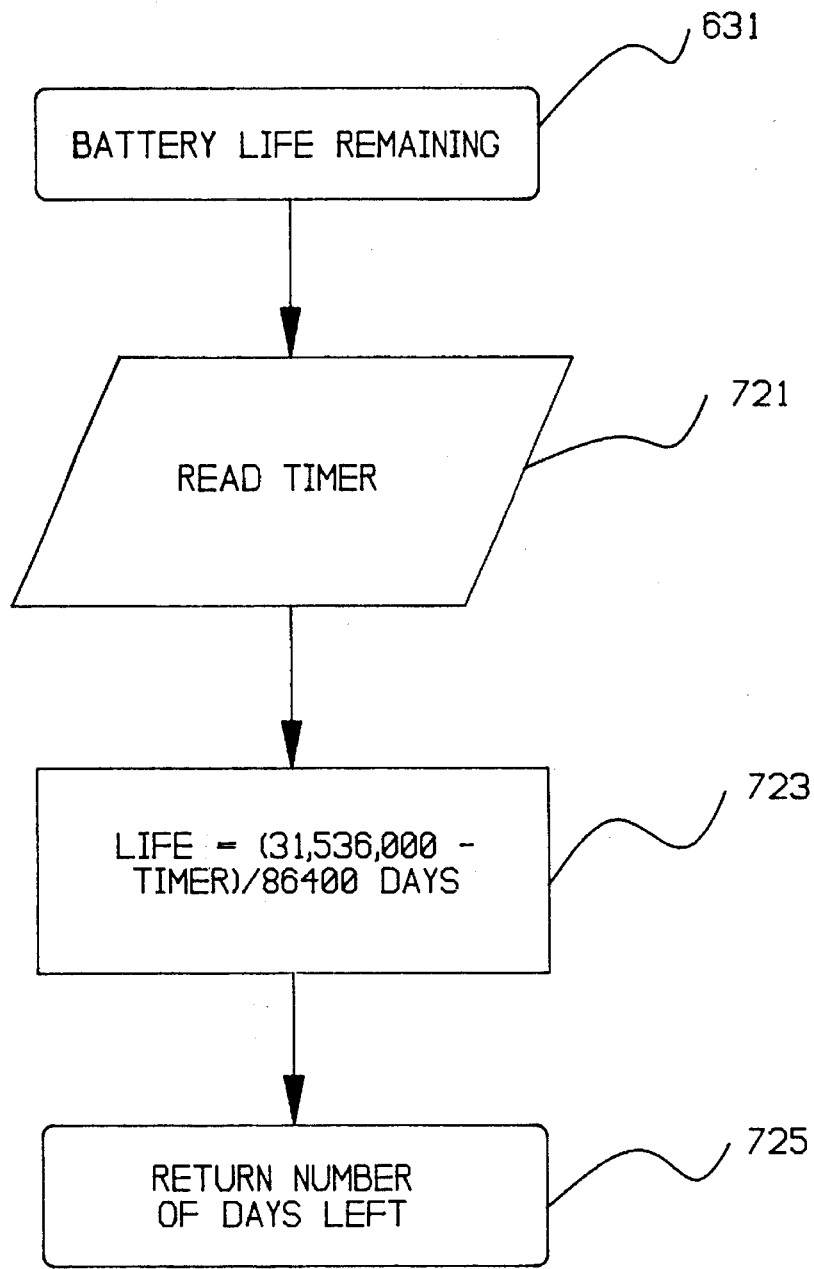

If, in accordance with the flowchart representation of FIGS. 19j, 19k, 19l, the battery life remaining operation of software block 631 is selected by the operator, the process continues at software block 631 of FIG. 19s, wherein the battery life remaining routine is called by microprocessor 255. In the present invention, a timer is automatically set to zero when batteries 243, 265 are installed. The timer counts seconds and is a thirty-two bit number; therefore, it is capable of counting a period of one hundred and thirty-six years, far in excess of practical requirements. In accordance with software block 791, this timer is read. Then, in accordance with software block 723, the remaining life in units of days is calculated. Next, in accordance with software block 725, the process returns by supplying the number of days to the main program, which is represented in FIGS. 19j, 19k, and 19l, which then prints the remaining days left, in accordance with software block 639.

The Igniter Test Operation

Figure 19T:
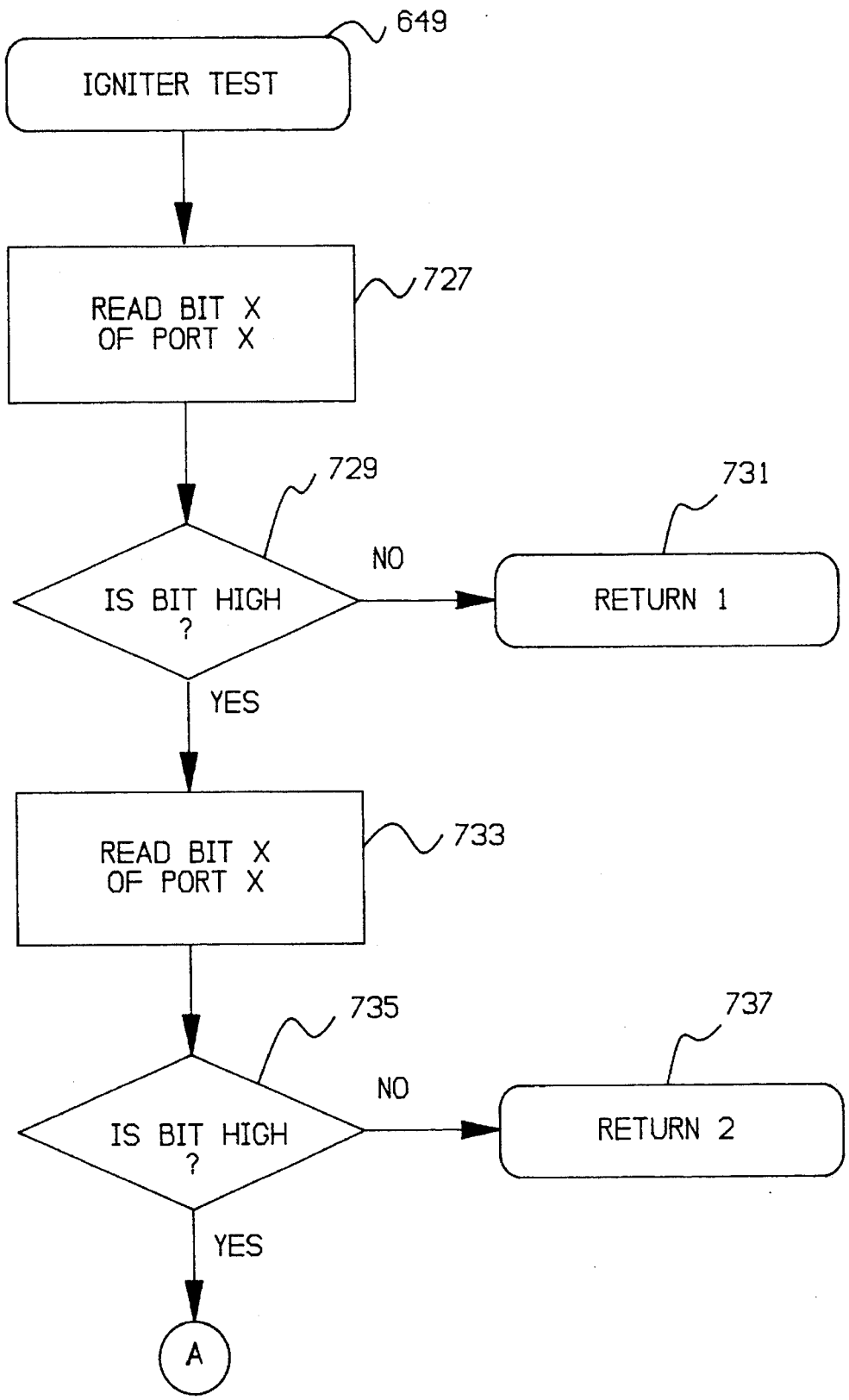
Figure 19U:
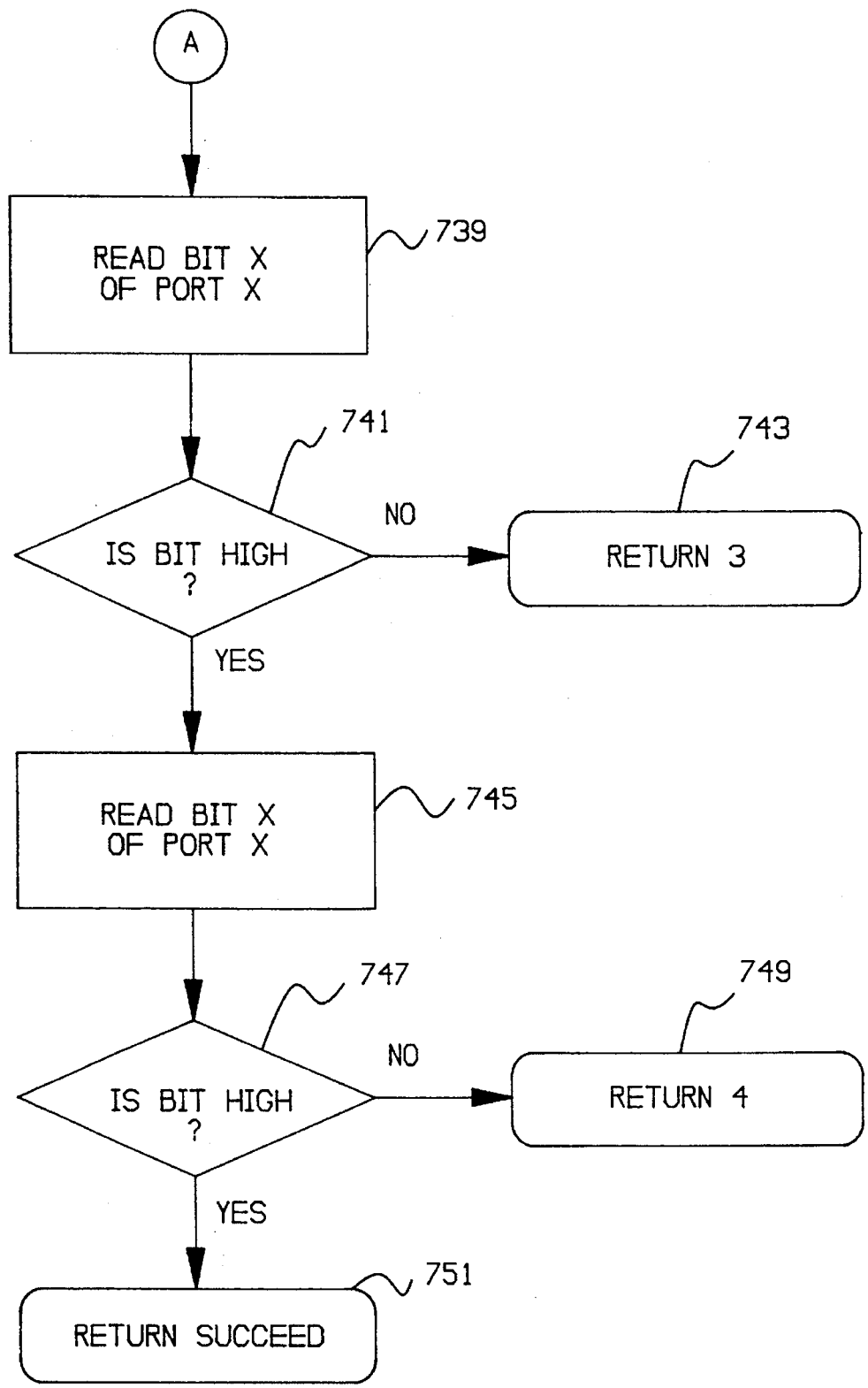
Figure 19V:
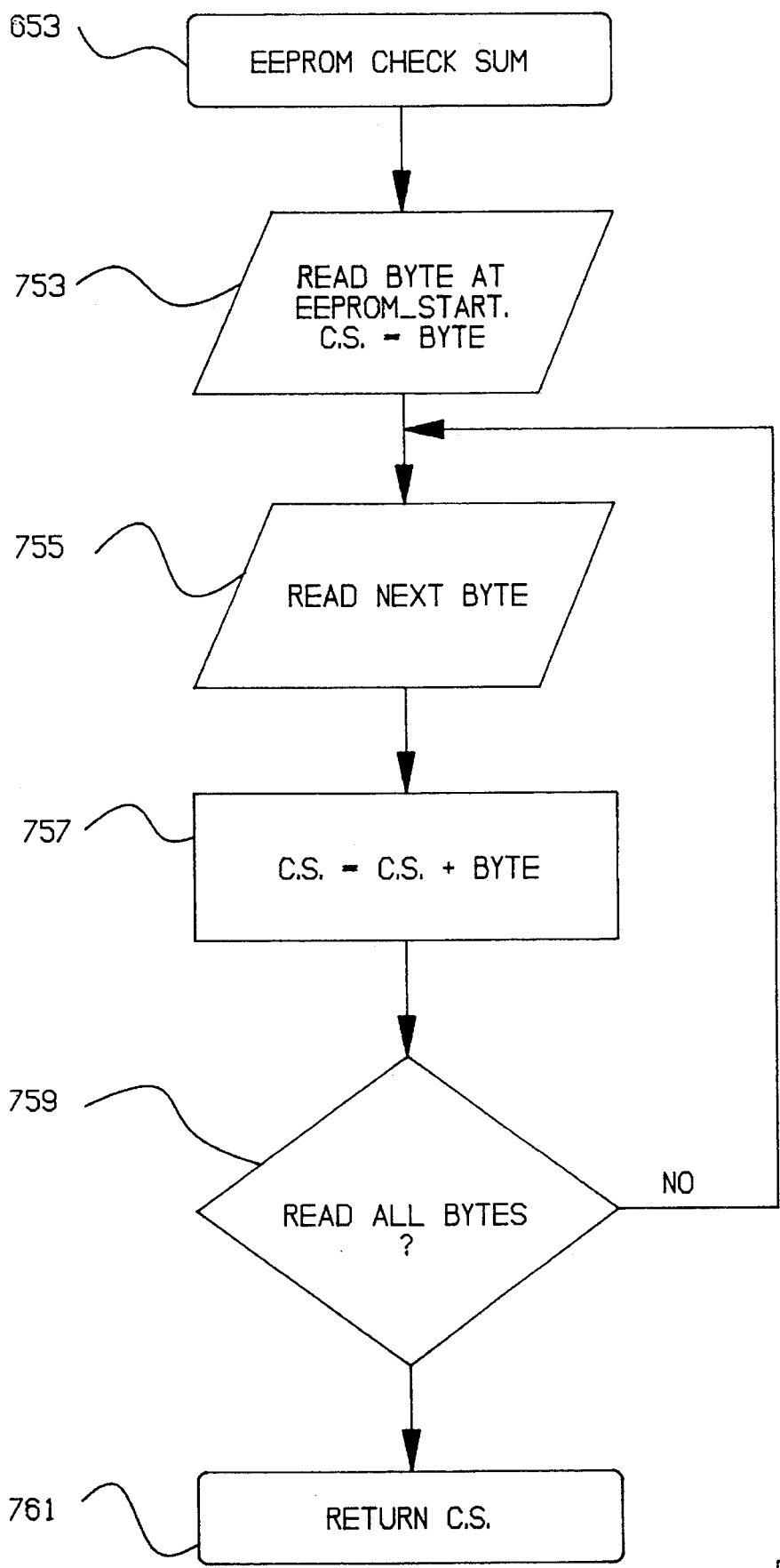

If, during the test mode of operation, the operator selects the igniter test of software block 649 of FIGS. 19m, 19n, and 19o the process continues in the flowchart of FIGS. 19t and 19v at software block 649, wherein the igniter test routine is called by microprocessor 255. Since a plurality of igniters like igniter 263 may be provided, this operation is performed sequentially for each igniter. In the case of four igniters, which is depicted in FIGS. 19t and 19u, the RESULT pin for each continuity test circuit, like continuity test circuit 261, is examined to determine whether it is high or low. A high bit indicates that the igniter is in good operating condition, since the igniter defines a current path which is complete. If the RESULT pin is low, however, an open circuit exists which would prevent the igniter from being fired. All existing igniters should be in good operating condition before a tool is run; therefore, a "succeed" status is only obtained if all igniters pass the test.

Software blocks 727, 729, and 731 are utilized to examine the first bit and to determine whether the RESULT pin of a particular igniter is high or low. If the igniter pin is high, the process continues in software blocks 733, 735, and 737, wherein the second bit is examined to determine whether it is high or low. If it is determined that the bit is high, the process continues at software blocks 739, 741, and 743, wherein the third bit is examined which corresponds to the third igniter. If the bit is high, the process continues at software block 745, 747, 749, wherein the fourth bit is examined to determine the condition of the fourth igniter. In accordance with software block 751, only in the event that all igniters pass this test is the "succeed" status obtained. If any particular igniter fails, in accordance with software block 731, 737, 743, and 749, the program assigns a zero value to the "succeed" variable.

The process continues in the flowchart of FIG. 19kk. In software block 705, microprocessor 255 examines the "succeed" variable to determine whether it is high or low. If it is high, in accordance with software block 709, microprocessor 255 causes the message "igniter test pass" to be displayed at programming terminal 91; however, if it is determined in accordance with software block 705 that the value of the "succeed" variable is low, the process continues at software block 707, wherein an error message is printed to programming terminal 91. At the termination of the operations of either software block 707 or software block 709, the process continues at software block 711 by returning to the main test program.

The EEPROM Check Sum Operation

If it is determined in the flowchart of FIGS. 19m, 19n, and 19o that the EEPROM check sum operation has been requested, the process continues at software block 653 of FIG. 19v, wherein the EEPROM check sum routine is called by microprocessor 255. In accordance with software block 753, microprocessor 255 reads the value of the byte at the address "EEPROM START" and sets the variable C.S. to this value. Then, in accordance with software block 755, microprocessor 255 reads the next byte, and in accordance with software block 757 adds the value of this byte to the value of the variable C.S. This new sum is set as the value of the variable C.S. In accordance with software block 759, this process continues until all bytes have been read; when all bytes have been read, the subroutine returns the value of C.S. to the main program of FIGS. 19m, 19n, and 19o, which is continued at FIG. 19kk, with software block 713 which compares the calculated value of the variable C.S. to the stored value for C.S.; if these values are equal, microprocessor 255 causes a message to be displayed at programming terminal 91 which reads "check sum equals xx"; however, if the values are not equal, the process continues at software block 717, wherein microprocessor 255 causes a warning to be printed. At the termination of either software block 715, or software block 717, the process continues at software block 719, which causes a return to the main program.

Battery Load Test Routine

Figure 19W:
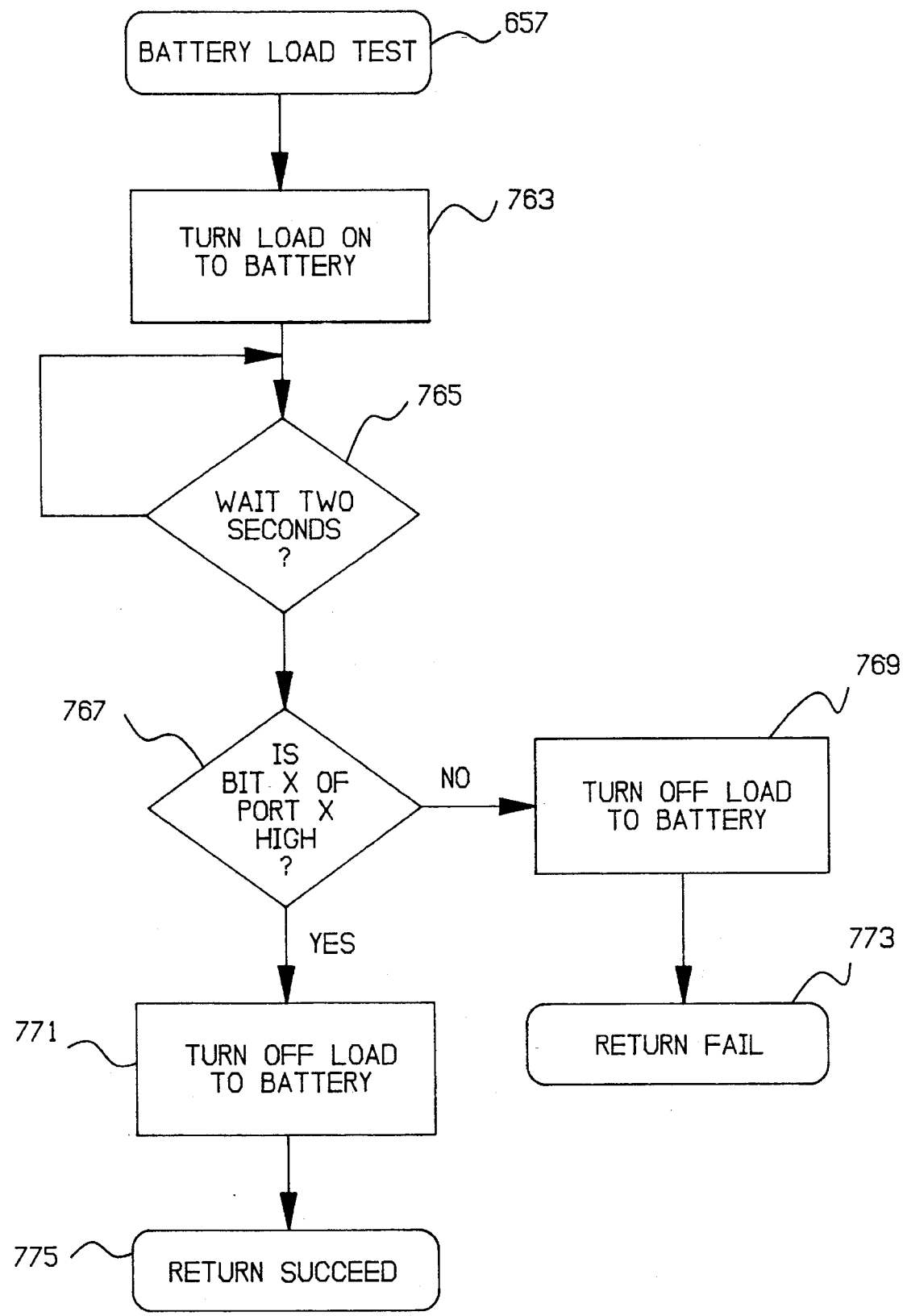

If it is determined in FIGS. 19m, 19n, and 19o that the operator has selected the battery load test routine of software block 657, the process continues at software block 657 of FIG. 19w, wherein microprocessor 255 calls the battery load test routine. As was discussed above, the load test is performed by applying a load to the voltage, and ensuring that the battery voltage remains above a hardware threshold. A comparator determines if the voltage is above the threshold, and sends a true/false signal to a port bit. If the voltage is above the threshold, the bit will be high; if the voltage is below the threshold, the bit will be low. In accordance with software block 763, microprocessor 255 applies a load to the battery, and waits two seconds in accordance with software block 765. Then, in accordance with software block 767, microprocessor 255 examines the bit of a particular port to determine if it is high; if it is determined that the bit is high, the process continues in software block 771, wherein the load is removed from the battery, and the value of the "succeed" variable is set to one, in accordance with software block 775; however, if it is determined that the value of the bit is low, the process continues at software block 769, wherein the load is removed from the battery, and the value of the "fail" variable is set to high, in accordance with software block 773. As was discussed above, the process continues in FIGS. 19*m*, 19*n*, and 19*o*, at software block 663, wherein it is determined whether the battery test resulted in success or failure.

EEPROM Test Routine

If it is determined in the flowchart of FIGS. 19*m*, 19*n*, and 19*o* that the operator has requested a test of the EEPROM, a conventional EEPROM test is conducted, and the results returned and displayed in accordance with software block 681.

Set-Off Igniters Routine

Figure 19X:
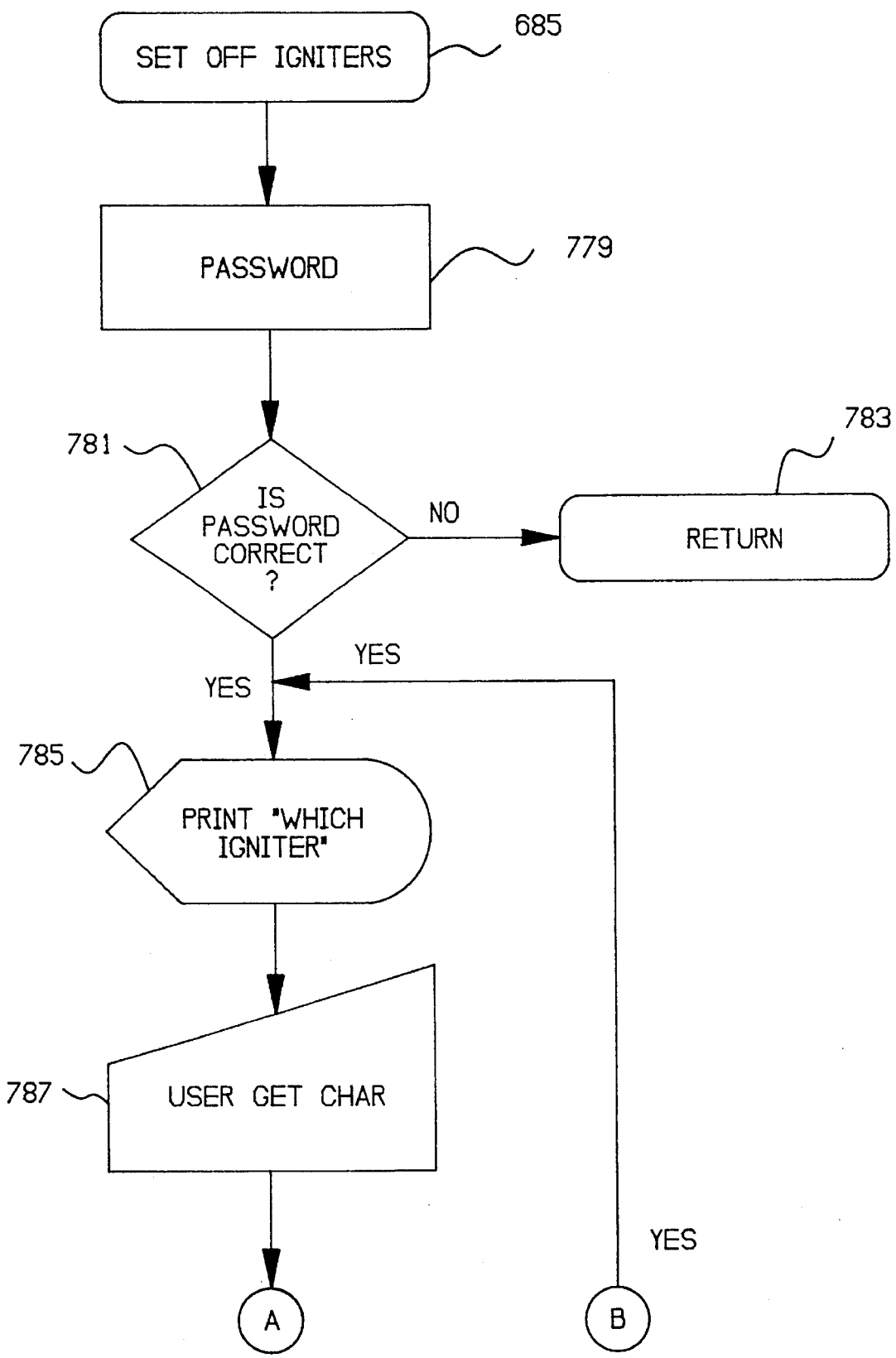
Figure 19Y:
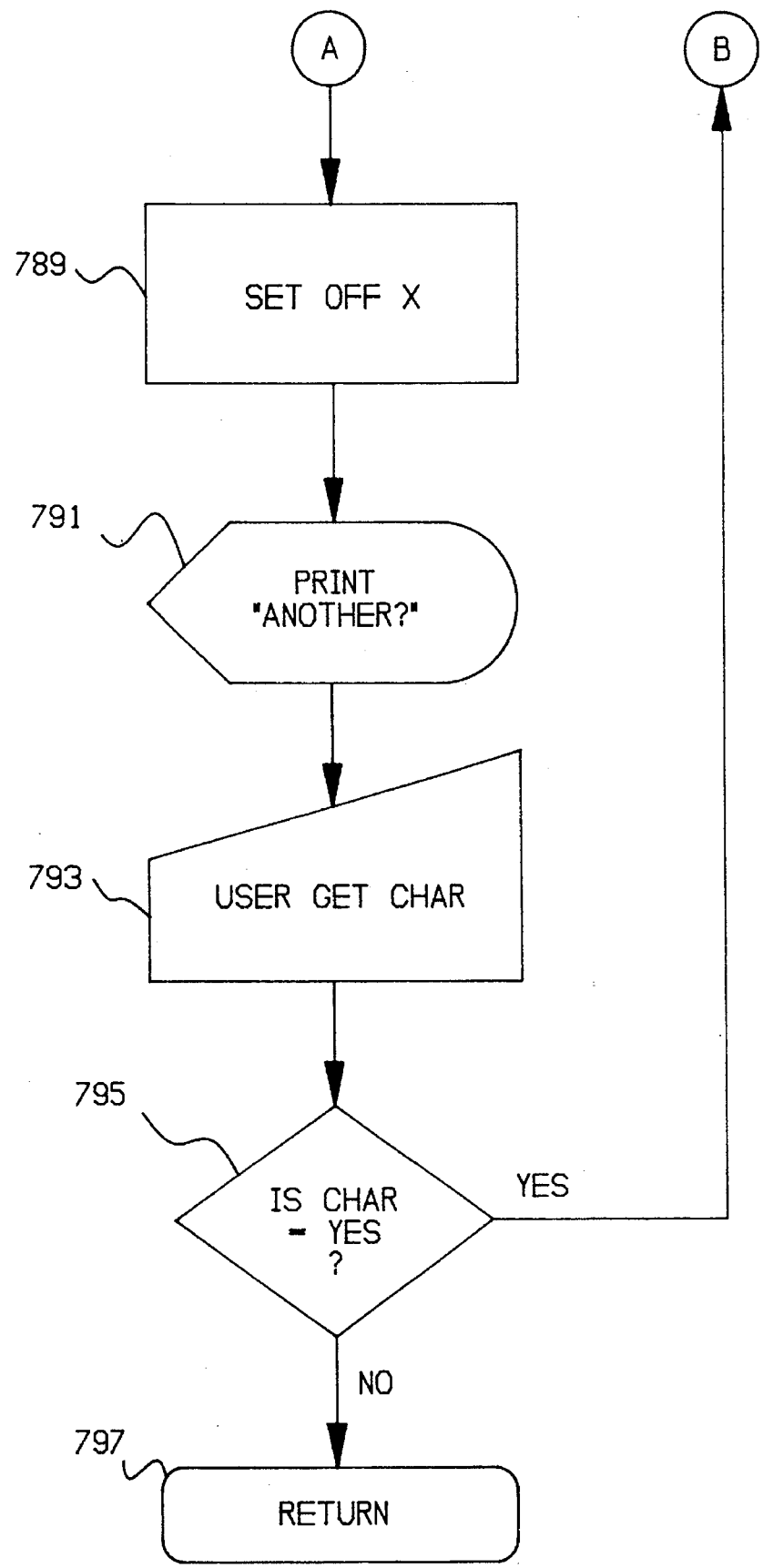

If it is determined in accordance with flowchart 19*p* that the operator has requested performance of the set-off igniters routine, the process commences at software block 685 of FIGS. 19*x* and 19*y*, wherein microprocessor 255 calls the set-off igniter routine. An optional password protection feature may be provided as is set forth in software blocks 779, 781, and 783, which requires that the operator key in a secret password in order to be able to enter the set-off igniters routine. If the operator clears the password test, the process continues at software block 785, wherein microprocessor 255 prompts the operator to identify which igniter he or she desires to actuate. In accordance with software block 787, microprocessor 255 fetches the operator selection, and continues in software block 789 by setting off the identified igniter. In accordance with software block 791, microprocessor 255 asks the operator whether he or she desires to set off another igniter, and then fetches the operator selection in accordance with software block 793. If the operator's response is "yes", the process continues at software block 785; however, if the operator's response is "no" the process continues at software block 797, wherein microprocessor 255 returns to the main program.

The Self-Test Routine

Figure 19Z:
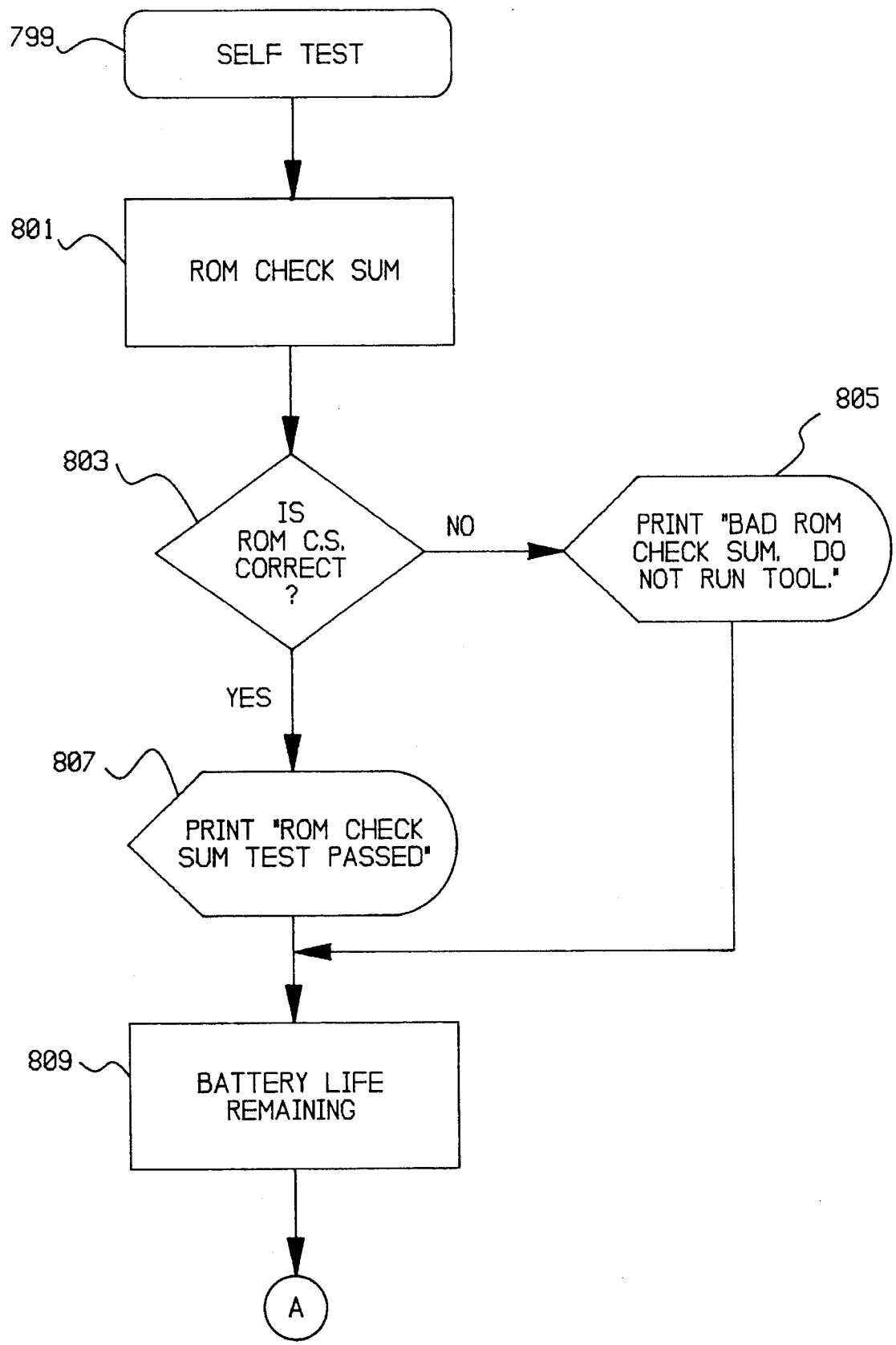
Figure 19A:
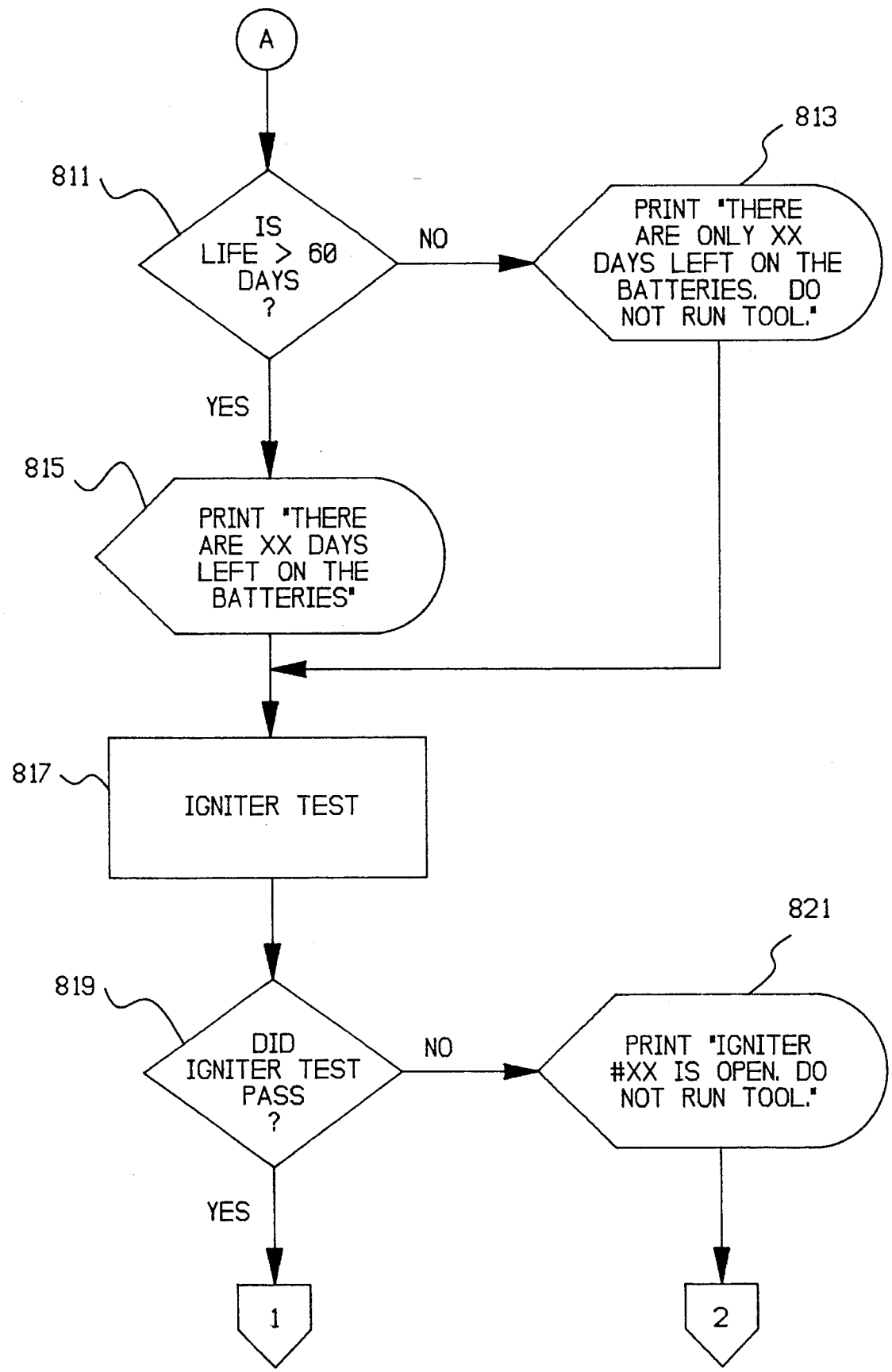
Figure 19B:
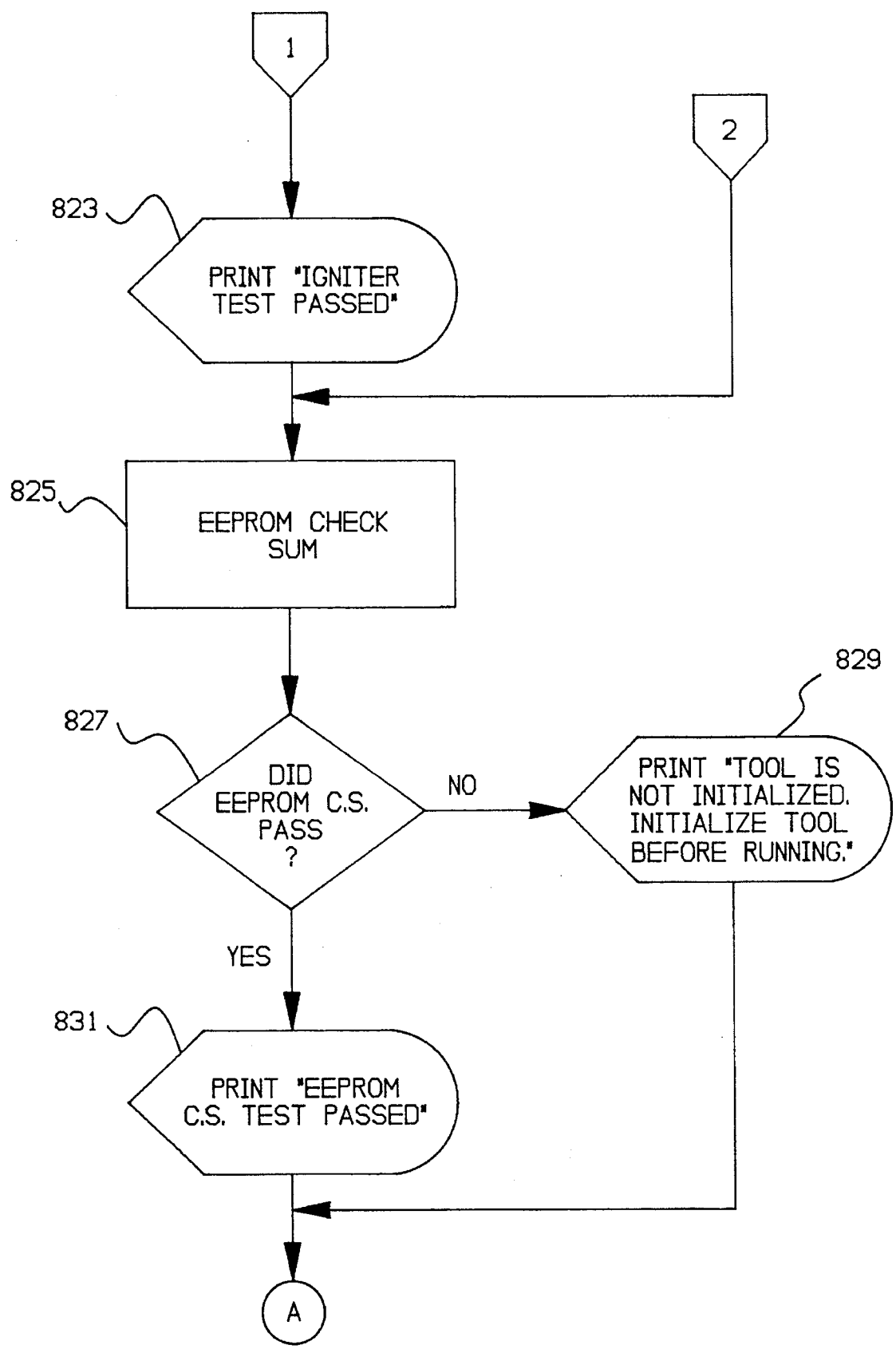
Figure 19C:
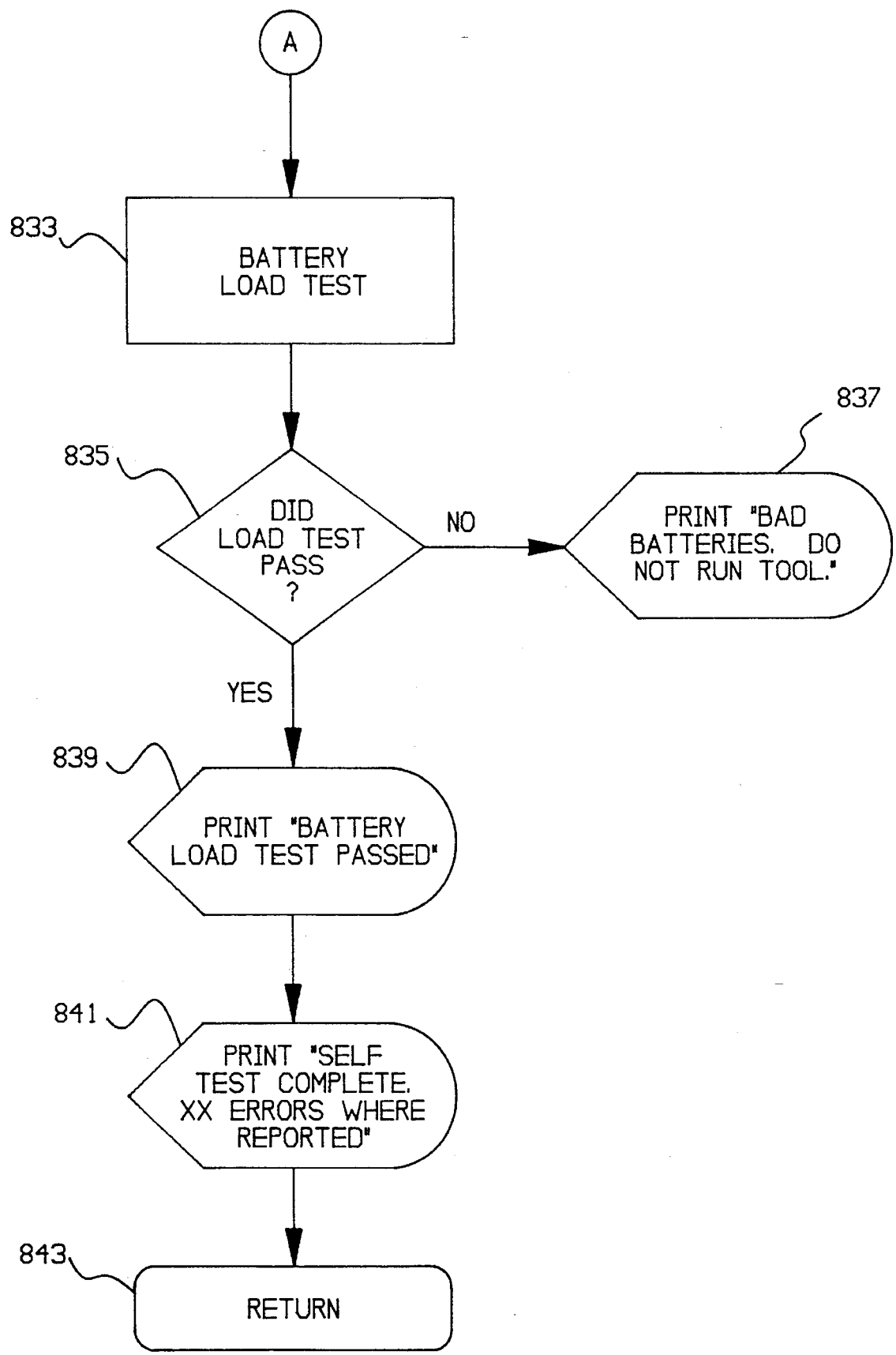
Figure 19D:
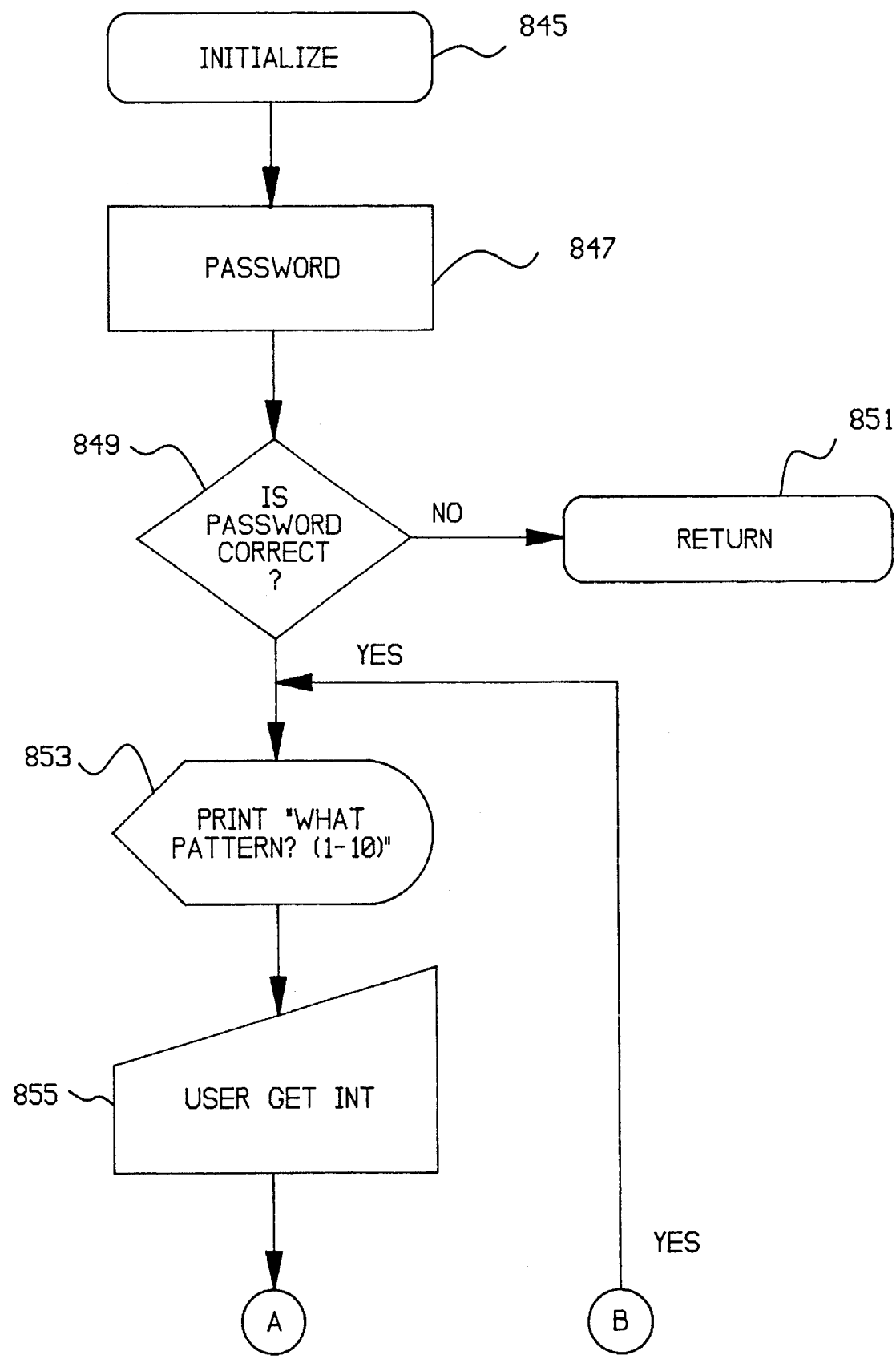
Figure 19E:
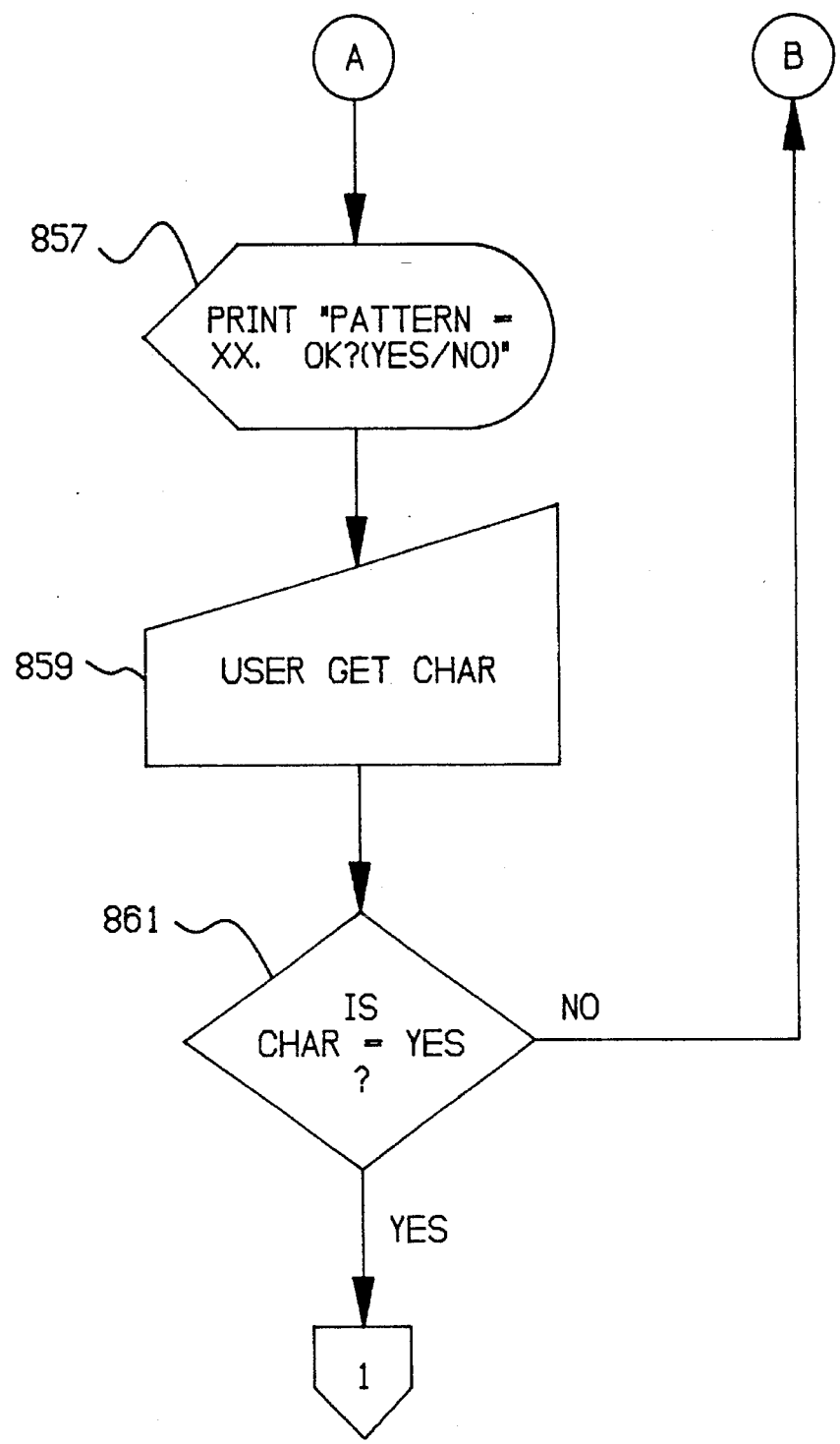
Figure 19F:
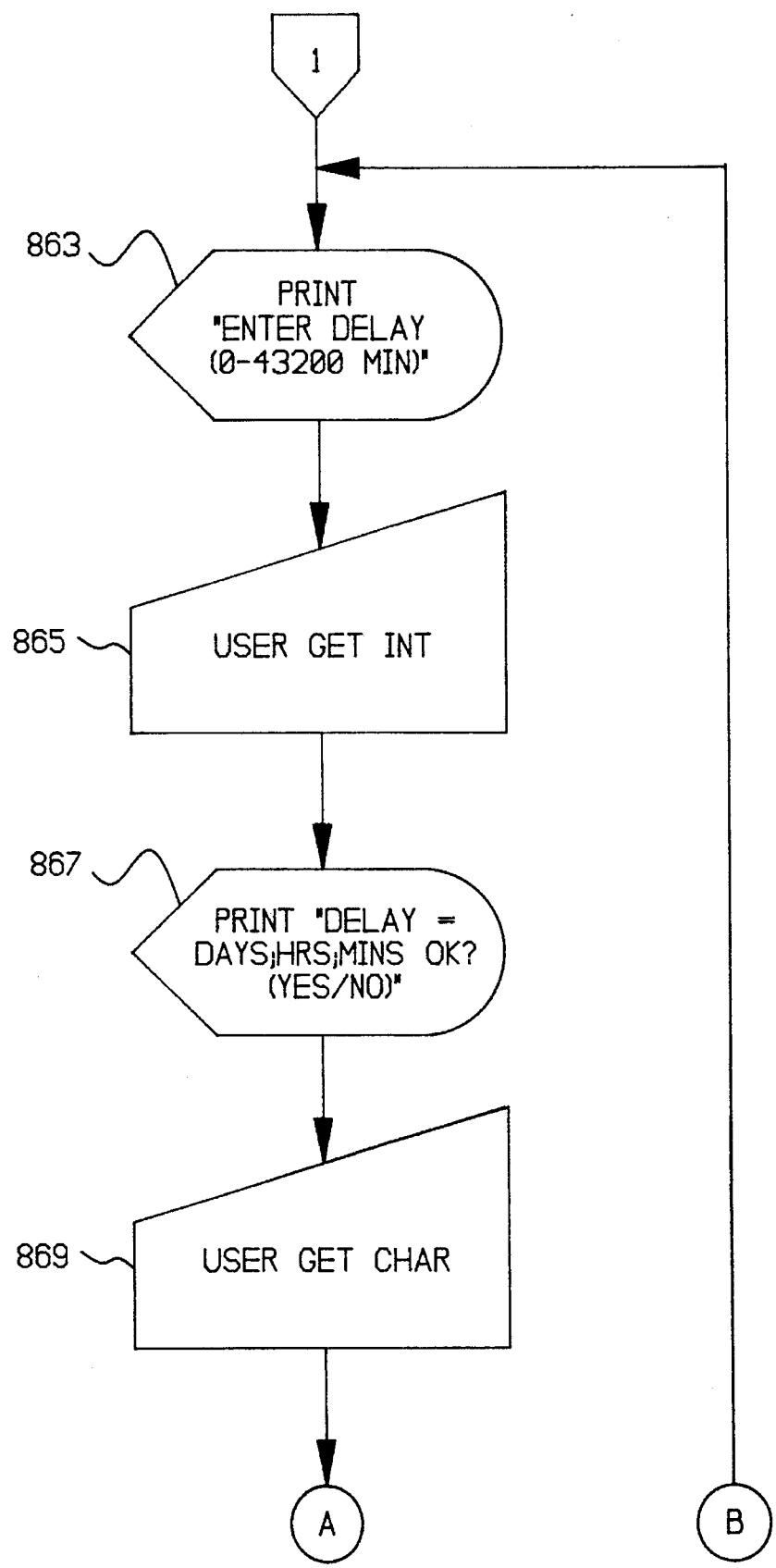
Figure 19G:
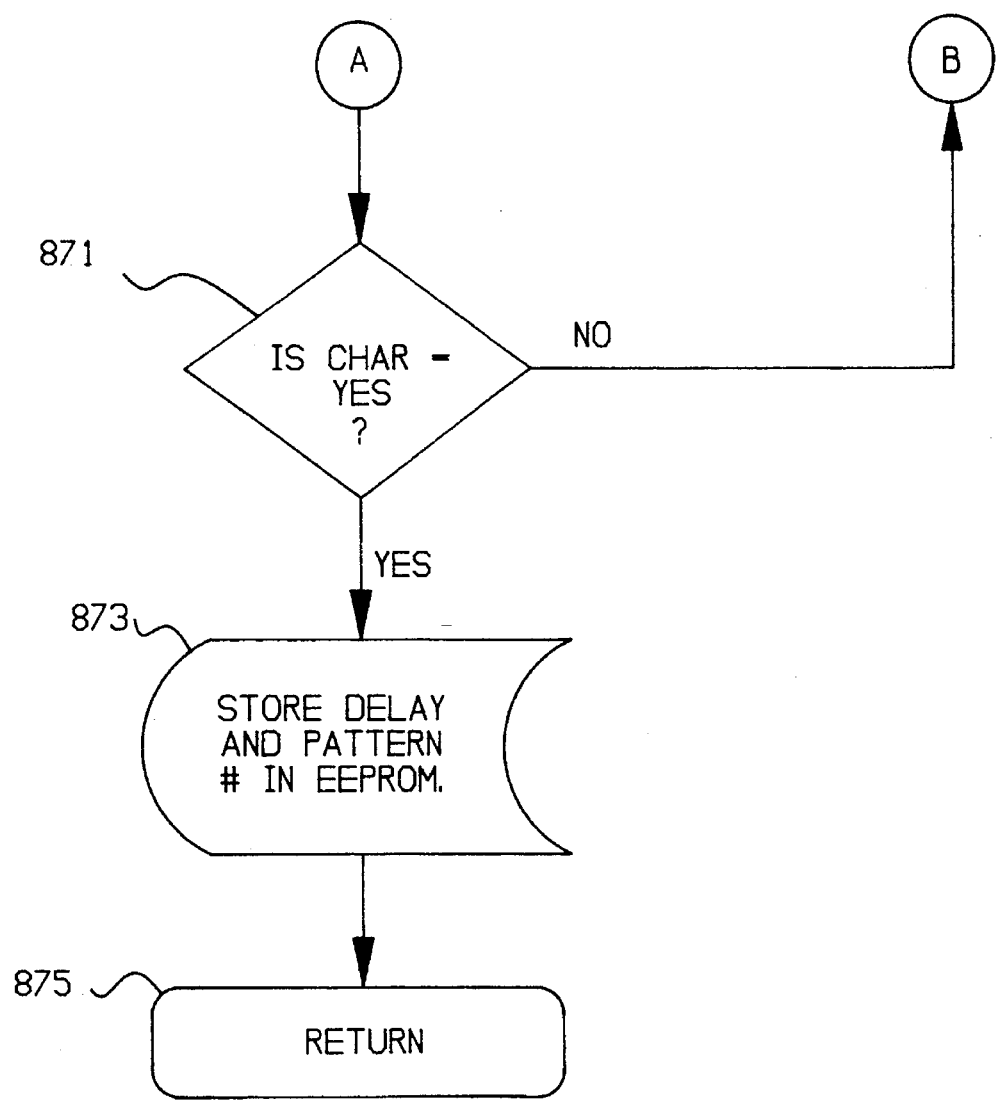
Figure 19H:
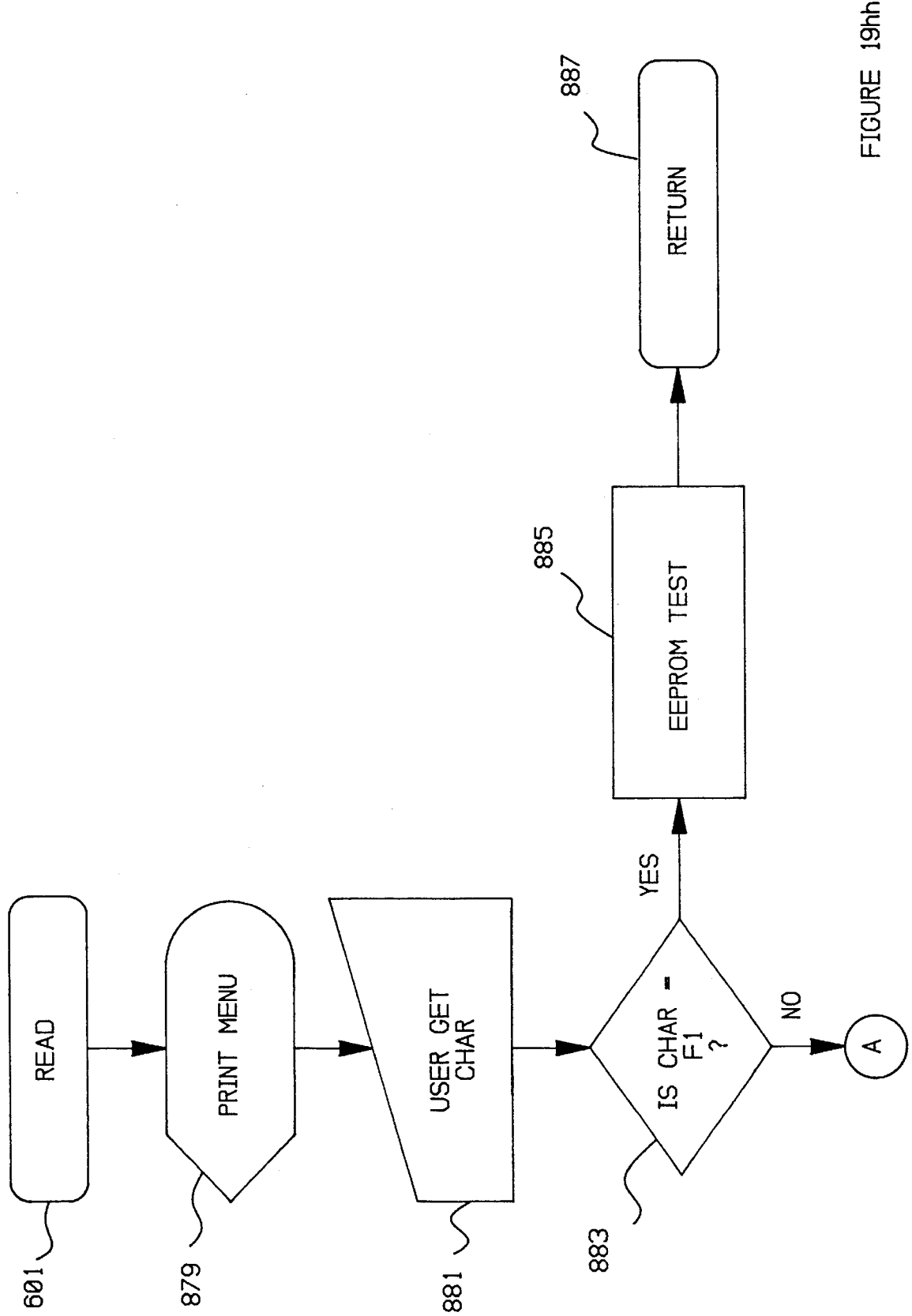
Figure 19I:
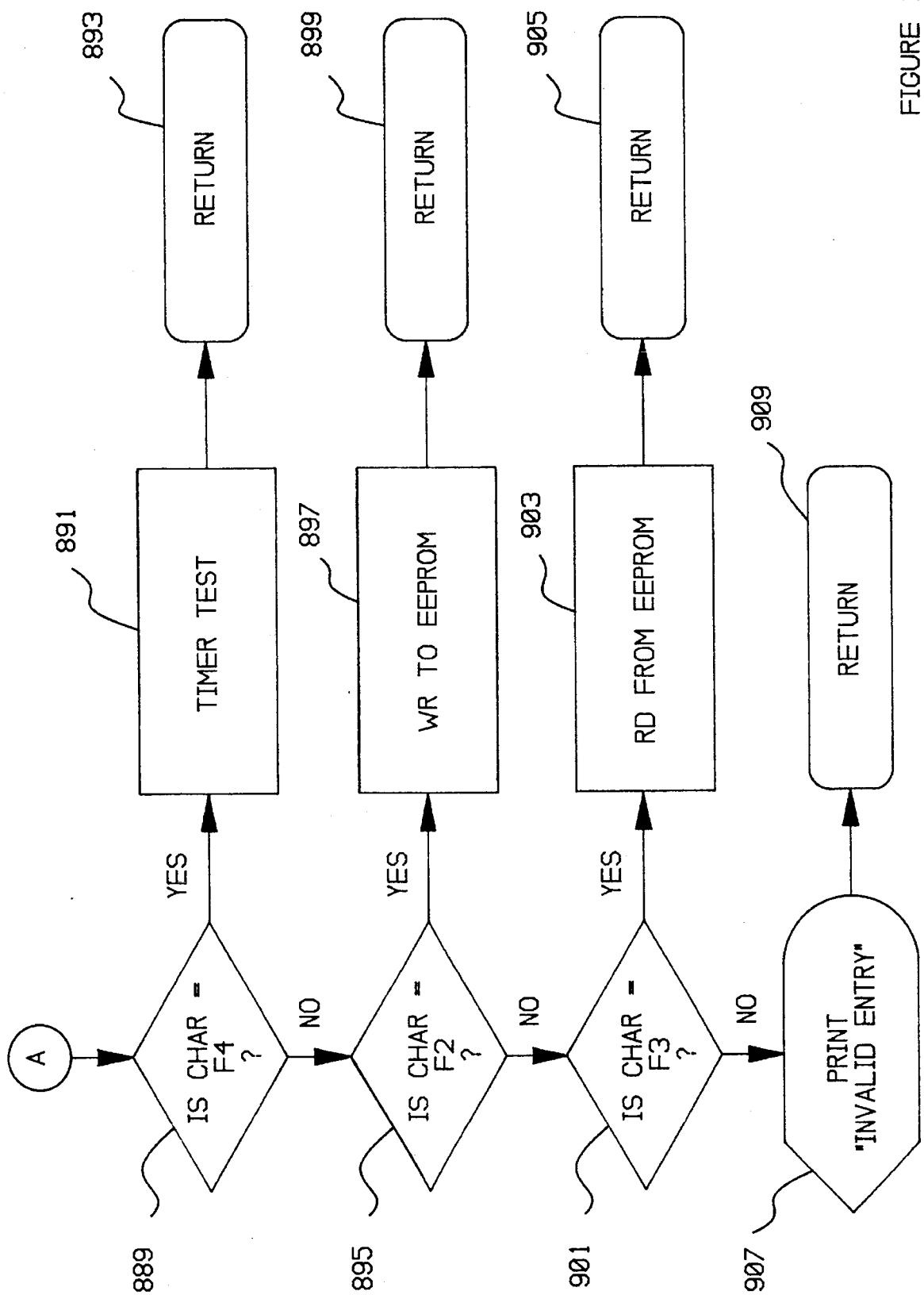
Figure 19J:
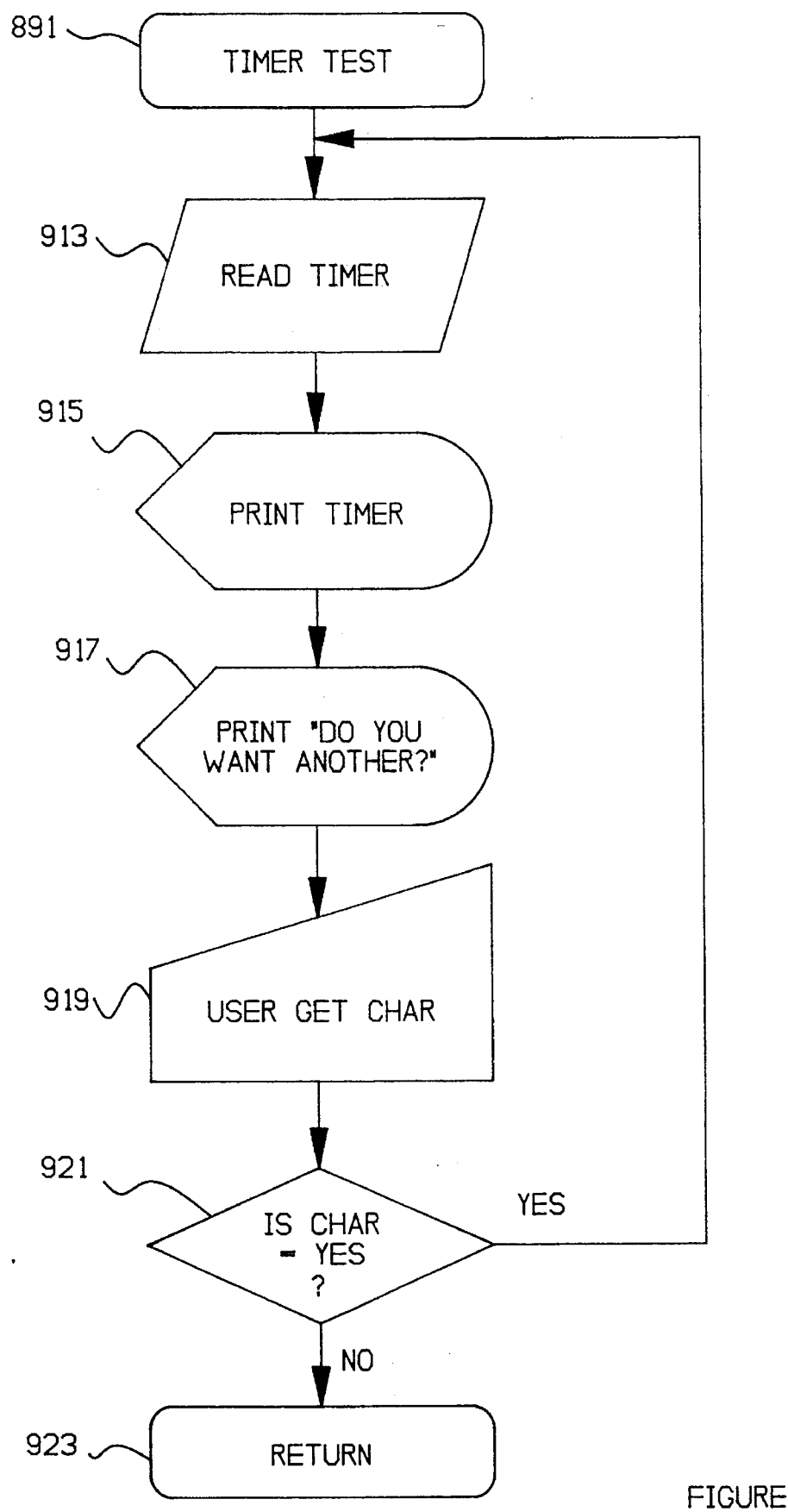

If, in the flowchart of FIGS. 19*j*, 19*k*, and 19*l*, microprocessor 255 determines that the self-test operation of software block 621 is desired, the process continues in the flowchart representation of the self-test routine which is set forth at FIGS. 19*z* and 19*aa*, 19*bb*, and 19*cc*. The process begins at software block 799, wherein microprocessors 255 calls the self-test routine for execution. Then, in accordance with software block 801, the ROM check sum routine is performed, and the result is examined and displayed in accordance with software blocks 803, 805, and 807. Then, in accordance with software block 809, the battery life remaining routine is executed, and the results examined and displayed in accordance with software blocks 811, 813, and 815. Then, in accordance with software block 817, the igniter test routine is performed, and the results are examined and displayed in accordance with software blocks 819, 821, and 823. Next, in accordance with software block 825, the EEPROM sum check operation is performed, and the results examined in accordance with software blocks 827, 829, and 831. Finally, the battery load test routine is examined in software block 833, and the results examined and displayed in accordance with software blocks 835, 837, 839, and 841. Finally, in accordance with software block 843, the process returns to the main program.

Essentially, the self-test routine performs several of the test operations in a sequential and automatic fashion, to eliminate the requirement of further operator input. This simplifies testing operations on the main functional components of the wellbore communication apparatus of the present invention, and prevents errors. The operational blocks identified in FIGS. 19*z* 19*aa*, 19*bb*, and 19*cc* are identical to those discussed above in connection with the user-initiated individual tests, and therefore have only been discussed briefly.

The Initialization Operation

If it is determined in the flowchart representation of the user interface routine of FIGS. 19*g* and 19*h* that the operator has selected the initialization routine, microprocessor 255 performs the operations set forth in the flowchart representation of FIGS. 19*dd*, 19*ee*, 19*ff*, and 19*gg*. The process begins at software block 845, wherein microprocessor 255 calls the initialization routine for execution. An optional password protection feature may be provided, which challenges the operator to enter a secret password, in accordance with software block 847, and then examines the entry, in accordance with software blocks 849, and 851, to determine whether or not to allow initialization of the wellbore communication apparatus. If the operator passes the password challenge, the process continues in accordance with software block 853, wherein the operator is prompted to identify a particular one of a plurality of pre-defined codes which are represented by the arabic numerals 1 through 10, with each arabic numeral representing a particular number of "events" as well as particular time separations for the events, as was discussed above and set forth in tabular format. In accordance with software block 855, microprocessor 255 fetches the operator selection, and then prompts the operator to verify the selection, in accordance with software block 857. In software block 859, microprocessor 255 fetches the operator's verification of the selected pattern. If, in software block 861, it is determined that the operator has verified the selection, the process continues; however, if the operator denies the selection, the operator is once again prompted to select a pre-defined pattern.

In the preferred embodiment of the present invention, a particular time delay between recognition of the coded message and actuation of the wellbore tool may be established by the operator. In accordance with software block 863, microprocessor 255 prompts the operator to enter a time delay in units of minutes between zero minutes and forty-three thousand, two hundred minutes. In accordance with software block 865, microprocessor 255 fetches the operator selection, and then prompts the operator to confirm the selection in accordance with software block 865. In accordance with software block 869, microprocessor 255 fetches the operator's verification or denial of the selected delay interval. If the operator's response is "no", the process returns to software block 863, wherein the operator is provided another opportunity to enter a delay interval; however, if the response is "yes", the process continues at software block 873, wherein the delay and pattern are stored in EEPROM 259, and microprocessor returns to the main program in accordance with software block 875.

Read Operations

If it is determined in the flowchart of FIGS. 19*g* and 19*h* that the operator has selected the read operation of software block 601, the process continues in FIGS. 19*h* and 19*ii*, wherein microprocessor 255 calls the read routine, in accordance with software block 861. The process continues at software block 879, wherein a menu is printed which provides the operator with a plurality of read options, including reading the results of a EEPROM test operation, reading the results of a timer test operation, reading the content of write operations to EEPROM, and reading the content of read operations from EEPROM. In the flowchart of FIGS. 19*hh* and 19*ii*, the function keys F1, F2, F3, and F4 are utilized to identify these four operations, with F1 identifying the EEPROM test results of software block 885, with F2 corresponding to the content of write operations to the EEPROM in accordance with software block 897, with F3 corresponding the content of read operations from EEPROM in accordance with software block 903, and with F4 corresponding to the results of the time test in accordance with software block 891.

In FIGS. 19*hh* and 19*ii*, microprocessor 255 fetches the operator selection, and analyzes it in accordance with software blocks 883, 889, 885, and 901, and then enters the appropriate subroutine of software blocks 885, 891, 897, and 903 in accordance with the operator selection. At the completion of any of these software block operations, microprocessor 255 returns to the main program, in accordance with software blocks 887, 893, 899, and 905. If the operator enters a character other than one of the function characters, in accordance with software block 907 and 909, the user is notified of the error, and microprocessor 255 returns to the main program, in accordance with software blocks 907, and 909.

The Timer Test Operation

In accordance with the flowchart of FIG. 19*jj*, if it is determined in the flowchart of FIGS. 19*hh* and 19*ii* that the operator has selected the timer test operation, the process commences at software block 891, wherein microprocessor 255 calls the particular routine for execution. Then, in accordance with software block 813, microprocessor 255 reads the content of clock 239 of FIG. 12. In accordance with software block 915, microprocessor 255 prints the content of the timer, and then prompts the user in accordance with software block 917 to indicate whether another reading of the timer is desired. In accordance with software block 919, microprocessor 255 fetches the operator selection. If the selection is "yes" the process continues by returning to the step of software block 913; however, if the operator selection is "no" the process continues as software block 923 by returning to the main program. By having multiple readings of the timer, the operator may test the accuracy of the timer against an external clock.

The Fire Routine

When a coded message is detected by the reception apparatus, microprocessor 255 should enter a fire routine which is set forth in flowchart form in FIG. 19*e*. The process begins in software block 545, wherein microprocessor 255 calls the fire routine for execution. The process continues at software block 559, wherein the programmed delay for firing is read from the EEPROM. In software block 561, microprocessor 255 determines if the program time delay has expired; once the program time delay has expired, microprocessor 255 proceeds by executing the steps of software blocks 563, 565, 567, and 569 by firing the four igniters sequentially. Since it is sometimes difficult to generate sufficient heat to initiate the thermally-actuated chemical reaction, software block 571 is provided to ensure that three separate sequential attempts have been made to ignite each igniter. Once the three attempts have been completed, microprocessor 255 turns itself off, in accordance with software block 575.

Drive Mechanism

Figure 20:
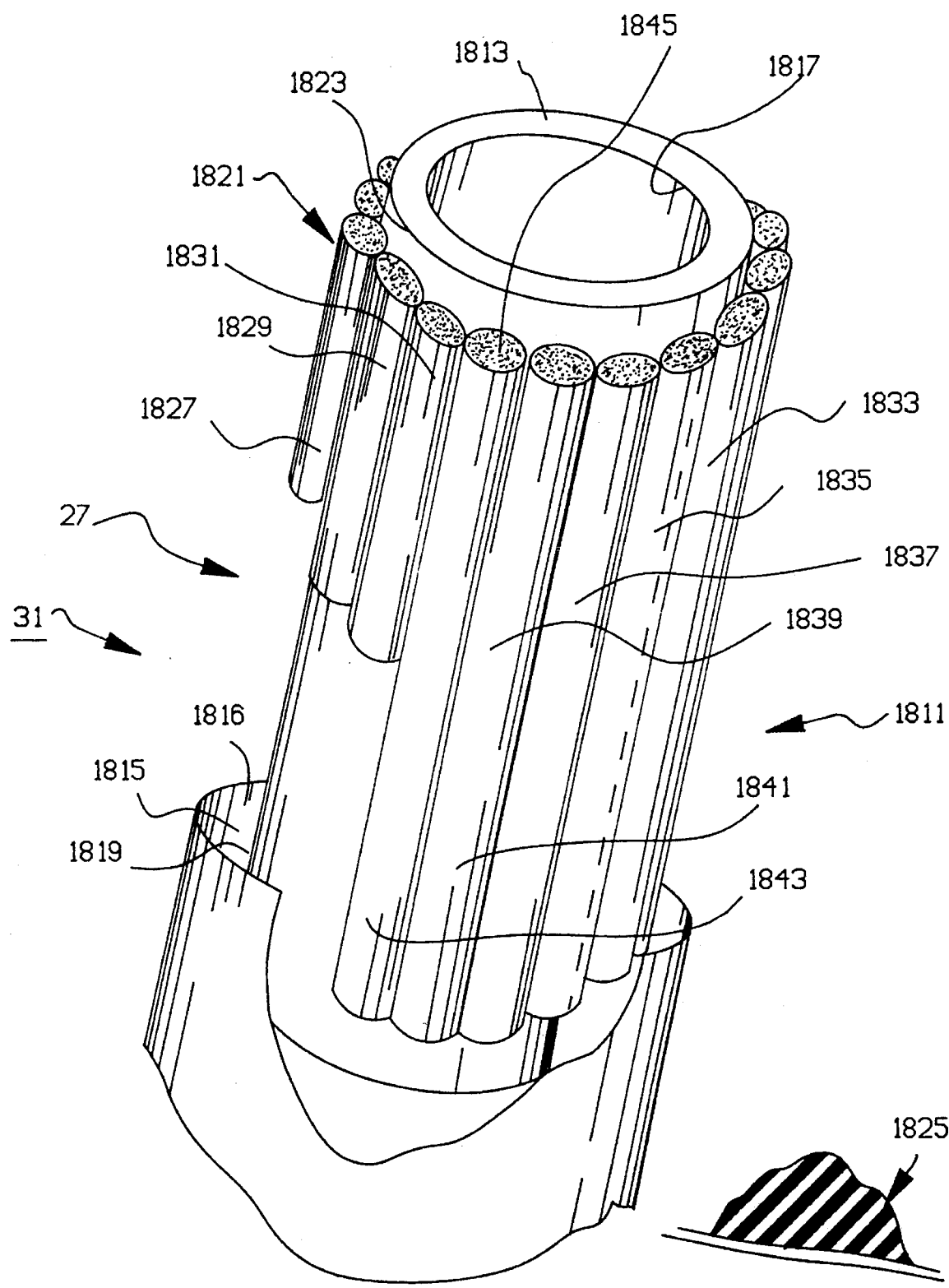
FIG. 20 is a fragmentary and exploded view of one type of actuation apparatus which can be remotely actuated by the wellbore communication apparatus of the present invention, in simplified form.

FIG. 20 is a fragmentary and exploded view of one type of drive mechanism 27 of electrically-actuable wellbore tool 31 (of FIG. 1) which can be remotely actuated by the wellbore communication apparatus 11 (of FIG. 1) of the present invention. The portion of drive mechanism 27 of electrically-actuable wellbore tool 31 which is shown in FIG. 20 includes inner tubular member 1813 and outer tubular member 1815, with inner tubular member 1813 concentrically disposed within central bore 1816 of outer tubular member 1815. Annular region 1819 is defined between outer surface 1823 of inner tubular member 1813 and central bore 1816 of outer tubular member 1815. Inner tubular member 1813 is also equipped with central bore 1817, which allows the passage of wellbore and completion fluids upward and downward within drive mechanism 27 (of FIG. 1).

In the preferred embodiment of the present invention, a plurality of selectively actuatable pressure generators 1821 are circumferentially disposed about inner tubular member 1813, and may be held firmly in place within annular region 1819 by use of packing substance 1825, which may comprise silicone grease, which is a thermal and electrical insulator. In the a preferred embodiment of the present invention, a plurality of selectively-actuable pressure generators 1821 include metal tubes having a length of either one or two feet, with an inner diameter of less than an inch (and preferably 11/16 of an inch). As shown in FIG. 20, metal tubes 1827, 1829, 1831 are approximately one foot in length, while metal tubes 1833, 1835, 1837, 1839, 1841 and 1843 are approximately two feet in length. In the preferred embodiment of the present invention, inner tubular member 1813 and outer tubular member 1815 are approximately two feet in length, and are equipped with upper and lower threaded couplings and fluid-tight seals, allowing inner and outer tubular members 1813, 1815 to be coupled into the wellbore tool which is depicted in FIGS. 2 and 3 herein, in lieu of nitrogen chamber 1171.

Each of the plurality of selectively-actuable pressure generators 1821 includes an electrically or thermally triggerable gas generating substance. In the preferred embodiment of the present invention, each of the plurality of selectively actuable pressure generators 1821 is filled with thermally activated gas generating substance 1845. Any solid propellant, such as those used for rocket propulsion and in underwater and road flares may be used as the thermally-activated substance 1845. However, any gas-generating electrically or thermally activated substance can be used. The chemical reaction may be triggered by electric match igniters, which are conventional, such as Estes brand model rocket igniters.

Figure 21:
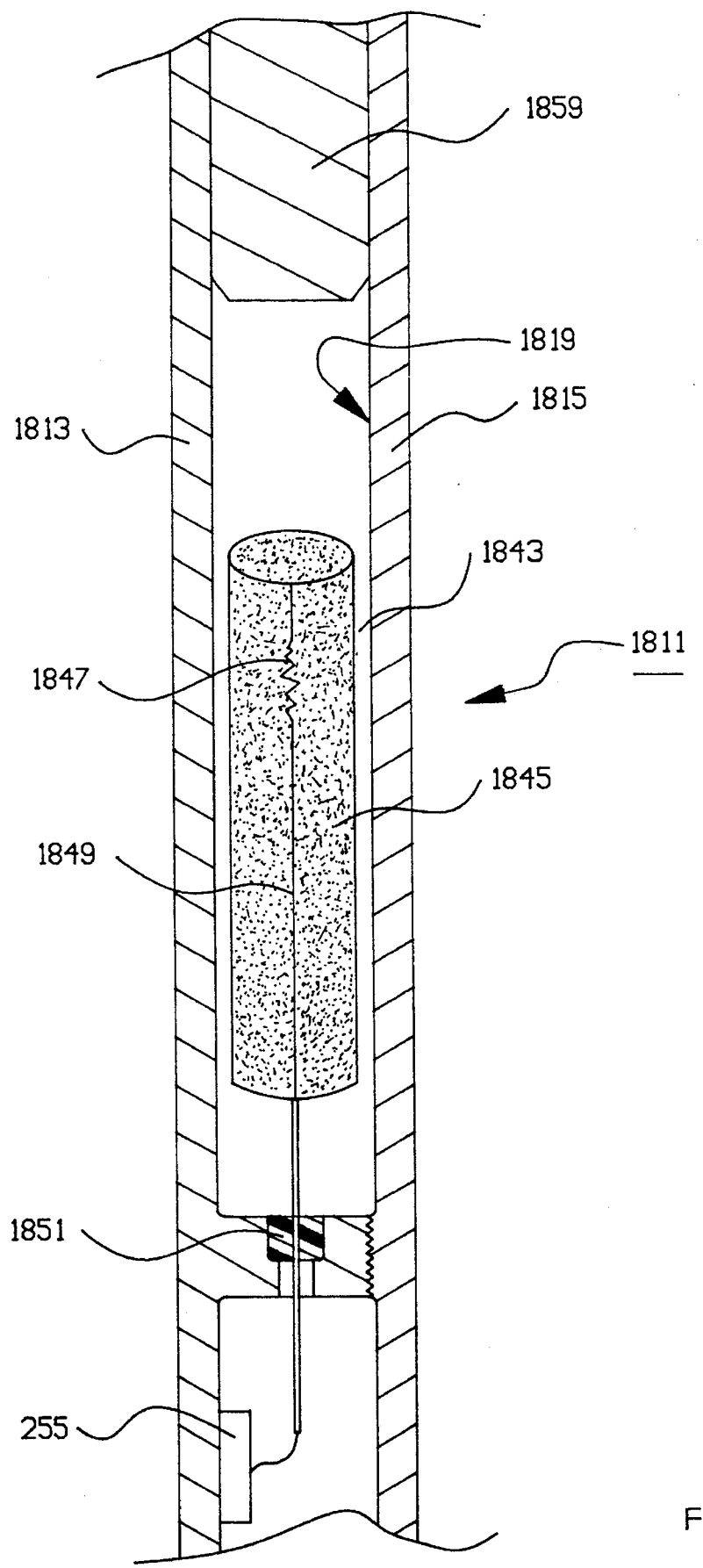
FIG. 21 is a fragmentary longitudinal section view of a portion of the actuation apparatus of FIG. 20.

FIG. 21 is a fragmentary longitudinal section view of a portion of drive mechanism 27, FIG. 20. As is shown, metal tube 1843 is disposed in annular region 1819 between inner tubular member 1813 and outer tubular member 1815. Thermally-activated substance 1845 is disposed within the central bore of metal tube 1843. Igniter 1847 is shown disposed surrounded by the material of thermally-activated substance 1845. Electrical conductor 1849 extends through metal tube 1843 and is electrically coupled to igniter 1847, and to electrical ground.

Electrical conductor 1849 is passed into annular region 1819 by a conventional pressure containing electrical feed-through 1851. Electrical conductor 1849 is connected at its lowermost end to printed circuit board 1853 (not depicted) which includes a number of electrical components mounted thereon, including electrical switches 1855 (not depicted) and microprocessor 255. As will be discussed below, electrical switches 1855 and microprocessor 1857 cooperate to selectively activate igniters and cause the initiation of a chemical reaction in thermally-activated substance 1845, which releases a gas which is contained by annular region 1819, which forms a gas-tight pressure containment vessel.

Piston 1859 at least in-pan defines the pressure containment vessel of annular region 1819, and serves as a force-transferring member of drive mechanism 27. It is shown only in simplified form in FIG. 21. As is conventional, piston 1859 may be utilized to energize a wellbore tool such as a wellbore packer which includes an elastomeric resilient element. Piston 1859 will serve to transfer force from the gas generated from the burning of thermally-activated substance 1845 into an axial force which serves to energize the elastomeric packing element and form a fluid-tight and gas-tight seal against a selected wellbore surface.

Figure 22:
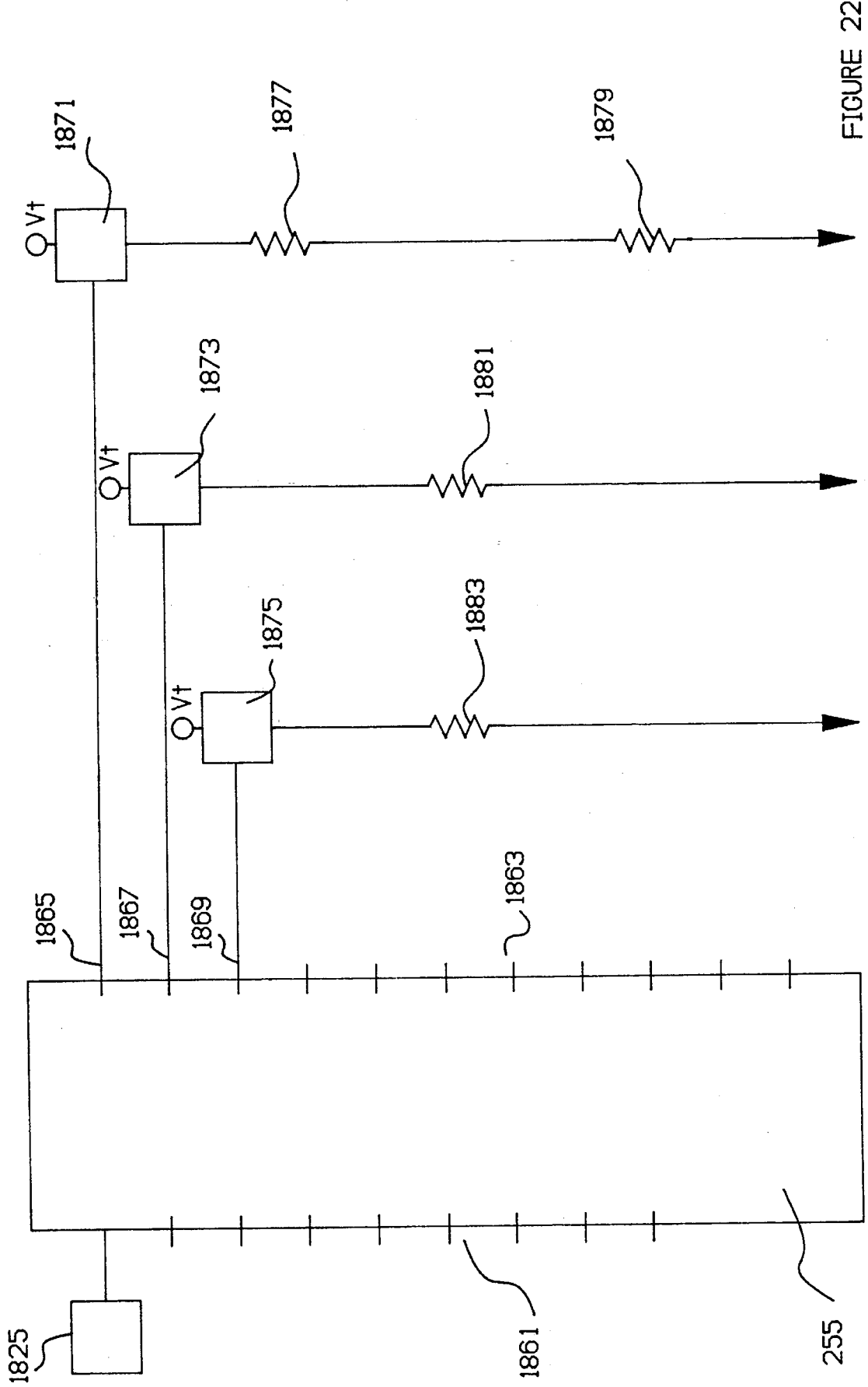
FIG. 22 is a simplified electrical schematic view of the electrical interconnection of the actuator of FIGS. 20 and 21.
Figure 23:
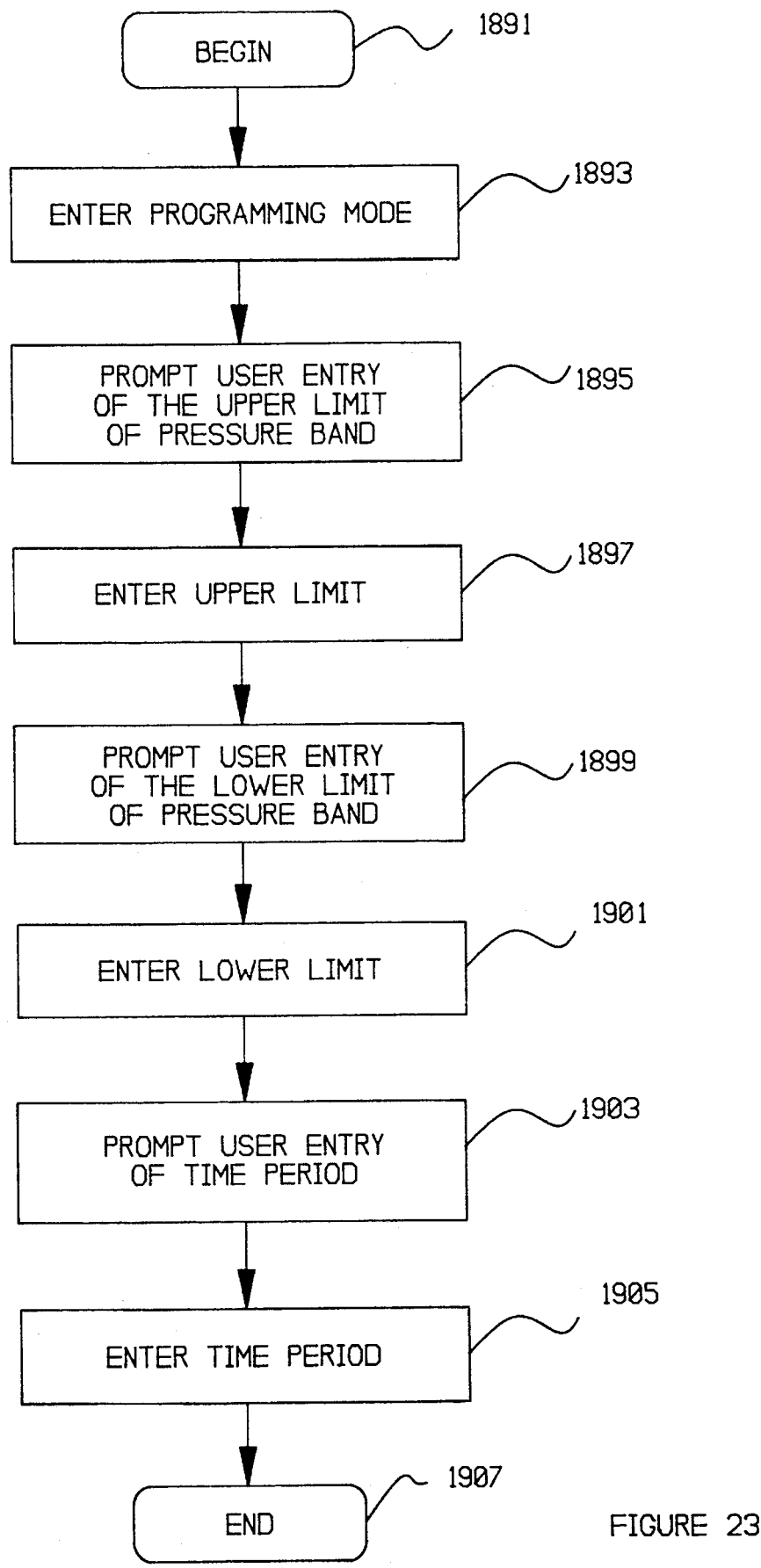
FIG. 23 is a flowchart depicting the programming mode of operation utilized with the actuation apparatus of FIGS. 20, 21, and 22.

The method by which the present invention accomplishes this objective is best described with reference first to FIG. 22, which is a simplified electrical schematic view of the electrical interconnection of the actuator of FIGS. 20 and 21. As shown in FIG. 22, microprocessor 255 includes a number of input pins 1861, and dedicated output pins 1863. Microprocessor 255 of the drive mechanism of the present invention is similar to that shown herebelow, but is shown in simplified form in FIG. 22 to facilitate this discussion.

Output pin 1865 of microprocessor 1857 is connected to one terminal of switch 1871. The other terminal of switch 1871 is connected to a voltage source, and the remaining terminal of switch 1871 is connected to igniter switches 1877, 1879, each of which are disposed in a separate metal tube of the plurality of selectively activated pressure generators 1821.

Providing a high output signal on output pin 1865 will cause switch 1871 to move from the normally-open condition to the closed condition, which will allow the voltage source to direct a current through igniter switches 1877, 1879. In the preferred embodiment of the present invention, switches 1871, 1873, and 1875 may comprise simple transistor switches (with one terminal connected to voltage, one terminal connected to the microprocessor output pin, and the other terminal connected to an igniter; application of a high voltage to the transistor switch allows the transistor to conduct, which allows currents to flow).

Similarly, switch 1873 includes one terminal which is connected to output pin 1867 of microprocessor 255, one terminal which is connected to a voltage source, and one terminal which is connected to igniter 1881. A high output on output pin 1867 of microprocessor 1857 causes switch 1873 to move between a normally-open condition to a closed condition, allowing current flow through igniter 1881. Likewise, switch 1875 includes one terminal which is connected to output pin 1869 of microprocessor 255, one terminal which is connected to voltage, and one terminal which is connected to igniter switch 1883. Igniter switch 1881 is disposed in a single metal tube of the plurality of selectively-actuable pressure generators 1821. In contrast, igniter switch 1883 is disposed in one of the one-foot long metal "half" tubes.

As is shown in FIG. 22, output pin 1865 of microprocessor 255 controls the "firing" of two of the plurality of selectively-actuable pressure generators 1821; this is referred to as firing "doubles". Output pin 1867 of microprocessor 1857 selectively controls the "firing" of only one of the plurality of selectively-actuable pressure generators 1821; this is referred to as firing "singles". In contrast, output pin 1869 of microprocessor 1859 selectively controls the "firing" of one of the plurality of selectively-actuable pressure generators 1821 which is one-half the length of a regular metal tube; this is referred to as firing "halves". In this specification, the word "firing" means the initiation of the chemical reaction which produces the gas which pressurizes annular region 1819, but should not be comprehended to indicate that any type of explosion is taking place. The burning reaction of thermally-activated substance 1845 is a slow, gas-generating process, and is nothing is like an explosion.

The remaining output pins of 1863 are likewise selectively connected to single sticks, double sticks, and half sticks. Preferably, most or all of the output pins of microprocessor 1857 may be used for selective firing of selected ones of the plurality of selectively-actuable pressure generators 1821.

In the preferred embodiment of the present invention, actuation apparatus 1811 includes pressure transducer 1825 which is coupled to one or more input pins of microprocessor 1857. In the preferred embodiment, pressure transducer 1825 is disposed within annular region 1819, and is electrically coupled to microprocessor 1857 by an electrical conductor which is routed into annular region 1819 with a conventional pressure-containing electrical feed through. In the preferred embodiment of the present invention, pressure transducer 1825 serves to provide a continuous indication of the pressure within annular region 1819. The computer program resident in memory and microprocessor 1857 will periodically compare the pressure reading of pressure transducer 1825 to one or more target pressures, as will be discussed herebelow.

In the present invention, the computer program resident in microprocessor 1857 should include a look-up table which is used to correlate output pins 1863 of microprocessor 1857 to the number and length of selectively-actuable pressure generators 1821 to which the output pin is connected. As selected ones of the plurality of selectively-actuable pressure generators 1821 are "fired" by microprocessor 1857, the items should either be automatically removed from the look-up table, or flagged as having already been discharged, to prevent the attempted firing of a selected selectively-actuable pressure generator 1821 which has already been discharged.

Figure 26:
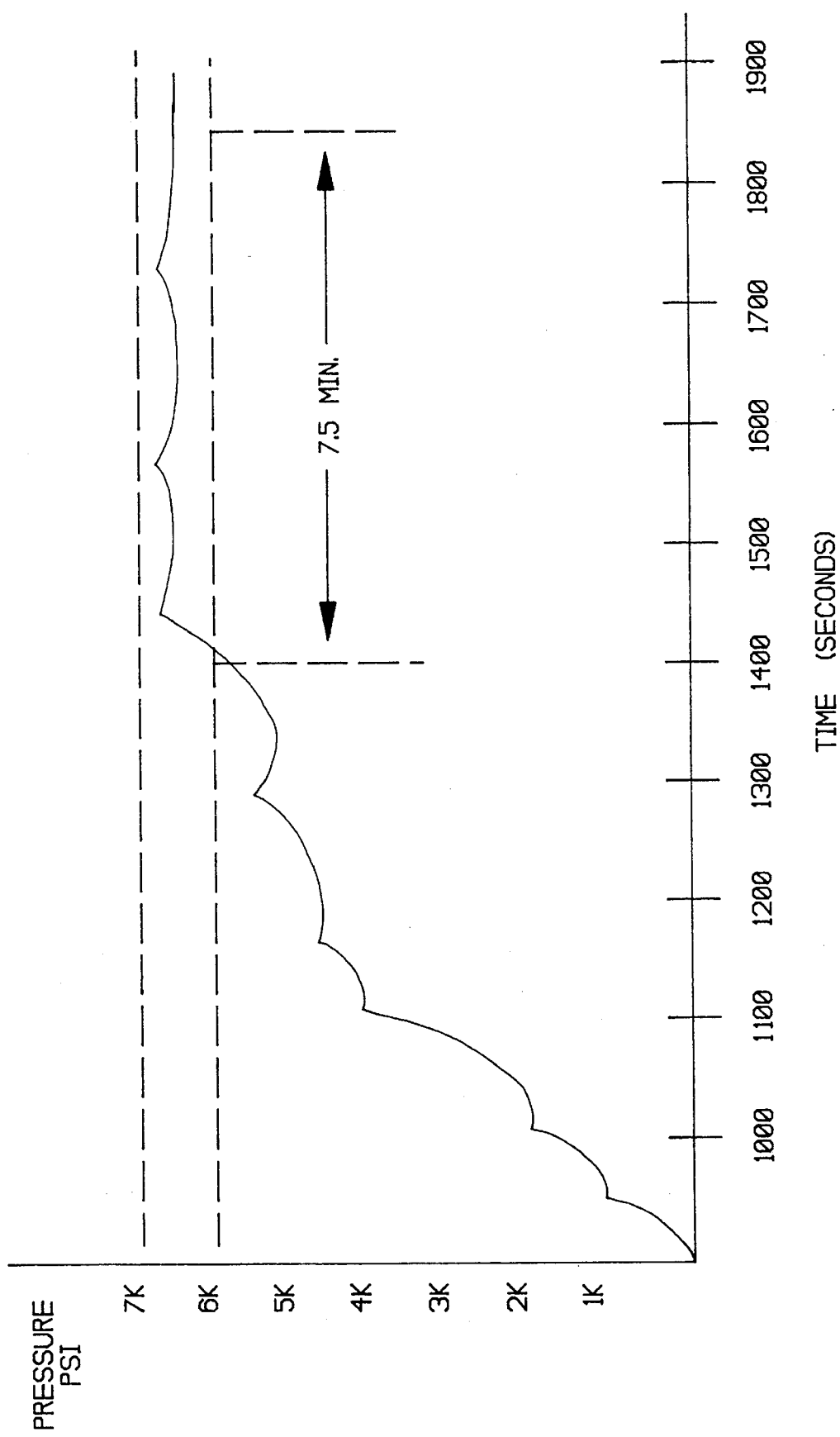
FIG. 26 is a graph of pressure versus time which provides an example of the pressure versus time profile which can be generated by the actuation apparatus of FIGS. 20, 21, and 22.

FIG. 26 is a graph of pressure versus time which provides an example of the pressure versus time profile which can be generated by the actuation apparatus of FIGS. 20, 21, and 22. As is shown, the X-axis of the present invention is representative of time, in seconds. The Y-axis of the graph of FIG. 26 is representative of the pressure within annular region 1819, in pounds per square inch. The solid line on the graph indicates the pressure within annular region 1819 with respect to time. The peaks and valleys of this curve represent the build-up and degradation of gas pressure within annular region 1819 due to the selective discharge of ones of the plurality of selectively-actuable pressure generators 1821. The specific engineering objective sought to be obtained by the example of FIG. 26 is the application of over four thousand pounds per square inch of force to piston 1859, which serves as a force-transferring member to energize an elastomeric sealing element in the packer which is described hereabove in the discussion of in FIGS. 2 and 3.

This objective is obtained by preprogramming microprocessor 1857 to periodically examine the value provided by pressure transducer 1885 to determine: (1) what the magnitude is of the pressure within annular region 1819; (2) whether the pressure within annular region 1819 is ascending or descending; and (3) whether the pressure within annular region 1819 has been maintained between an upper pressure limit of 6,500 pounds per square inch and a lower pressure limit of 5,500 pounds per square inch for a period of 7.5 minutes. Bear in mind that the graph of FIG. 8 depicts one of a number of pressure versus time curves which may be selected by the user during a programming mode of operation.

During the programming mode of operation, microprocessor 1857 may be programmed with the user-selected pressure criteria which establishes a force profile for application to wellbore tools through the force-transferring action of piston 1859. The programming mode of operation is depicted in flowchart from in FIGS. 25a, 25b and 25c. The programming mode of operation begins in step 1891. In step 1893, the programming mode is entered by the operator. The user is prompted to enter the upper limit of a selected pressure band, in step 1895. The user responds to the prompt, in step 1897, by entering the upper pressure limit. For the example of FIG. 26, the user would enter "6500".

Next, in step 1899, the user is prompted to enter the lower limit of a selected pressure band. In response to the prompt, in step 1901, the user enters the lower limit of the selected pressure band. Again, with reference to the example of FIG. 26, the lower limit is 5,500 pounds per square inch, so the user would enter "5500".

The programming process continues in step 1903, when the computer prompts the user to enter a time period for which the pressure within annular region 1819 must be maintained within the upper and lower pressure limits which have been entered in the preceding steps. In step 1905, the user responds to the prompt by entering the time period, in accordance with the present invention in units of seconds. Again, with reference to the example of FIG. 26, the user selected time interval is 7.5 minutes, which corresponds to 450 seconds, so the user would enter "450".

Figure 24:
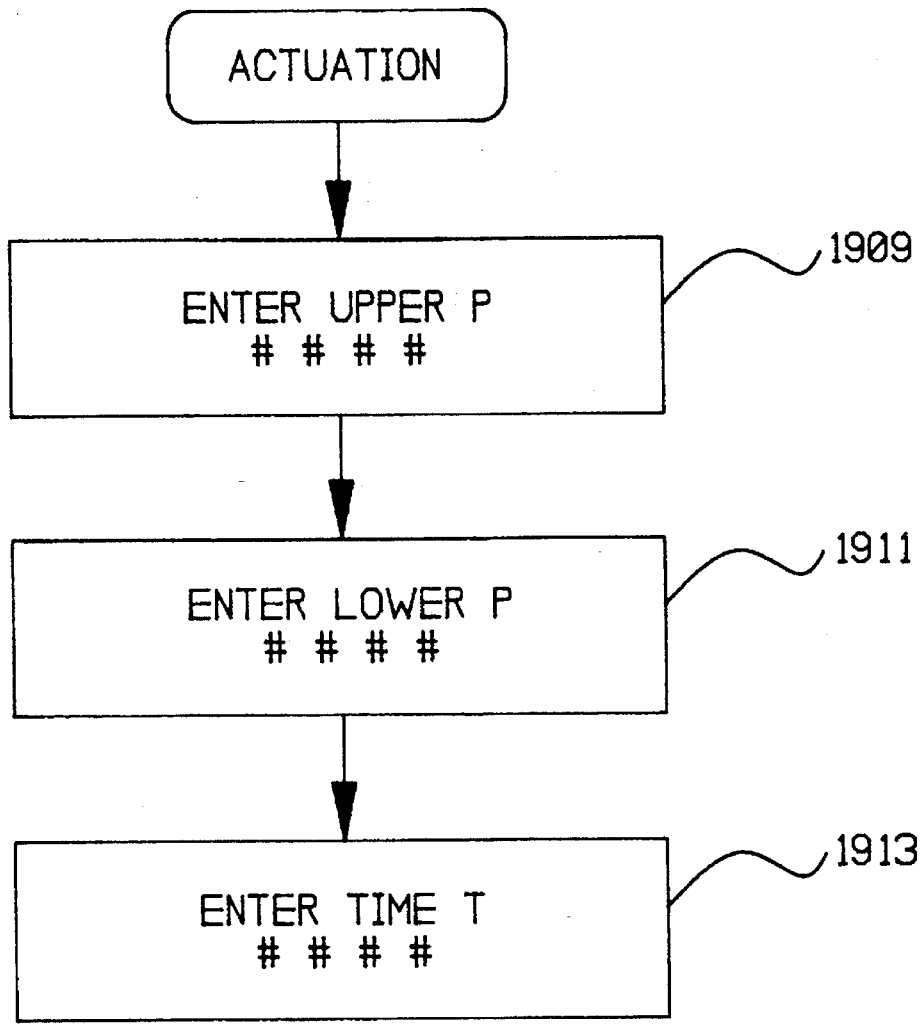
FIG. 24 is a depiction of a user interface display utilized with the actuation apparatus of FIGS. 20, 21, and 22.

Preferably, programming would occur through use of programming unit which is discussed hereabove. Programming unit 1207 would provide a digital display of the prompts, and allow the user to enter the numbers which establish the upper pressure limit and lower pressure limit of the selected pressure span, as well as the time interval which is desired. The digital message are displayed in FIG. 24. Display 1909 prompts the user to enter the upper pressure limit; display 1911 prompts the user to enter the lower pressure limit; display 1913 prompts the user to enter the selected time interval, in seconds.

Figure 25A:
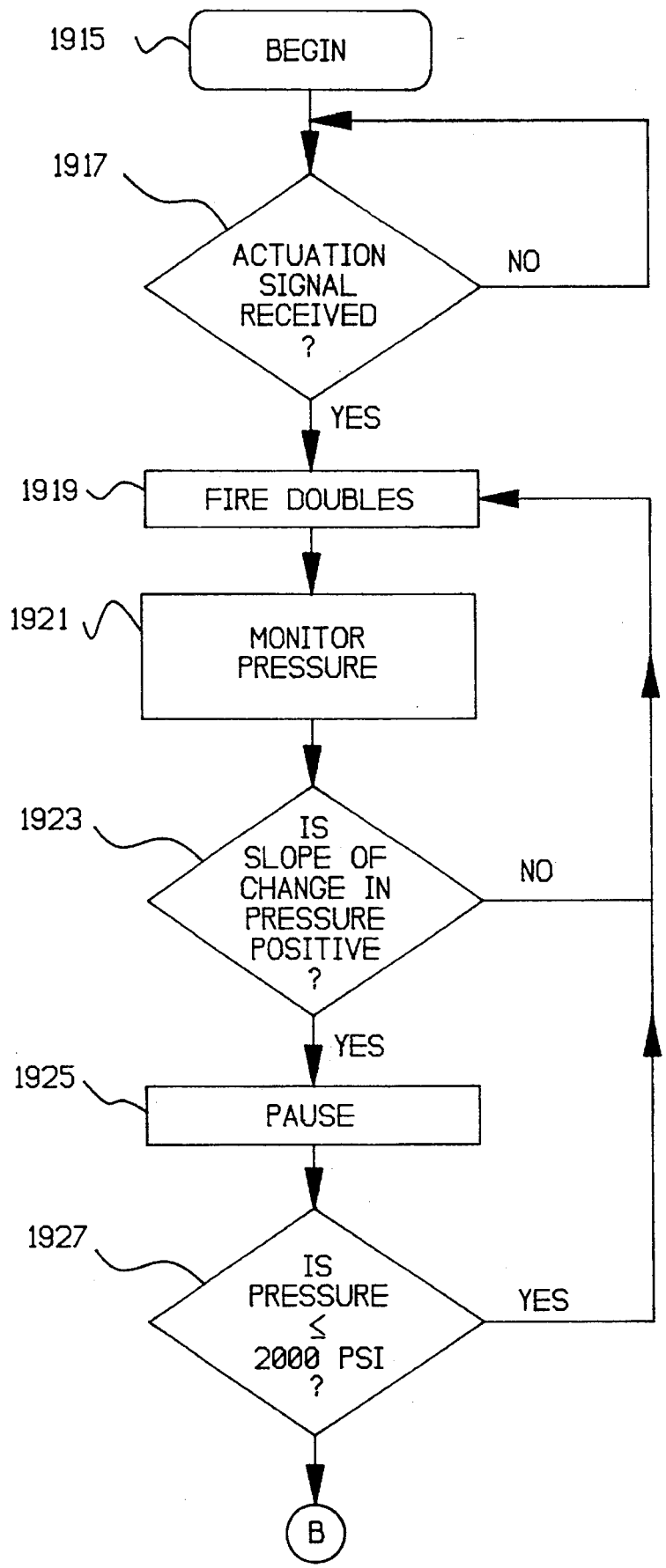
FIGS. 25a, 25b, and 25c is a flowchart depicting the program operation for the actuation apparatus of FIGS. 20, 21, and 22.
Figure 25B:
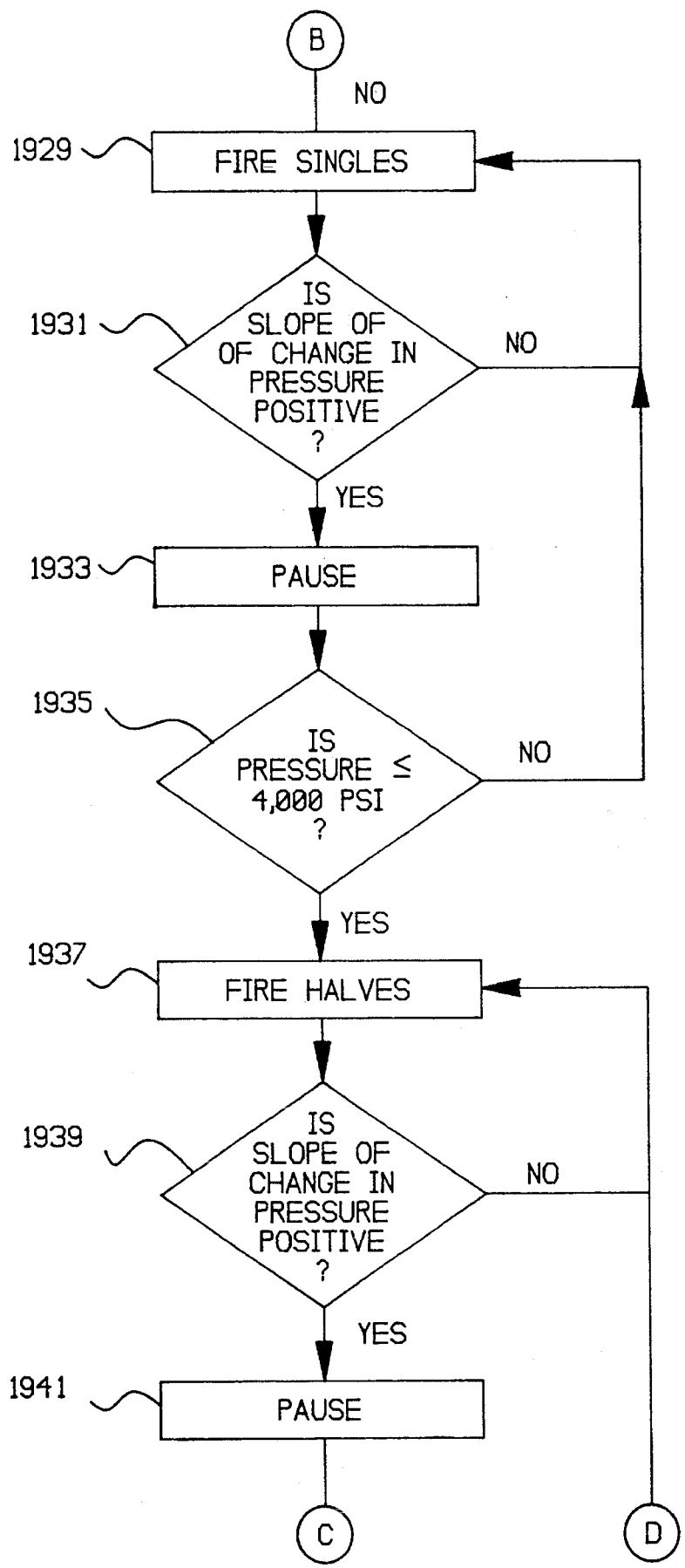
Figure 25C:
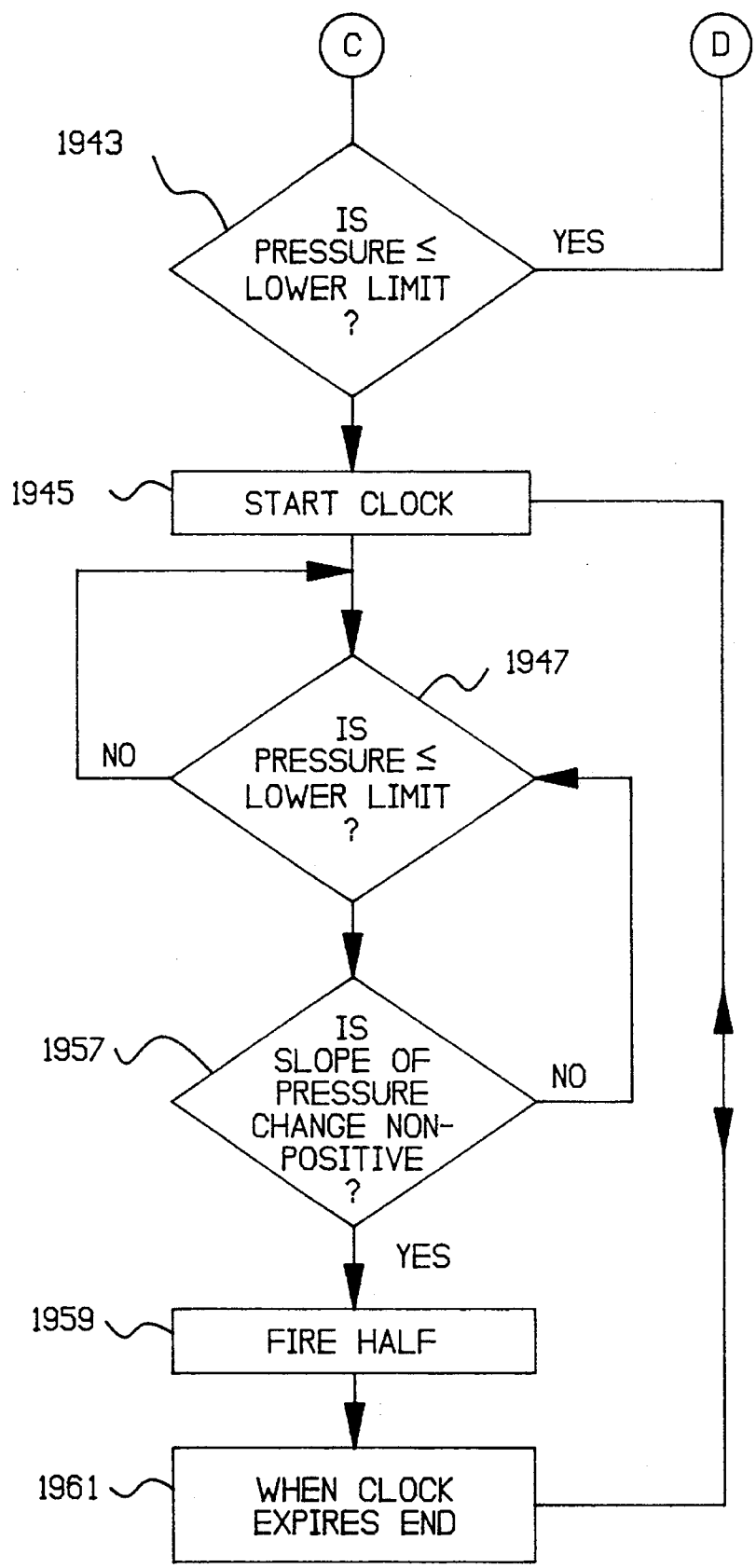

FIGS. 25a, 25b, and 25c will now be used to described in detail a force moderation mode of operation of microprocessor 255. FIGS. 25a, 25b, and 25c should be read together as a single figure, and together depict, in flowchart form, the force moderation mode of operation of the present invention. The process begins at step 1915. In step 1917, microprocessor 255 determines whether an actuation signal has been received. The actuation signal may comprise any conventional signal, such as those generated by manipulation of the tubing string or by manipulation of a column of fluid within the wellbore. However, in the present invention, the actuation signal comprises a pattern of pressure surge which are detected through the imperforate wall of the wellbore apparatus of the present invention.

Once an actuation signal is determined to have been received, the process continues in step 1919, in which microprocessor 255 triggers the firing of doubles, to begin pressurization of annular region 1819. In step 1921, microprocessor 255 monitors pressure at two or more time periods, and determines in step 1923 if the change in pressure has a positive slope. If the pressure change does not have a positive slope, this would indicate that the intended firing was not accomplished, so the process returns to step 1919 for another firing of doubles. If, in step 1923, it is determined that the slope of the change in pressure is positive, the process continues in step 1925, wherein microprocessor 255 pauses for a predetermined time interval to allow the thermally-activated material within the doubles to burn and release gas into the annular region 1819.

Next, in step 1927, microprocessor 255 monitors the pressure to determine if it is less than or equal to 2,000 pounds per square inch. If so, the process returns to step 1919; if not, the process continues in step 1929, by firing of singles. In step 1931, microprocessor 255 determines if the slope of the change of pressure is positive. If not, microprocessor 255 determines that the single was not properly fired, or misfired. If the slope is positive, microprocessor 255 determines that the single has been properly fired, and pauses for a predetermined period in step 1933.

The process continues in step 1935, wherein microprocessor 255 determines if the pressure is less than or equal to 4,000 pounds per square inch; if so, the process continues at step 1929, by firing additional singles. If not, the process continues in step 1937 by firing halves.

In step 1939, microprocessor 255 determines if the slope of the change in pressure is positive; if not, microprocessor 255 determines that the attempt to fire halves has failed, or has otherwise been frustrated, so the process continues in step 1937 by firing additional half. If, in step 1939, it is determined that the slope of the change of pressure is positive, the process continues in step 1941, wherein microprocessor 255 pauses for a predetermined time interval to allow the material within the fired half to completely burn.

In step 1943, microprocessor 255 determines if the pressure is less than or equal to the lower pressure limit; if not, the process returns to step 1937, where another half stick is fired.

In steps 1919 through 1943, microprocessor 255 moderates the pressurization of annular region 1819 by first firing doubles, then firing singles, and then firing halves. This procedure ensures that the annular region 1819 will not become over-pressurized. After each firing, the computer determines if the slope of the pressure change within the pressure vessel defined by annular region 1819 is positive or negative. A negative slope indicates that a misfiring has occurred. A positive slope indicates that proper firing has occurred, so microprocessor 255 pauses for a predetermined period to allow all the material of the appropriate stick to be consumed by the gas-producing chemical reaction.

It is in step 1947 that microprocessor 255 determines whether the pressure within annular region 1819 has exceeded the user-established lower pressure limit of the pressure span within which the user seeks to maintain prolonged force transference.

If, in step 1943, it is determined that the pressure within annular region 1819 has exceeded the user-established lower pressure limit, the process continues in step 1945, wherein microprocessor 255 starts a clock which will continue to run for the predetermined time interval.

The process continues in step 1947, wherein microprocessor 255 determines if the pressure within annular region 1819 is less than or equal to the lower limit. If the pressure has fallen below the user-established lower limit, as determined in step 1947, the process continues in step 1949, wherein a half is fired. If it is determined, in step 1947, that the pressure has not fallen below the user-established lower limit, the process continues in step 1957, wherein the system checks the slope the pressure change.

In step 1959, if the lower pressure limit has been violated, as determined in step 1947, and the slope of the pressure change is determined to be non-positive in step 1957, the process continues by firing another half stick in step 1959. Microprocessor 255 does nothing, in the event that user-selected upper pressure limit is exceeded. Microprocessor 255 then attempts to maintain the pressure within the annular region at or above the lower limit for the user-selected time interval. When that time limit expires, as set forth in step 1961, the process ends.

Essentially, the functional blocks of steps 1947 through 1961 establish a loop, wherein the computer is continually checking to determine if the pressure within annular region 1819 falls below the user-established limits. In addition, the computer is continually determining whether the value of the clock has exceeded the user-established time interval limit. Rising above the user-established upper limit will cause no action. Falling below the user-established lower pressure limit will cause the firing of additional sticks to raise the pressure value above the minimum level, provided the slope of the pressure is non-positive. Once the pressure within annular region 1819 has been maintained within the desired pressure limits, for the desired time interval, the process ends.

This procedure is exemplified in the example of FIG. 26. As shown therein, doubles are fired from 0 to 2,000 pounds per square inch of pressure. Once 2,000 pounds per square inch of pressure has been obtained, microprocessor 255 begins firing singles, until 4,000 pounds per square inch has been obtained within annular region 1819. Once 4,000 pounds per square inch of pressure within annular region 1819 has been obtained, microprocessor 255 switches to firing halves, until the user-selected lower pressure limit of 5,500 pounds per square inch has been exceeded, which triggers the initiation of the software clock. Thereafter, microprocessor 255 continually monitors the pressure within annular region 1819, to determine whether it is within the bounds of the lower pressure limit which is established by the user, which in the example of FIG. 26, is 5,000 pounds per square inch of pressure. If the pressure falls below the lower limit, additional half sticks are fired. Once the pressure has been maintained substantially within the pressure span established by the user for the selected time interval, the process discontinues.

The drive mechanism discussed hereabove is only one of many types of drive mechanisms which may be utilized to actuate wellbore tools, or to switch them between modes of operation. It is also possible to utilize the present invention to initiate actuation of wellbore tools which is accomplished through utilization of conventional power charges, as well as fluid pressure actuated pistons, and the like.

The present invention may find particular utility in conventional wellbore operations, such as completion operations. FIG. 27a through 27e depict in simplified form one type of completion operation which can be accomplished with the present invention. FIG. 27a depicts wellbore 2001 which is partially cased by casing 2003 which is held in position by cement 2005, but also includes uncased portion 2007. As is shown in FIG. 27b, an electrically-actuable liner hanger mechanism 2011 may be conveyed within wellbore 2001 on tubing string 2009, and set against casing 2003 when a reception apparatus contained within electrically-actuable liner hanger mechanism 2011 recognizes a coded message which is transmitted through a wellbore fluid column. The reception apparatus portion of liner hanger mechanism 2011 may initiate a power charge reaction which is utilized to set a gripping mechanism into gripping engagement with the interior surface of casing 2003, as depicted in FIG. 27c. Tubing string 2009 is then removed from the wellbore. Next, as is depicted in FIG. 27d, tubing string 2013 may be lowered within wellbore 2001. Tubing string 2013 includes packer mechanism 2015, valve mechanism 2017, and perforating gun mechanism 2019. Each of these wellbore devices includes a reception apparatus which is preprogrammed to provide an actuation signal upon reception of a particular coded message. Coded messages may be sent upon a wellbore fluid column to perforate the wellbore with perforating mechanism 2019, open a sliding sleeve valve with valve mechanism 2017, and pack tubular conduit 2013 off against the casing of wellbore 2001. In this configuration, wellbore fluids may flow into wellbore 2001 through perforations 2021, and into central bore 2025 of tubular conduit string 2013 through openings 2023 of valve mechanism 2017, and be brought to the surface by conventional means, such as a sucker rod pump mechanism or a submersible pump disposed within the wellbore.

In an alternative embodiment, a fluid flow regulator valve may be included within the tubular conduit string 2013 which allows the operator to remotely control the amount of fluids flowing from wellbore 2001 to central conduit 2025 of tubular conduit string 2013.

While the invention has been shown in only one of its forms, it is not thus limited but is susceptible to various changes and modifications without departing from the spirit thereof.

What is claimed is:

1. A method of communicating a coded message in a wellbore between a transmission node and a reception node, through a fluid column extending therebetween, comprising the method steps of:

providing a transmission apparatus at said transmission node which is in communication with said fluid column; for for generating an acoustic pressure pulse to produce at least a portion of said coded message;

providing a reception apparatus at said reception node which includes:

(a) a rigid structural component with an exterior surface which is in contact with said fluid column and an interior surface which is not in contact with said fluid column;

(b) a sensor assembly which detects elastic deformation of said rigid structural component;

utilizing said transmission apparatus to generate acoustic pressure pulses in said fluid column in a predetermined pattern to generate said coded message; and utilizing said reception apparatus to detect said coded message in said fluid column through changes in elastic deformation of said rigid structural component.

2. A method according to claim 1, wherein said sensor assembly includes a fluid body which is in communication with said interior surface of said rigid structural component, but which is not in communication with said fluid column, and which is responsive to said changes in elastic deformation of said rigid structural component.

3. A method according to claim 2, wherein said sensor assembly further includes a pressure sensor within said fluid body for directly sensing pressure changes in said fluid body to detect elastic deformation of said rigid structural component.

4. A method according to claim 1, wherein said sensor assembly includes at least one strain sensor which is coupled to said interior surface of said rigid structural component and which is responsive to changes in elastic deformation of said rigid structural component.

5. A method according to claim 1, wherein said rigid structural component of said reception apparatus comprises a mandrel member which at least partially defines a central bore through a wellbore tubular member.

6. A method according to claim 1, further comprising:
providing a processor;
programming said processor to identify particular input electrical signal patterns with particular predefined processor tasks;
generating electrical signals with said reception apparatus which correspond to changes in elastic deformation of said rigid structural component and directing said electrical signals to said processor as an input; and
utilizing said processor to perform said particular predefined processor tasks in response to detection of particular electrical signal patterns.

7. A method according to claim 6:
wherein said particular predefined processor tasks include providing an activation signal for at least one electrically-actuable wellbore tool; and
wherein said method further includes initiating activation of a particular wellbore tool with said processor in response to receipt of a particular electrical signal pattern at said reception apparatus.

8. A method according to claim 6:
wherein said particular predefined processor tasks include providing an output signal which switches at least one wellbore tool between selected ones of a plurality of operating states; and
wherein said method further includes switching a particular one of said at least one wellbore tool between selected ones of said plurality of operating states with said processor in response to receipt of a particular electrical signal pattern at said reception apparatus.

9. A method according to claim 6:
wherein said particular electrical signal patterns define said coded message with operator-selectable coded message attributes of:
(a) number of consecutive electrical signals, each corresponding to an elastic deformation of said rigid structural component; and
(b) time between consecutive electrical signals;
which distinguish one particular coded messages from other coded messages.

10. A method according to claim 6, further including:
providing a programming unit;
providing a programming interface in electrical communication with said processor; and
utilizing said programming unit and said programming interface to program said processor to provide a particular output in response to receipt of a particular electrical signal pattern from said reception apparatus.

11. A method according to claim 10:
wherein said reception apparatus includes a plurality of power-consuming electrical components including said processor;
said method further including the method step of maintaining at least a portion of said power-consuming electrical components in an off condition until at least one signal is received at said programming interface.

12. A method according to claim 11, further comprising:
returning said at least a portion of said power-consuming electrical components to said off condition if no additional signals are received at said programming interface within a predetermined time interval.

13. A method according to claim 1, wherein said step of utilizing said reception apparatus includes:
utilizing said reception apparatus to detect said coded message in said fluid column through substantially continuously monitoring of rates of change in elastic deformation of said rigid structural component.

14. A method according to claim 1:
wherein said sensor assembly generates electrical signals corresponding to elastic deformation of said rigid structural component;
wherein said reception apparatus further includes a signal processor for identifying and isolating rates of change in elastic deformation of said rigid structural component which correspond to rates of change in fluid pressure amplitude of said fluid column above a predetermined rate threshold; and
wherein said step of utilizing said reception apparatus comprises utilizing said reception apparatus to detect said coded message in said fluid column through monitoring of rates of change in fluid pressure amplitude of said fluid column as detected by elastic deformation of said rigid structural component.

15. A method according to claim 1:
wherein said reception apparatus includes a plurality of power-consuming electrical components; and
said method further comprising the method step of maintaining at least a portion of said power-consuming electrical components in an off condition until said reception apparatus detects at least one change in elastic deformation of said rigid structural component.

16. A method according to claim 15, further comprising:
returning said at least a portion of said power-consuming electrical components to said off condition if at least one of the following conditions occur:
(a) detected changes in elastic deformation fail to define a coded message; and
(b) additional changes in elastic deformation do not occur within a predetermined time interval.

17. A method of switching a remotely located wellbore tool between modes of operation, comprising:
providing (a) an electrically-actuable wellbore tool, (b) a pressure sensor, and (c) a programmable controller, electrically connected to provide electrical signals from said pressure sensor as an input to said programmable controller;
programming said programmable controller to provide a predetermined electrical signal as an output to said electrically-actuable wellbore tool in response to a predetermined input from said pressure sensor;
securing said electrically-actuable wellbore tool, said pressure sensor, and said programmable controller to a tubular conduit string;

lowering said tubular conduit string within said wellbore to a selected wellbore location;

providing a wellbore fluid column in contact with a portion of said tubular conduit but out of contact with said pressure sensor;

manipulating pressure of said wellbore fluid column in a predetermined manner to generate a series of transient rapid pressure amplitude changes above a predetermined rate-of-change threshold to stimulate said pressure sensor through said tubular conduit string to produce said predetermined input, without substantially changing volume of said wellbore fluid column; and detecting said series of transient rapid pressure amplitude changes through elastic deformation of a rigid structural component utilizing said pressure sensor;

utilizing said programmable processor to provide said predetermined output to switch said electrically-actuable wellbore tool between modes of operation.

18. A method according to claim 17, further comprising:

providing a pressure pulse generator in communication with said fluid column;

wherein said step of manipulating pressure comprises manipulating pressure of said wellbore fluid column in a predetermined manner utilizing said pressure pulse generator to generate a series of transient rapid pressure amplitude changes above a predetermined rate-of-change threshold in accordance with at least one of the following techniques:
(a) generating positive pressure pulses by rapidly injecting small volumes of fluid into said wellbore fluid column; and
(b) generating negative pressure pulses by rapidly venting small volumes of fluid from said wellbore fluid column;

to stimulate said pressure sensor through said tubular conduit string to produce said predetermined input without substantially changing volume of said wellbore fluid column.

19. A method according to claim 17, further comprising:

providing a fluid body in contact with (a) said tubular conduit string and (b) said pressure sensor, but out of contact with said wellbore fluid column, to transfer pressure changes between (a) said tubular conduit string and (b) said pressure sensor.

20. A method according to claim 17, further comprising:

maintaining said programmable controller in a off condition until at least one rapid pressure amplitude change above said predetermined rate-of-change threshold is detected by said pressure sensor.

21. A method according to claim 20, further comprising:

returning said programmable controller to an off condition if at least one of the following conditions occur:
(a) detected rapid pressure amplitude changes fail to define a coded message;
(b) additional rapid pressure amplitude changes do not occur within a predetermined time interval.

22. A method according to claim 17, wherein said step of manipulating pressure, rapid pressure amplitude changes are monitored without regard to pressure amplitude of said wellbore fluid column.

23. An apparatus for communicating a coded message in a wellbore between a transmission node and a reception node, through a fluid column extending therebetween, comprising:

a transmission apparatus at said transmission node which is in communication with said fluid column, for generating an acoustic pressure pulse to produce at least a portion of said coded message;

a reception apparatus at said reception node which includes:
(a) a rigid structural component with an exterior surface which is in contact with said fluid column and an interior surface which is not in contact with said fluid column;
(b) a sensor assembly which detects changes in elastic deformation of said rigid structural component;

wherein, during a communication mode of operation:
(a) said transmission apparatus is utilized to alter pressure of said fluid column in a predetermined pattern to generate said coded message; and
(b) said reception apparatus is utilized to detect said coded message in said fluid column through changes in elastic deformation of said rigid structural component.

24. A method according to claim 23, wherein said sensor assembly includes a fluid body which is in communication with said interior surface of said rigid structural component, but which is not in communication with said fluid column, and which is responsive to said changes in elastic deformation of said rigid structural component.

25. A method according to claim 24, wherein said sensor assembly further includes a pressure sensor within said fluid body for directly sensing pressure changes in said fluid body to detect elastic deformation of said rigid structural component.

26. A method according to claim 23, wherein said sensor assembly includes at least one strain sensor which is coupled to said interior surface of said rigid structural component and which is responsive to changes in elastic deformation of said rigid structural component.

27. A method according to claim 23, wherein said rigid structural component of said reception apparatus comprises a mandrel member which at least partially defines a central bore through a wellbore tubular member.

28. An apparatus according to claim 23, further comprising:

a processor programmed to identify particular input electrical signal patterns with particular predefined processor tasks;

wherein, during said communication mode of operation:
(a) electrical signals are generated with said reception apparatus which correspond to changes in elastic deformation of said rigid structural component and are directed to said processor as an input; and
(b) said processor is utilized to perform said particular predefined processor tasks in response to detection of particular electrical signal patterns.

29. An apparatus according to claim 23:

wherein said particular electrical signal patterns define said coded message with operator-selectable coded message attributes of:
(a) number of consecutive electrical signals, each corresponding to an elastic deformation of said rigid structural component; and
(b) time between consecutive electrical signals;
which distinguish one particular coded messages from other coded messages.

30. An apparatus according to claim 28, further including:

a programming unit;

a programming interface in electrical communication with said processor; and wherein, during a programming mode of operation said programming unit and said programming interface are utilized to program said processor to provide a particular output in response to receipt of a particular electrical signal pattern from said reception apparatus.

31. An apparatus according to claim 30:
   wherein said reception apparatus includes a plurality of power-consuming electrical components including said processor;
   wherein, during a communication mode of operation at least a portion of said power-consuming electrical components are maintained in an off condition until at least one signal is received at said programming interface.

32. An apparatus according to claim 31, wherein, during said communication mode of operation said at least a portion of said power-consuming electrical components are returned to said off condition if no additional signals are received at said programming interface within a predetermined time interval.

33. An apparatus according to claim 23:
   wherein said sensor assembly generates electrical signals corresponding to elastic deformation of said rigid structural component;
   wherein said reception apparatus further includes a signal processor for identifying and isolating rates of change in elastic deformation of said rigid structural component which correspond to rates of change in fluid pressure amplitude of said fluid column above a predetermined rate threshold; and
   wherein, during said communication node of operation, said reception apparatus is utilized to detect said coded message in said fluid column through monitoring of rates of change in fluid pressure amplitude of said fluid column as detected by elastic deformation of said rigid structural component.

34. An apparatus according to claim 23:
   wherein said reception apparatus includes a plurality of power-consuming electrical components; and
   wherein, during said communication node of operation, at least a portion of said power-consuming electrical components are maintained in an off condition until said reception apparatus detects at least one change in elastic deformation of said rigid structural component.

35. An apparatus according to claim 34, wherein, during said communication node of operation, said at least a portion of said power-consuming electrical components are returned to said off condition if at least one of the following conditions occur:
   (a) detected changes in elastic deformation fail to define a coded message; and
   (b) additional changes in elastic deformation do not occur within a predetermined time interval.

36. An apparatus for communicating a coded message in a wellbore between a transmission node and a reception node, through a fluid column extending therebetween, comprising:
   a transmission apparatus at said transmission node which is in communication with said fluid column for applying a series of pressure impulses to said fluid column, each pressure impulse creating a temporary change in fluid pressure amplitude in said fluid column without substantially changing the volume of said fluid column;
   a reception apparatus at said reception node which includes a sensor assembly for detecting elastic deformation caused by each temporary change in fluid pressure amplitude for each pressure impulse;
   wherein, during a communication mode of operation:
      (a) said transmission apparatus is utilized to generate said pressure impulses in a predetermined pattern to generate said coded message; and
      (b) said reception apparatus is utilized to detect said coded message.

37. An apparatus for communicating coded messages in a wellbore according to claim 36, wherein, during said communication mode of operation, for each pressure impulse, said transmission apparatus injects a known volume of fluid into said fluid column at a high velocity.

38. An apparatus for communicating a coded message in a wellbore according to claim 36, wherein said transmission apparatus comprises:
   a driver apparatus for receiving a known volume of fluid during a filling mode of operation and for rapidly discharging said known volume of fluid during a discharge mode of operation; and
   means for providing an uninterrupted fluid body from said driver apparatus to said fluid column.

39. An apparatus for communicating in a wellbore between a transmission node and a reception node, through a fluid column extending therebetween, comprising:
   a transmission apparatus at said transmission node which is in communication with said fluid column for applying a series of pressure impulses to said fluid column to generate a coded message, each coded message being defined by the following operator-selectable coded message attributes:
      (a) number of consecutive pressure impulses; and
      (b) time between consecutive pressure impulses;
   a reception apparatus, at said reception node, for detecting said coded messages;
   wherein, during a communication mode of operation:
      (a) said transmission apparatus is utilized to generate said pressure impulses in a predetermined pattern to generate said coded message; and
      (b) said reception apparatus is utilized to detect said coded message through monitoring of elastic deformation of a structural component.

40. An apparatus for communicating in a wellbore, according to claim 39:
   wherein a plurality of reception apparati are provided, each located at a reception node;
   wherein each reception apparatus is preprogrammed to be responsive to at least one coded message.

* * * * *